(12) United States Patent
Alabi et al.

(10) Patent No.: US 11,384,205 B2
(45) Date of Patent: Jul. 12, 2022

(54) SEQUENCE-DEFINED POLYMERS AND METHODS OF MAKING SAME AND USING SAME

(71) Applicant: Cornell University, Ithaca, NY (US)

(72) Inventors: Christopher Akinleye Alabi, Ithaca, NY (US); Mintu Porel, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 16/709,698

(22) Filed: Dec. 10, 2019

(65) Prior Publication Data

US 2020/0299461 A1    Sep. 24, 2020

Related U.S. Application Data

(62) Division of application No. 14/830,374, filed on Aug. 19, 2015, now Pat. No. 10,501,581.

(60) Provisional application No. 62/039,174, filed on Aug. 19, 2014.

(51) Int. Cl.
    *C08G 75/02*    (2016.01)
(52) U.S. Cl.
    CPC .................. *C08G 75/02* (2013.01)

(58) Field of Classification Search
    None
    See application file for complete search history.

(56) References Cited

U.S. PATENT DOCUMENTS 5,047,576 A * 9/1991 Takenosita ............ C07C 323/00
                                                            560/125

OTHER PUBLICATIONS

Espeel, P., et al., "Multifunctionalized Sequence-Defined Oligomers from a Single Building Block," Angew. Chem. Int. Ed. 2013, vol. 52, pp. 13261-13264.

Solleder, et al., "Sequence Control in Polymer Chemistry through the Passerini Three-Component Reaction," Angew. Chem. Int. Ed. 2014, 53, 711-714.

* cited by examiner

*Primary Examiner* — Rachel Kahn
(74) *Attorney, Agent, or Firm* — Johnson, Marcou, Isaacs & Nix, LLC; Paul J. Roman, Jr.

(57) ABSTRACT

Methods of making sequence-defined polymers and sequence-defined polymers. The methods are based on the orthogonal reactivity of monomers having at least two different functional groups. The sequence-defined polymers can be used in various applications. For example, the SDPs (e.g., pH sensitive SDPs) are used in cell lysis methods or as molecular vehicles to transport drug cargo into cells.

1 Claim, 61 Drawing Sheets

Figure 7
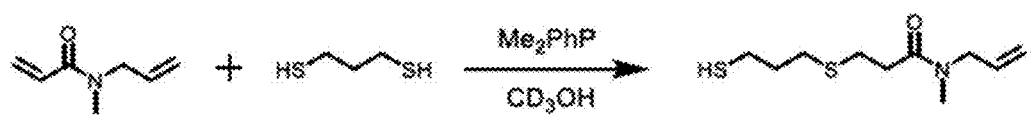
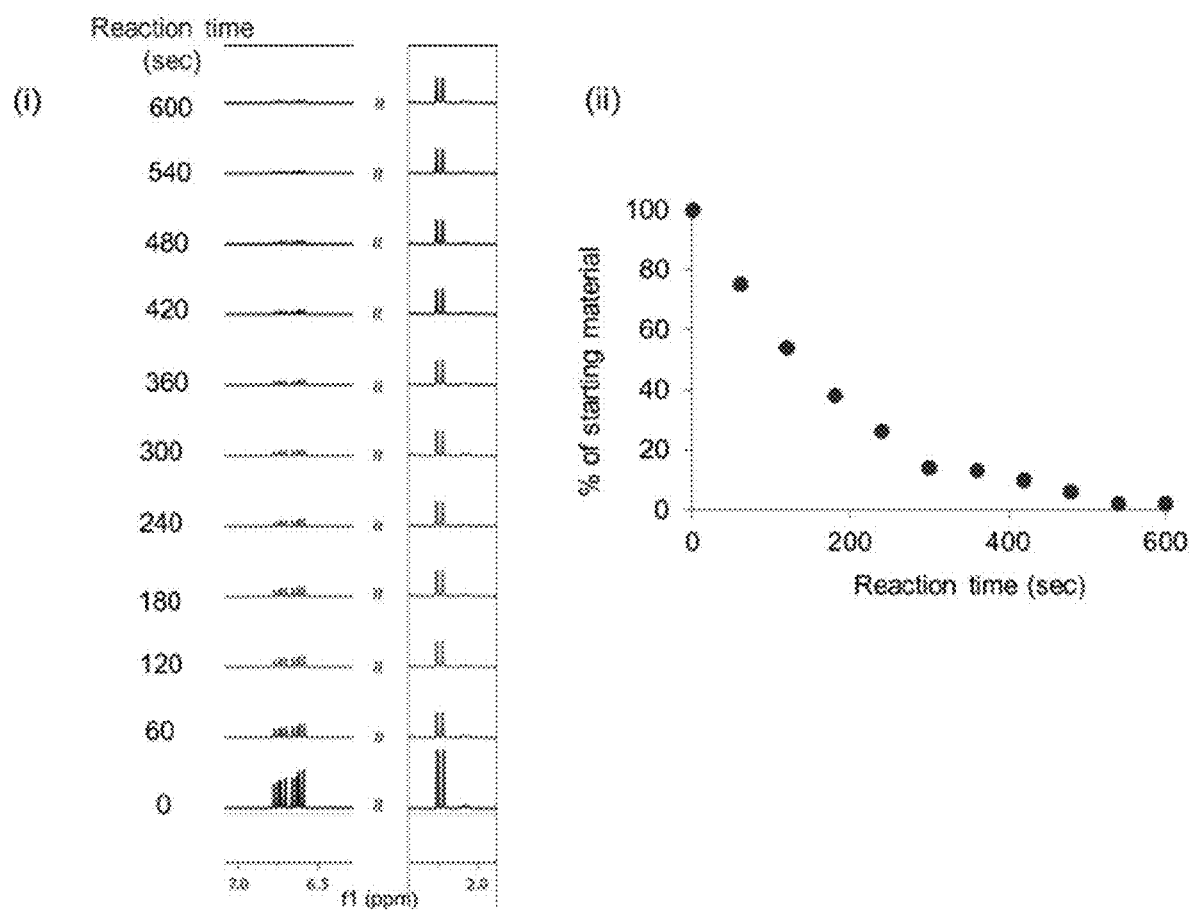

Instrument scan range = 190 to 2000
$M_1$ =166.08, $N_1$ = 183.15 and $N_8$ = 2032.95 were out of range Figure 49
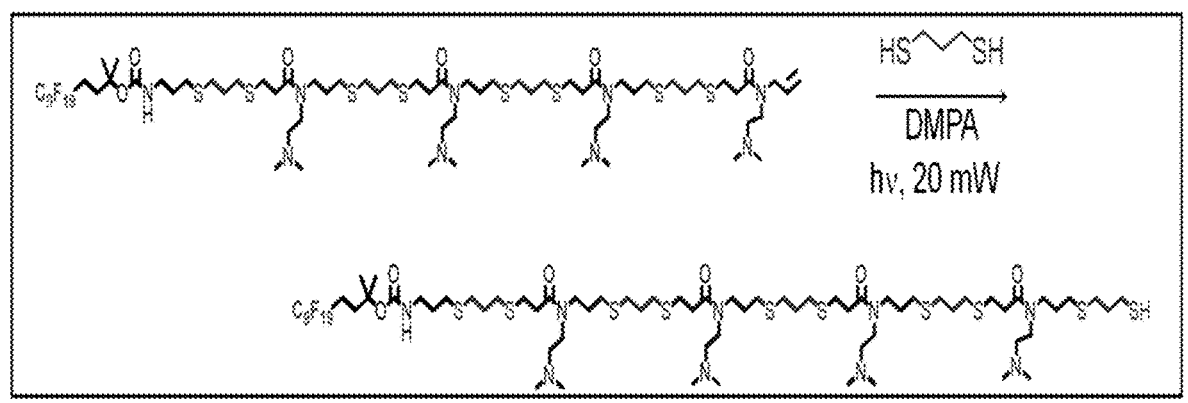
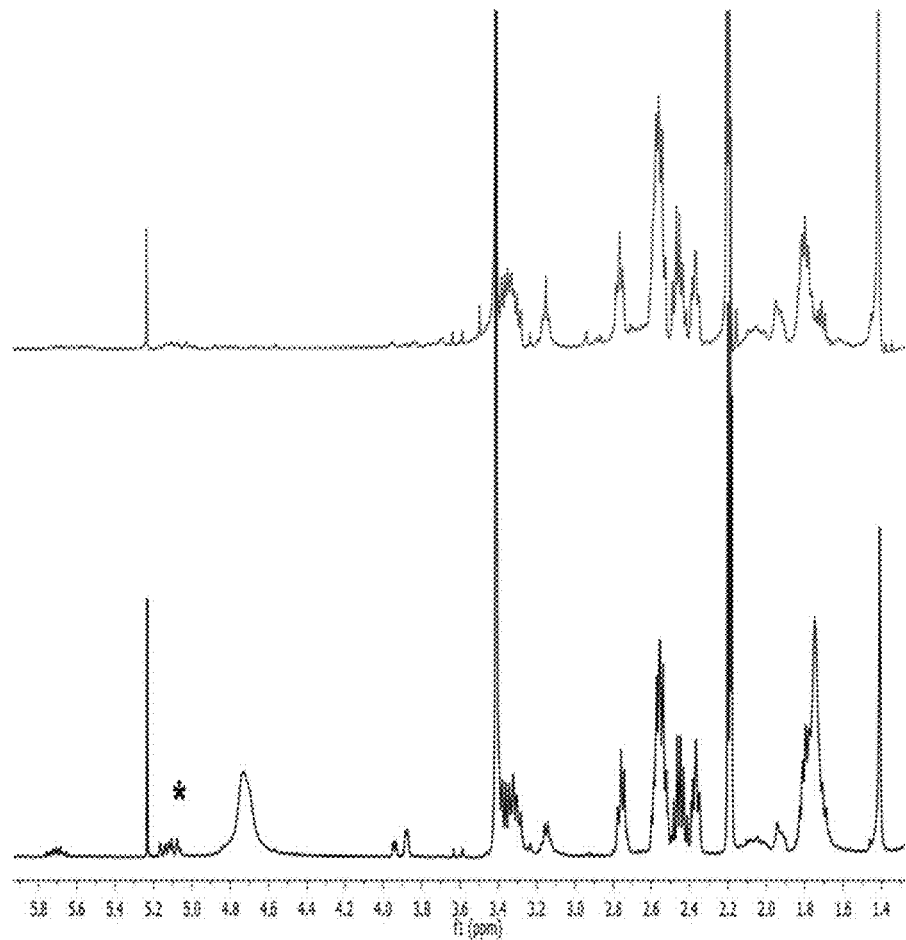

Cleavage of polymer from fluorous tag

Figure 55 LC-MS of polymer after cleaving from fluorous tag

| Code# | Structure | IUPAC Name | Exact mass |
|---|---|---|---|
| 1A | | N-allylacrylamide | 111.07 |
| 2A | | N-allyl-N-methylacrylamide | 125.08 |
| 3A | | N-allyl-N-propylacrylamide | 153.12 |
| 4A | | N-allyl-N-isobutylacrylamide | 167.13 |
| 5A | | N-allyl-N-butylacrylamide | 167.13 |
| 6A | | N-allyl-N-phenethylacrylamide | 215.13 |
| 7A | | N-allyl-N-(naphthalen-2-ylmethyl) acrylamide | 251.13 |

Figure 59 (cont.)

| | | | |
|---|---|---|---|
| 8A | | N-allyl-N-(2-hydroxyethyl)acrylamide | 155.09 |
| 9A | | N-allyl-N-(2-(dimethylamino)ethyl)acrylamid | 182.14 |
| 10A | | tert-butyl (2-(N-allylacrylamido)ethyl)carbamate | 254.16 |
| 11A | | N-allyl-N-(2-((5-(dimethylamino)naphthalene)-1-sulfonamido)ethyl)acrylamide | 387.16 |
| 12A | | N-allyl-N-tridecylacrylamide | 293.27 |
| 13A | | N-allyl-N-(2,5,8,11-tetraoxatridecan-13-yl)acrylamide | 351.19 |
| 14A | | 2-(N-allylacrylamido)ethane-1-sulfinic acid | 203.06 |

SEQUENCE-DEFINED POLYMERS AND METHODS OF MAKING SAME AND USING SAME

CROSS-REFERENCE TO RELATED APPLICATIONS

This application is a divisional application of U.S. Non-Provisional Application Ser. No. 14/830,374, filed on Aug. 19, 2015, which claims priority to U.S. Provisional Patent Application No. 62/039,174, filed on Aug. 19, 2014, the disclosures of which are incorporated herein by reference in their entirety.

BACKGROUND OF THE DISCLOSURE

Biological systems have long recognized the importance of macromolecular diversity and have evolved efficient processes for the rapid synthesis of sequence-defined biopolymers. However, achieving sequence-control via synthetic methods has proven to be a difficult challenge.

Spatial control of monomer sequence along a polymer backbone is essential to the complex self-assembly of proteins and nucleic acids. To achieve macromolecular diversity, biological systems have evolved extremely efficient processes for the rapid synthesis of sequence-defined biopolymers virtually error free. Similarly, achieving primary sequence control using synthetic monomers should facilitate control over structural properties such as folding, self-assembly into nanostructures, structural stimuli response and formation of catalytic sites. These structural properties will invariably determine bulk material properties including solubility, conductivity, elasticity, non-fouling, biocompatibility, and catalytic performance. Understanding sequence-structure-material property relationships is of paramount importance towards our ability to carry out predictive bottom-up materials design and fabrication. Progress towards this goal requires the development of reliable methods for achieving precise polymeric sequence-control. However, current approaches to sequence-control are plagued by long assembly times and low yields due to the tedious protection and deprotection steps required for iterative sequence-controlled monomer ligation.

SUMMARY OF THE DISCLOSURE

A method of making a sequence-defined polymer (SDP). In an embodiment, the method comprises: a) contacting a first monomer having either a free allyl group or acrylamide group and a first co-monomer having two thiol groups capable of reacting with the allyl group and the acrylamide group of the first monomer under conditions such that the allyl group or acrylamide group reacts with one of the thiol groups on the co-monomer to form a first SDP reaction product; b) contacting the first SDP reaction product with a second monomer having an allyl group and acrylamide group such that i) the acrylamide group of the second monomer reacts with a thiol group of the first SDP reaction product without substantial reaction of the allyl group of the second monomer or ii) the allyl group of the second monomer reacts with the unreacted thiol group of the first SDP reaction product without substantial reaction of the acrylamide group of the second monomer to form a second SDP reaction product; c) optionally, contacting the second SDP reaction product with a second co-monomer having two thiol groups such that i) if the allyl group of the second monomer reacted in b), the acrylamide group of the second SDP product reacts with one of the thiol groups of the second co-monomer or ii) if the acrylamide group of the second monomer reacted in b), the allyl group of the second SDP product reacts with one of the thiol groups of the second co-monomer to form a third SDP reaction product; d) optionally, contacting the third SDP reaction product with a third monomer having an allyl group and acrylamide group such that i) the acrylamide group of the third monomer reacts with the unreacted thiol group of the third SDP reaction product without substantial reaction of the allyl group of the third monomer or ii) the allyl group of the third monomer reacts with the unreacted thiol group of the third SDP reaction product without substantial reaction of the acrylamide group of the third monomer to form a fourth SDP reaction product; and e) optionally, repeating c) and d) from 1 to 47 or 1 to 97 times such that a sequence-defined polymer having 3 to 50 or 3 to 100 monomer units is formed, where a SDP reaction product is a sequence-defined polymer.

In an embodiment, the method of making a sequence-defined polymer comprises, in a) a first monomer having a free allyl group is contacted with a first co-monomer under conditions such that allyl group reacts with one of the thiol groups on the co-monomer to form a first SDP reaction product; in b) the first SDP reaction product is contacted with a second monomer having an allyl group and acrylamide group such that the acrylamide group of the second monomer reacts with the unreacted thiol group of the first SDP reaction product without substantial reaction of the allyl group of the second monomer to form a second SDP reaction product; in c) optionally, the second SDP reaction product is contacted with a second co-monomer having two thiol groups such that the allyl group of the second SDP product reacts with one of the thiol groups of the second co-monomer to form a third SDP reaction product; in d) optionally, the third SDP reaction product is contacted with a third monomer having an allyl group and acrylamide group such that the acrylamide group of the third monomer reacts with the unreacted thiol group of the third SDP reaction product without substantial reaction of the allyl group of the third monomer to form a fourth SDP reaction product. In one embodiment, the monomer may be tethered to a cleavable fluorous tag.

In an embodiment, the monomer is an allyl acrylamide. In an embodiment, the co-monomer is an alkyl dithiol, where the alkyl chain of the alkyl dithiol has 1 to 20 carbons or a substituted aminothiol, where the alkyl chain of the substituted aminothiol has 1 to 20 carbons. In an embodiment, the ratio of monomer or sequence-defined polymer to co-monomer is 1:0.5 to 1:10 or 1:0.5 to 1:5.

In an embodiment, the first monomer has a fluorous tag and a sequence-defined polymer having a fluorous tag is formed. In an embodiment, the reaction products having a fluorous tag are contacted with a silica having fluorous moieties and the combination of the reaction products having a fluorous tag and silica having fluorous moieties are subsequently washed with a fluorophobic mixture (e.g. water:methanol) such that non-fluorous materials are removed from the column and then washed with a fluorophilic mixture (e.g. 100% methanol) to remove the reaction products having a fluorous tag from the column. In an embodiment, the sequence-defined polymer having an attached fluorous tag is treated with an acid or basic solution such that the fluorous tag is removed and the sequence-defined polymer is formed.

In an embodiment, the sequence-defined polymer has 2 to 50 monomer units. In an embodiment, the sequence-defined polymer has at least 4 repeat units. In an embodiment, the sequence-defined polymer is made by a method of the instant disclosure.

BRIEF DESCRIPTION OF THE FIGURES

FIG. 7. Kinetics experiment of Michael addition. $^1$H-NMR spectra of the N-methyl allyl acrylamide (0.1 mmol) in $CD_3OH$ (600 μL) was recorded and taken at the 0 min time point. 1,3-propanedithiol (0.2 mmol) and $Me_2$PhP (5 mol % of N-methyl allyl acrylamide) were added to that solution, mixed quickly and a $^1$H-NMR spectrum was recorded every minute. We made sure that the addition, mixing and recording of the first $^1$H-NMR was done within one minute. The progress of the Michael addition was monitored via disappearance of acryloyl olefin proton signal at 6.74 ppm. The percentage of the reaction was determined by relative integration of $^1$H NMR signals at 6.74 ppm and 2.49 ppm which remained constant throughout the reaction. (i) Partial $^1$H-NMR spectra (400 MHz, $CD_3OH$) of Michael addition reaction mixture at different time intervals and (ii) kinetic plot of the reaction progress.

FIG. 49. $^1$H NMR (400 MHz, CDCl$_3$) of thiol-ene reaction of the product from FIG. 47 (1 equivalent) and 1,3 propane dithiol (5 equivalents) in presence of DMPA (0.25 equivalent), hv (20 mW/cm$^2$), MeOH; "•" and "*" represent the SH and olefin protons respectively.

FIG. 58. Chemical structure of some synthesized polymers.

FIG. 59. Chemical structure of some monomers with code #, IUPAC name and exact mass.

DETAILED DESCRIPTION OF THE DISCLOSURE

Figure 1:
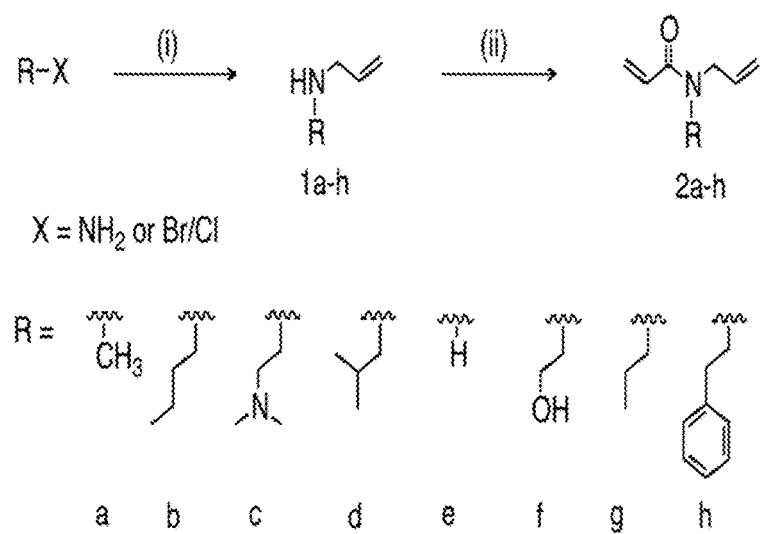
FIG. 1. Example of preparation of monomers of the present disclosure. (i) For X=$NH_2$; $K_2CO_3$, allyl bromide (0.2 eq.). For X=Br/Cl; $K_2CO_3$, allyl amine (5 eq.) (ii) Acryloyl chloride (1 eq.), $Et_3N$, $CH_2Cl_2$.

As used herein, the term "alkyl chain" refers to branched or unbranched hydrocarbons. Examples of such alkyl chains include methyl chains, ethyl chains, n-propyl chains, i-propyl chains, n-butyl chains, i-butyl chains, s-butyl chains, pentyl chains, hexyl chains, heptyl chains, and octyl chains. For example, the alkyl group can be a $C_1$ to $C_{20}$ alkyl chain, including all integer numbers of carbons and ranges of numbers of carbons therebetween. Alkyl chains can be terminal alkyl chains or alkyl chains covalently bonded to two functional groups. Alkyl chains can be substituted with various other functional groups. Example of substituent functional groups include halides (—F, —Cl, —Br, and —I), alkoxides, carboxylates, carboxylic acids, and ether groups. Alkyl chain also includes the alkyl moiety of an alkoxide group.

As used herein, the term "cycle" refers to a saturated or partially unsaturated carbocyclic group (aromatic) of from 4 carbons to 11 carbons having a single cyclic ring or multiple condensed rings. The cycle can be an aromatic cycle or a non-aromatic cycle. The cycles can be terminal cycles or cycles covalently bonded to two functional groups. For example, the cycloalkyl groups can be cyclobutane, cyclopentane, cyclohexane, cyclohexene, cycloheptane, cycloheptene, bicyclo[2.1.1]hexane, bicyclo[2.2.1]heptane, bicyclo[2.2.2]octane, bicyclo[3.3.0]octane, bicyclo[4.4.0]octane, and the like. The cycloalkyl groups can be unsubstituted or substituted with groups such as, for example, alkyl chain(s), carbonyl group(s), or halogen(s). Cycles include carbocycles and heterocycles.

As used herein, the term "carbocycle" refers to a cyclic compound having a ring where all of the atoms forming the ring are carbon atoms. The carbocycle ring can be aromatic or nonaromatic, and include compounds that are saturated and partially unsaturated, and fully unsaturated. The carbocycles can be terminal carbocycles or carbocycles covalently bonded to two functional groups. Examples of such groups include cyclopentane, cyclopentene, cyclohexane, cyclohexene, cyclohexanone, cyclopentanone, cyclopentanol, indane, indanone, phenyl, naphthyl and the like. For example, the carbocycle ring is a $C_5$ to $C_7$ carbocyclic ring, including all integer numbers of carbons and ranges of numbers of carbons therebetween. The carbocycle ring can be unsubstituted or substituted with groups such as, for example, alkyl chain(s), carbonyl group(s), or halogen(s).

As used herein, the term "heterocycle" refers to a cyclic compound having a ring where at least one or more of the atoms forming the ring is a heteroatom (e.g., oxygen, nitrogen, sulfur, etc.). The heterocyclic ring can be aromatic or nonaromatic, and include compounds that are saturated, partially unsaturated, and fully unsaturated. The heterocycles can be terminal heterocycles or heterocycles covalently bonded to two functional groups. Examples of such groups include furan, thiophene, oxazole, isoxazole, thiazole, oxadiazole, thiadiazole, triazole, tetrazole, oxazoline, lactam, lactone, dihydrofuran, tetrahydrofuran, furanone, oxazolone, pyridinone, pyrimidinone, dihydropyridazine, pyranone, oxazinone, and the like. For example, the heterocyclic ring can be a 5 to 7 membered ring containing a number of carbon atoms ranging between 2 and 6 and a number of heteroatoms ranging between 1 and 4. The heterocyclic ring can be unsubstituted or substituted with groups such as, for example, alkyl chain(s), carbonyl group(s), or halogen(s).

The present disclosure provides sequence-defined polymers (SDPs). Also provided are methods of making the SDPs and uses of the polymers.

Figure 60:
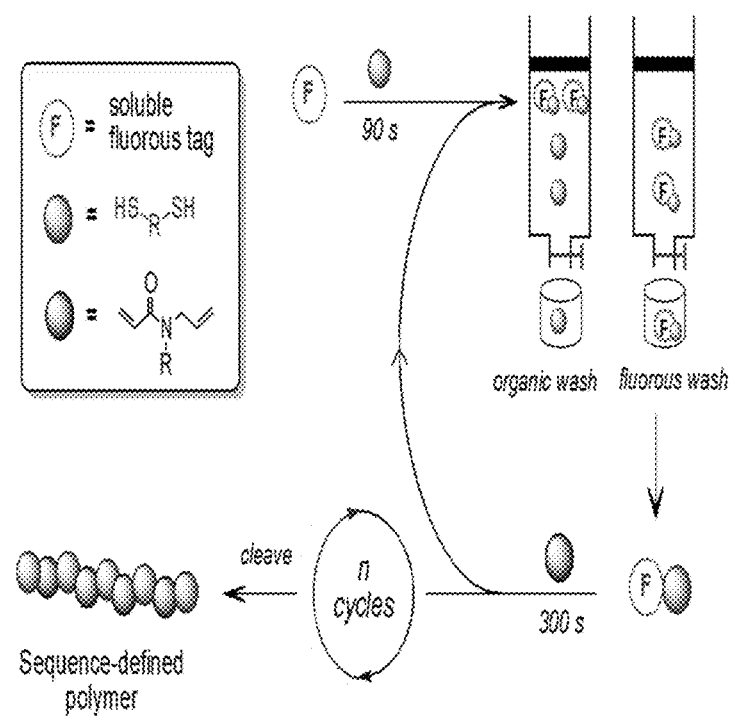
FIG. 60. Fluorous Assisted Sequence Control via Allyl Acrylamides and Dithiols

The methods of the present disclosure enable large-scale production of sequence-controlled polymers with massive structural diversity. The instant methods provide an efficient strategy for the assembly of sequence-defined polymers via unique allyl acrylamide building blocks with orthogonal reactive sites that can be, for example, coupled with a powerful fluorous separation technology (FIG. 60—Scheme 1). The latter allows decoupling of the monomer reaction from purification by performing monomer addition in solution and polymer purification on a supported solid-phase.

In an aspect, the disclosure provides methods of making SDPs. The methods use a monomer having two or more functional groups (the monomers may have additional functional groups that do not react during the polymerization reactions) that react with a co-monomer under orthogonal conditions (i.e., a monomer with orthogonal functional groups). By "orthogonal conditions" it is meant that two functional groups on the monomer (a first functional group and a second functional group) react under conditions such that the first functional group reacts without any detectible reaction (such as by $^1$H NMR) of the second functional group and the second functional group reacts without any detectible reaction of the first functional group (such as by $^1$H NMR).

In an embodiment, a method of making a sequence-defined polymer (SDP) comprises:

a) contacting a first monomer having a free allyl group or acrylamide group (e.g., either a free allyl group or acrylamide group) and a first co-monomer having two thiol groups capable of reacting with the allyl group and the acrylamide group of the first monomer under conditions such that the allyl group or acrylamide group reacts with one of the thiol groups on the co-monomer to form a first SDP reaction product;

b) contacting the first SDP reaction product with a second monomer having an allyl group and acrylamide group such that i) the acrylamide group of the second monomer reacts with a thiol group of the first SDP reaction product without substantial reaction of the allyl group of the second monomer or ii) the allyl group of the second monomer reacts with the unreacted thiol group of the first SDP reaction product without substantial reaction of the acrylamide group of the second monomer to form a second SDP reaction product;

c) optionally, contacting the second SDP reaction product with a second co-monomer having two thiol groups such that i) if the allyl group of the second monomer reacted in b), the acrylamide group of the second SDP product reacts with one of the thiol groups of the second co-monomer or ii) if the acrylamide group of the second monomer reacted in b), the allyl group of the second SDP product reacts with one of the thiol groups of the second co-monomer to form a third SDP reaction product;

d) optionally, contacting the third SDP reaction product with a third monomer having an allyl group and acrylamide group such that i) the acrylamide group of the third monomer reacts with the unreacted thiol group of the third SDP reaction product without substantial reaction of the allyl group of the third monomer or ii) the allyl group of the third monomer reacts with the unreacted thiol group of the third SDP reaction product without substantial reaction of the acrylamide group of the third monomer to form a fourth SDP reaction product; and e) optionally, repeating c) and d) from 1 to 47 times or 1 to 97 times such that a sequence-defined polymer having 3 to 50 or 3 to 100 monomer units is formed, where a SDP reaction product is a sequence-defined polymer. In an embodiment, the first monomer and/or second monomer and/or third monomer has one or two allyl groups and one acrylamide group and at least one of the groups (e.g., an allyl group or acrylamide group is free).

In an embodiment, a method of making a sequence-defined polymer (SDP) comprises: a) contacting a first monomer having a free allyl group and a first co-monomer having two thiol groups capable of reacting with the allyl group of the first monomer under conditions such that allyl group reacts with one of the thiol groups on the co-monomer to form a first SDP reaction product; b) contacting the first SDP reaction product with a second monomer having an allyl group and acrylamide group such that the acrylamide group of the second monomer reacts with the unreacted thiol group of the first SDP reaction product without substantial reaction of the allyl group of the second monomer to form a second SDP reaction product; c) optionally, contacting the second SDP reaction product with a second co-monomer having two thiol groups such that the allyl group of the second SDP product reacts with one of the thiol groups of the second co-monomer, without substantial reaction of the acrylamide group to form a third SDP reaction product; d) optionally, contacting the third SDP reaction product with a third monomer having an allyl group and acrylamide group such that the acrylamide group of the third monomer reacts with the unreacted thiol group of the third SDP reaction product without substantial reaction of the allyl group of the third monomer to form a fourth SDP reaction product; and e) optionally, repeating c) and d) from 1 to 47 times or 1 to 97 times such that a sequence-defined polymer having 3 to 50 or 3 to 100 monomer units is formed, where a SDP reaction product is a sequence-defined polymer. In embodiment, the first monomer and/or second monomer and/or third monomer has one or two allyl groups and one acrylamide group and at least one of the groups (e.g., an allyl group or acrylamide group is free).

The monomer has at least two functional groups that react under orthogonal conditions (i.e., a monomer with orthogonal functional groups). In the case where the monomer has two functional groups (e.g., an allyl group and an acrylamide group), the two groups react under orthogonal conditions. The first monomer used has only one functional group that can react under one of the orthogonal polymerization conditions (i.e., the other functional group is blocked (e.g., reacted to form a functional group that is not reactive under one of the orthogonal polymerization conditions) or tagged (e.g., tagged with a fluorous tag)). The monomers may have additional functional groups that do not react during the polymerization reactions.

By "orthogonal conditions", it is meant that one (or one group) of functional groups of the monomer reacts without substantial reaction of the other functional groups of the monomer. By "substantial reaction" it is meant that 5% or less of the other functional groups react in the reaction one (or one group) of functional groups of the monomer. In various embodiments, 4% or less, 3% or less, 2% or less, 1% or less of the other functional groups react in the reaction one (or one group) of functional groups of the monomer. In an embodiment, there is no detectible reaction of the other functional groups in the reaction one (or one group) of functional groups of the monomer. The reaction of the one (or one group) of the functional groups of the monomer or other functional groups of the monomer can be detected by methods known in the art. For example, the reaction of these functional groups can be detected by NMR spectroscopy.

Examples of functional groups that can react under orthogonal conditions include allyl and acrylamide groups, allyl and methacrylamide groups, methacrylamide and alkyne groups, allyl and vinylsulfone groups, vinylsulfone and acrylamide groups, vinylsulfones and methacrylamides, and many others. In an embodiment, the monomer has an allyl group and an acrylamide group.

Monomers having three or more functional groups that react under orthogonal conditions may be used. Monomers that have one or more functional groups that can react two or more times (e.g., an alkyne group) can be used. Use of these monomers results in formation of branched SDP products and SDPs.

Monomers and co-monomers are selected to provide a desired SDP product and SDP. The monomers are selected to provide a desired structural element (derived from a monomer or co-monomer) at desired positions in the SDP product or SDP. Various combinations of monomers can be used to provide a desired structural element at desired positions in the SDP product or SDP.

In an embodiment, the monomer has the following structure:

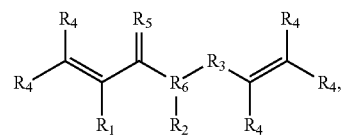

where [X] is any halogen, [A] is any atom except a hydrogen, [Q] is any atom except carbon or hydrogen [Ak] is any alkyl chain, [Cy] is a cycle ([Cy] includes [Cb] and [Hy]), [Cb] is a carbocycle, and [Hy] is a heterocycle. $R_1$ is selected from [Ak], [Cy], and hydrogen atom. $R_2$ is selected from [Ak], [Cy], [X], and hydrogen atom when $R_6$ is a nitrogen atom. When $R_6$ is not a nitrogen atom then $R_2$ is absent. $R_3$ is selected from [Ak] and [Cy]. $R_4$ is independently selected from [Ak], [Cy], and hydrogen atom. $R_5$ is selected from an oxygen, sulfur, and nitrogen atom. $R_6$ is selected from an oxygen, sulfur, and nitrogen atom. In various embodiments, $R_1$ is a hydrogen atom or a methyl group (—CH$_3$), $R_4$ is a hydrogen atom, $R_5$ is an oxygen atom, and/or $R_6$ is a nitrogen atom.

In an embodiment, the monomer has the following structure:

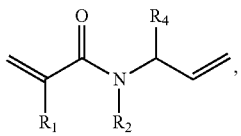

where $R_1$ is selected from [Ak], [Cy] or hydrogen atom. $R_2$ is selected from [Ak], [Cy], [X] or hydrogen. $R_4$ is selected from [Ak], [Cy], or hydrogen atom. For example, $R_1$ is a hydrogen atom or a methyl group (—CH$_3$). In another example, $R_1$ is a hydrogen atom or a methyl group, $R_2$ is a hydrogen atom, [Ak], or [Cy], and $R_4$ is a hydrogen atom or [Ak]. In yet another example, $R_2$ contains one or more alkenyl groups.

In an embodiment, the monomer has the following structure:

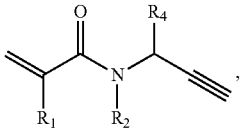

where $R_1$ is selected [Ak], [Cy] or hydrogen atom. $R_2$ is selected from [Ak], [Cy], [X] or hydrogen. $R_4$ is selected from [Ak], [Cy], or hydrogen atom. For example, $R_1$ is a hydrogen atom or a methyl group (—CH$_3$), $R_2$ is a hydrogen atom, and $R_4$ is a hydrogen atom or [Ak].

In an embodiment, the monomer is an allyl acrylamide. Examples of suitable allyl acrylamides are shown in FIG. 59.

The co-monomer has two functional groups that react with the orthogonal functional groups of the monomer under orthogonal conditions. The co-monomers may have additional functional groups that do not react during the polymerization reactions.

Examples of co-monomer functional groups include thiols and secondary amines. In an embodiment, the co-monomer has two thiol groups or a thiol group and a secondary amine functional group.

In an embodiment, the co-monomer has the following structure:

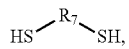

where [A] is any atom except a hydrogen, [Ak] is any alkyl chain, and [Cy] is any cycle, and where $R_7$ is independently selected from any [A], [Ak] or [Cy]. In an embodiment, the co-monomer is alkyl dithiol, where the alkyl chain of the alkyl dithiol has 1 to 20 carbons.

In an embodiment, the co-monomer is an alkyl dithiol. The alkyl chain (e.g., $R_7$) can have 1 to 20 carbons, including all integer number of carbons and ranges therebetween. The alkyl moiety can be substituted or unsubstituted and/or branched or linear. Examples of suitable alkyl dithiols include: ethane dithiol, DTT, PEG dithiol and

| Structure | IUPAC Name | Exact mass |
|---|---|---|
| HS⌒⌒SH | 1,3-propanedithiol | 108.01 |
| HS⌒(CH$_2$SH)COOH | 3-mercapto-2-(mercaptomethyl) propanoic acid | 152 |

In an embodiment, the orthogonal reactions are a thiol-ene reaction (e.g., a photo-initiated thiol-ene reaction) and a Michael addition reaction (a phosphine catalyzed Michael addition). In an embodiment, the monomer is an allyl acrylamide and the co-monomer is an alkyl dithiol.

In an embodiment, the co-monomer has the following structure:

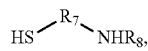

where [A] is any atom except a hydrogen, [Ak] is any alkyl chain, and [Cy] is any cycle, and where $R_7$ is independently selected from [A], [Ak] or [Cy] and $R_8$ is an alkyl chain.

In an embodiment, the co-monomer is an aminothiol. The alkyl chain of the aminothiol (e.g., $R_7$) can have 1 to 20 carbons, including all integer number of carbons and ranges therebetween. The alkyl chain that is a terminal substituent of the amine moiety (e.g., $R_8$) can have 1 to 20 carbons, including all integer number of carbons and ranges therebetween. The alkyl moieties, independently, can be substituted or unsubstituted and/or branched or linear.

It is desirable that the polymerization reactions have fast kinetics. In an embodiment, each of the polymerization reactions is complete in 600 seconds or less. In various embodiments, each of the polymerization reactions is complete in 300 seconds or less or 100 seconds or less. In an embodiment, the each of the polymerization reactions is complete in 1 to 600 seconds, including all integer second values and ranges therebetween. In other embodiments, the each of the polymerization reactions is complete in 1 to 300, or 1 to 100 seconds. By complete it is meant that the limiting reagent (the monomer, co-monomer, or SDP) is not detectible by, for example, NMR spectroscopy.

A low ratio of monomer to co-monomer or sequence-defined polymer intermediate to monomer or co-monomer monomer may be used. In an embodiment, the ratio of monomer to co-monomer or sequence-defined polymer intermediate to monomer or co-monomer is 1:0.5 to 1:10, including all values to 0.1 and ranges therebetween. In another embodiment, the ratio of monomer to co-monomer or sequence-defined polymer intermediate to monomer or co-monomer is 1:0.5 to 1:5.

Determination of the reaction conditions (e.g., reaction time and temperature) required to make a desired SDP are within the purview of one having skill in the art. Suitable reaction times include thiol-ene: 90-300 seconds and Michael addition: 5-60 minutes, reaction temperature can be room temperature to 60° C., 0.1-20 mol % catalyst.

Each reaction (e.g., addition of monomer or co-monomer) can be carried out at high yield. For example, at 4 mg reaction scale the yield (including purification) of each step is greater than 86% and at 20 mg scale the yield (including purification) of each step is greater than 97%.

During polymerization, the SDP product of each monomer and/or co-monomer addition can be purified. To facilitate such purification, a monomer conjugated to a solid support or a monomer having a fluorous tag may be used.

In an embodiment, a monomer having a fluorous tag (for example the first monomer used) is used. This tagged SDP product allows for removal of non-fluorous materials (e.g., unreacted monomer and/or co-monomer, solvent, etc.) from the reaction mixture at any point. For example, the reaction mixture at any point can be contacted with a fluorous silica material (e.g., in a cartridge). The fluorous tagged SDP product is retained by the fluorous silica material and non-fluorous materials can be removed by washing the fluorous silica material with a solvent or mixture of solvents (e.g., aqueous methanol) and subsequently the fluorous tagged SDP product is separated from the fluorous silica materials by washing a solvent or mixture of solvents (e.g., methanol).

In an embodiment, the fluorous tag is removed from the SDP. For example, the fluorous tag is removed by treatment with acid.

The steps of the method described in the various embodiments and examples disclosed herein are sufficient to carry out the methods of the present disclosure. Thus, in an embodiment, the method consists essentially of a combination of the steps of the methods disclosed herein. In another embodiment, the method consists of such steps.

Multivalent ligands can be formed by attaching one or more ligands to functional groups on the SDP scaffold. SDPs can be synthesized to form branched structures via the use of a propargylacrylamide monomer.

In an aspect, the disclosure provides SDPs. The polymers can be made by the methods disclosed herein. Accordingly, in an embodiment, the SDPs are made by a method disclosed herein. Examples of the SDPs are shown in Table 1 and FIG. 58.

SDPs having a desired primary structure (e.g., number, order, and identity of monomers and co-monomers) are disclosed herein and can be made using the methods described herein. In an embodiment, the SDP does not have a primary structural element (i.e., monomer and co-monomer unit) that is repeated in the SDP. The SDPs are discrete compounds (i.e., they have PDI of 1). In various embodiments, the SDP is not a homopolymer or block co-polymer, where the homopolymer, block co-polymer, or any individual block of the block co-polymer has a PDI greater than 1. In an embodiment, the SDP does not have adjacent monomers having the same structure. SDP's have an abiotic backbone, which renders them inherently resistant to serum proteases. SDP's have a tuneable dithioether backbone. SDP assembly is fast and uses a liquid or solid support, and monomer diversity for SDP assembly is large.

The SDPs can have a variety of sizes (e.g., molecular weight and number of repeat units). Repeat units is the number of monomer and co-monomer units in the SDP. In an embodiment, the SDP has 2 to 50 repeat units, including all integer number of repeat units and ranges therebetween. In various embodiments, the SDP has 5 to 40, 5 to 30, 10 to 40, or 10 to 30 repeat units. In various embodiments, the SDP has 2 to 50 repeat units, including all integer number of repeat units and ranges therebetween. In various embodiments, the SDP has at least 4, at least 5, at least 6, at least 7, at least 8, at least 9, at least 10, at least 15 repeat units.

The SDPs can be terminated with monomers or co-monomers. In various embodiments, the SDP is terminated with monomers, with co-monomers, or with a monomer and a co-monomer. In an embodiment, the terminal monomer(s) or co-monomer(s) can be capped by reaction with the terminal functional group with, for example, small molecules, proteins/peptides, or nucleic acids.

TABLE 1

Figure 58:
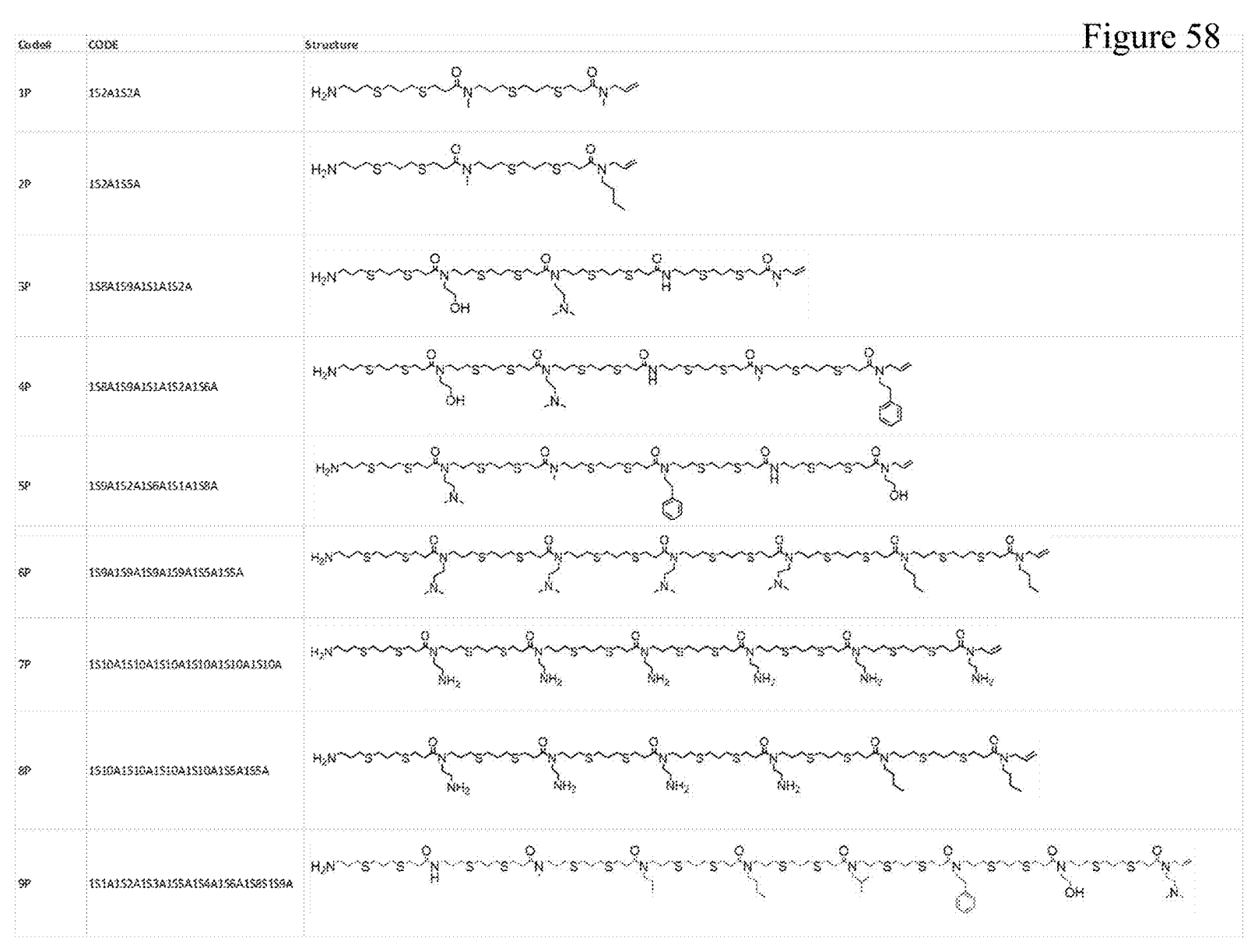

Mass and Number of repeat units for SDPs of FIG. 58.

| Code # | Exact Mass | Repeat Units |
|--------|-----------|--------------|
| 1P | 523.24 | 4-mer |
| 2P | 565.29 | 4-mer |
| 3P | 1062.47 | 8-mer |
| 4P | 1385.61 | 10-mer |
| 5P | 1385.61 | 10-mer |
| 6P | 1767.93 | 12-mer |
| 7P | 1629.76 | 12-mer |
| 8P | 1655.8 | 12-mer |
| 9P | 2197.01 | 16-mer |

In an aspect the disclosure provides uses of the SDPs. The SDPs can be used in various applications. For example, the SDPs (e.g., pH sensitive SDPs) are used in cell lysis methods. In an embodiment, cells are contacted with a SDP or mixture of SDPs such that a portion of the cells or all of the cells are lysed.

In various examples, SDPs can be used as molecular vehicles to transport drug cargo into cells. SDPs in their linear or cyclic forms can be used directly as protein binding-ligands. Large member SDP libraries can be created and screened against different proteins in order to select the a SDP having a desired bonding (e.g., strongest binder) against a protein or pathogen of interest. SDPs that fold into specific rigid secondary structures can also be used to create catalytic pockets for accelerating specific reaction rates (i.e., act a catalysts).

The following examples are presented to illustrate the present disclosure. They are not intended to limiting in any manner.

EXAMPLE 1

The following in an example of methods of the present disclosure, sequence-defined polymers of the present disclosure and characterization of such polymers.

We describe use of orthogonal allyl acrylamide building blocks and a liquid-phase fluorous support for the de novo design and synthesis of sequence-specific polymers. We demonstrate synthesis and characterization of two sequence-isomeric 10-mer polymers. $^1$H NMR and LCMS were used to confirm their chemical structure while tandem MS was used to confirm sequence identity. Further validation of this methodology was provided via the successful synthesis of a sequence-specific 16-mer polymer incorporating nine different monomers. This strategy thus shows promise as an efficient approach for the assembly of sequence-specific functional polymers.

Figure 8:
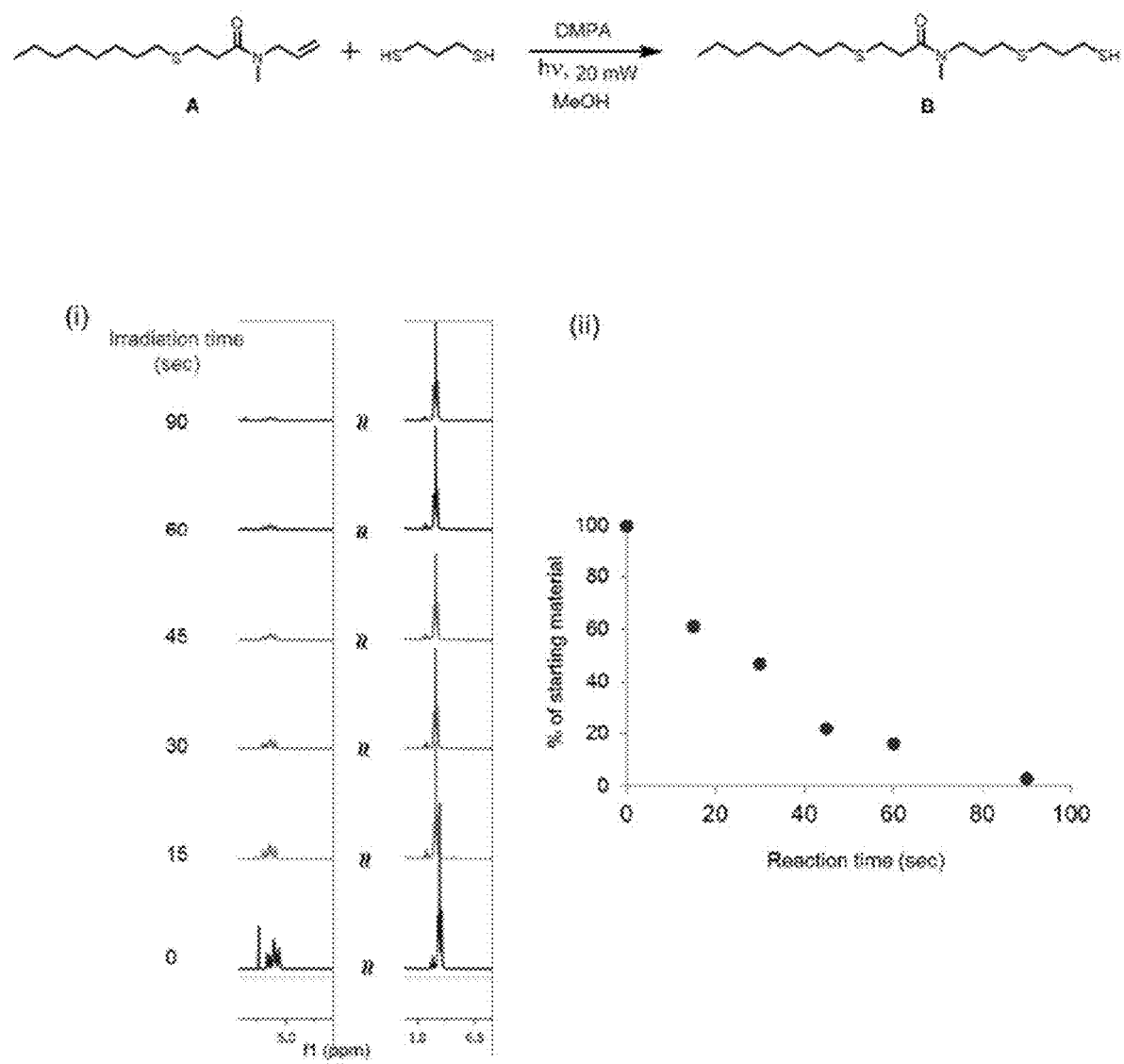
FIG. 8. Kinetics experiment of thiol-ene reaction. Compound A was synthesized by mixing 1-octane thiol and N-methyl allyl acrylamide in presence of 5 mol % propyl amine as catalyst for 24 hours. After removal of propylamine, the reaction was deemed quantitative via $^1$H NMR. 1,3-Propanedithiol (0.1 mmol) and DMPA (5 mol % of 1,3-propanedithiol) were added to a solution of A (0.08 mmol) in methanol (300 μL) to yield compound B. The reaction mixture was UV irradiated for 15 s at 20 mW/cm$^2$. Four other reactions with the same reaction mixtures were performed at the same reaction condition with varying irradiation time, 30 s, 45 s, 60 s and 90 s. $^1$H NMR spectra of the five reaction mixtures were recorded. $^1$H NMR of A was used as the 0 min time point. The progress of the thiol-ene reaction was monitored by the disappearance of olefin proton signal at 5.14 ppm. The reaction progress was monitored via integration of the $^1$H NMR signals at 5.14 ppm relative to that at 0.77 ppm. The latter represents the methyl proton of the octyl group, which remained constant throughout the reaction. (i) Partial $^1$H NMR spectra (400 MHz, $CDCl_3$) of a thiol-ene reaction mixture mentioned above at different time intervals and (ii) kinetic plot of the reaction progress.
Figure 9:
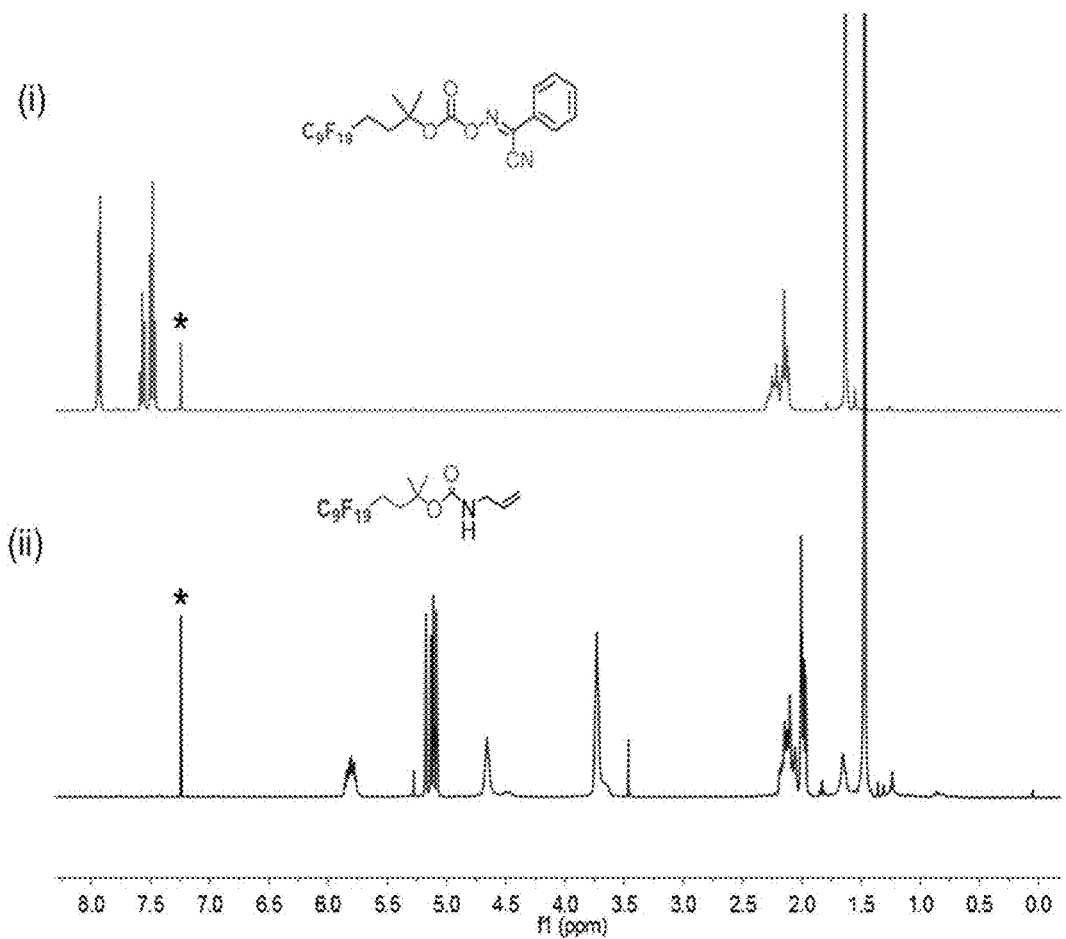
FIG. 9. $^1$H NMR spectra (400 MHz, $CDCl_3$) of (i) fluorous BOC-ON and (ii) BOC protected fluorous allyl amine; "*" represents the residual proton signal of $CDCl_3$.
Figure 10:
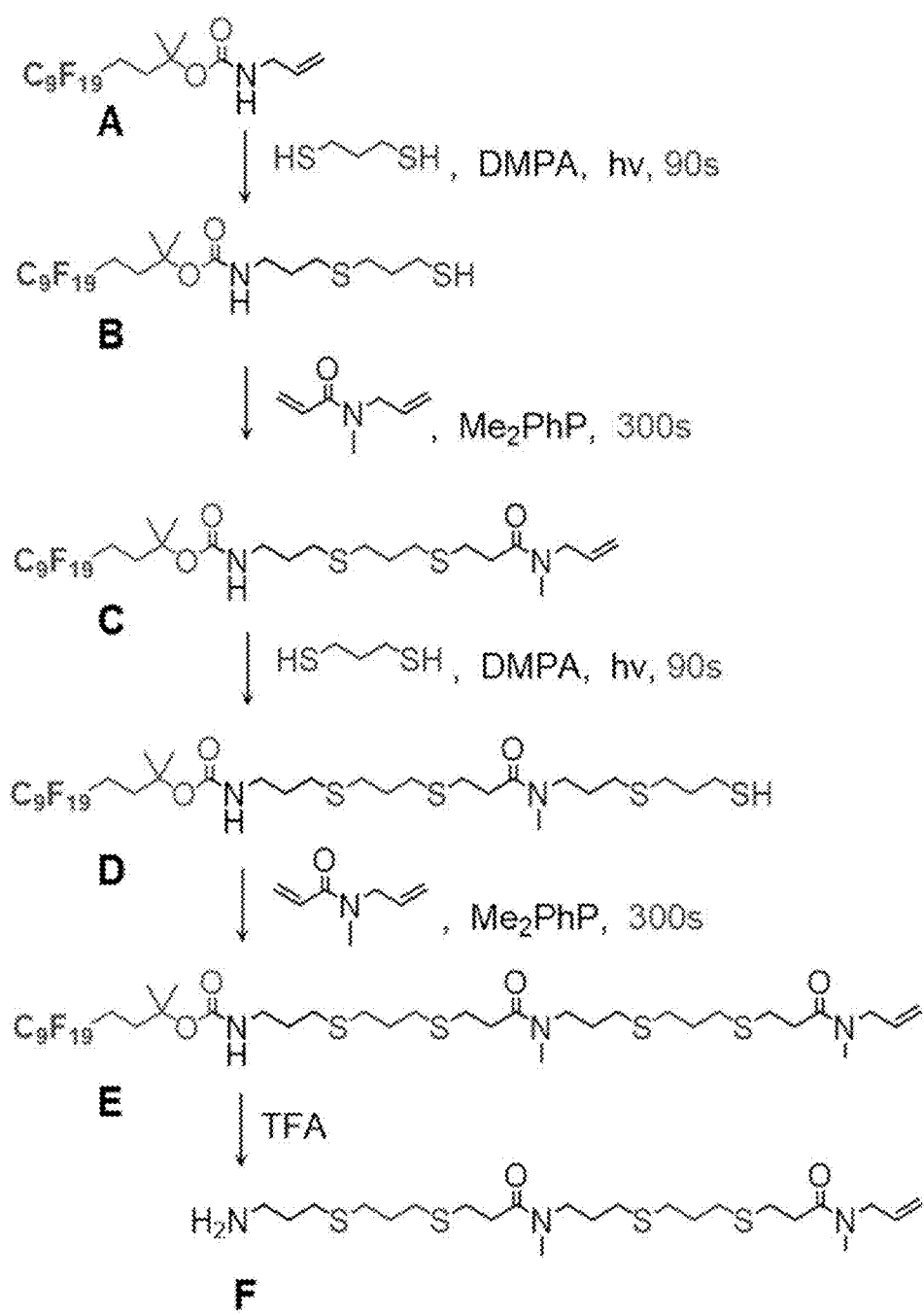
FIG. 10. Synthesis of the test oligomer using N-allyl-N-methylacrylamide and 1,3-propanedithiol.
Figure 11:
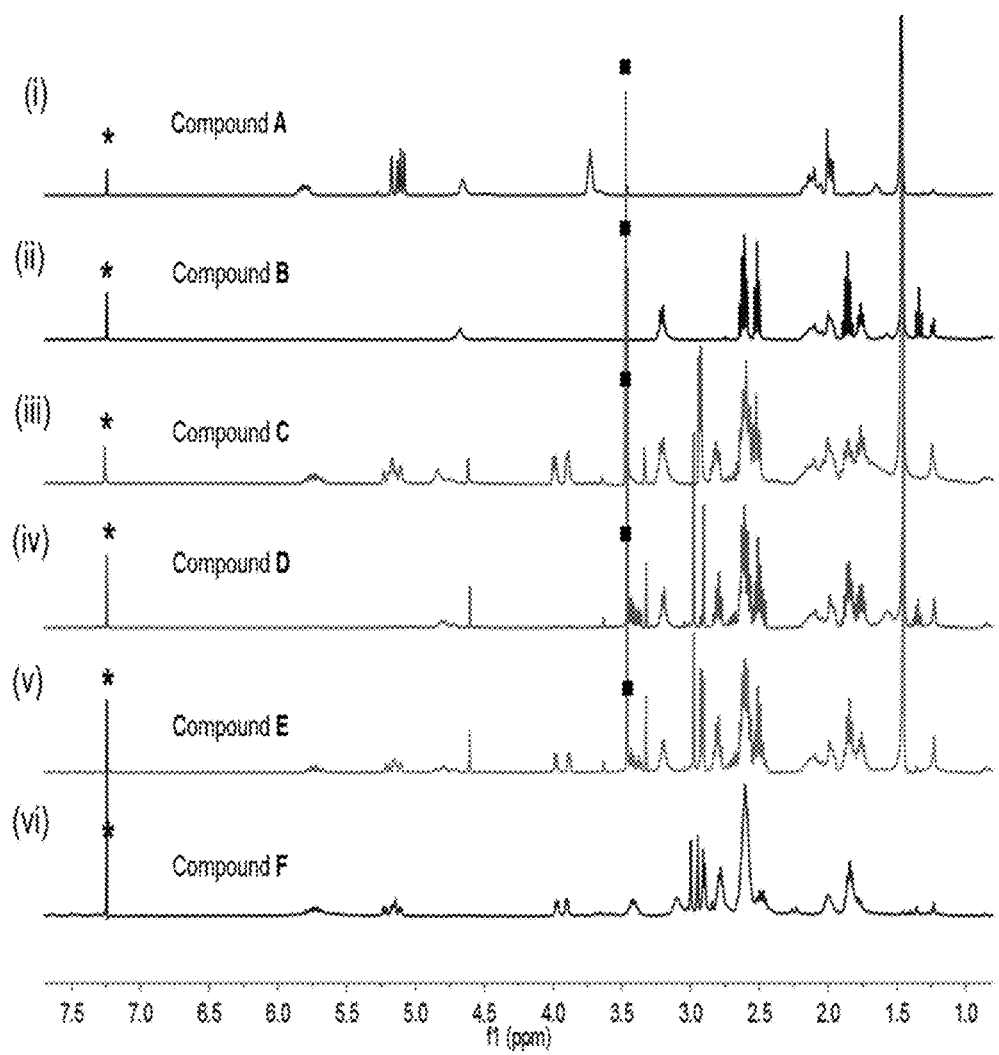
FIG. 11. $^1$H NMR spectra (400 MHz, $CDCl_3$) of (i) A, (ii) B, (iii) C, (iv) D, (iv) E and (v) F from FIG. 10; "*" and "■" represent the residual proton signals of $CDCl_3$ and MeOH respectively.

Our approach for achieving synthetic sequence-control involves the design of a unique monomer with two orthogonal reactive sites to the same nucleophile. The monomer framework includes a reactive acrylamide group that can undergo phosphine-catalyzed Michael addition with thiols, the desired functional group and a reactive allyl group that can undergo photo-initiated thiol-ene "click" addition. These reactions were chosen due to their rapid solution kinetics at room temperature and pressure. Since both reactive ends of the monomer undergo orthogonal reactions with thiols, we reasoned that a dithiol molecule could be used as a co-monomer without the need for protective groups. The allyl acrylamide monomer can be synthesized in two steps from a plethora of primary amines or halides (FIG. 1) and tolerates many functional groups. For this proof-of-concept study, we synthesized eight different allyl acrylamide monomers 2a-h and utilized 1,3-propanedithiol as the co-monomer. In our hands, the phosphine-catalyzed Michael addition of N-allyl-N-methylacrylamide, 2a (FIG. 1) with 1,3-propanedithiol is complete in 540 seconds (FIG. 7), and the photoinitiated thiol-ene reaction of N-allyl-N-methyl-3-(octylthio)acrylamide with 1,3-propanedithiol is complete in 90 seconds (FIG. 8).

We employed fluorous tags as a liquid phase reaction support in order to combine the advantages of both solution-phase and solid-phase iterative syntheses. Fluorous tags are removable perfluorocarbon alkyl chains that are soluble in common organic solvents, yet selectively partition onto a fluorous solid phase. Assembling our sequence-defined polymers on fluorous tags allows us to perform monomer addition in solution while simultaneously benefitting from rapid fluorous solid phase extraction (FSPE) for purification. The advantages of using a fluorous liquid support include homogeneous reaction conditions, fast solution phase kinetics and reaction monitoring via common spectroscopic techniques. Fluorous tags are also inert to most common reaction conditions and are commercially available. We employed a fluorous tag with an acid cleavable Boc functionality to initiate our proof-of-concept studies.

Figure 2:
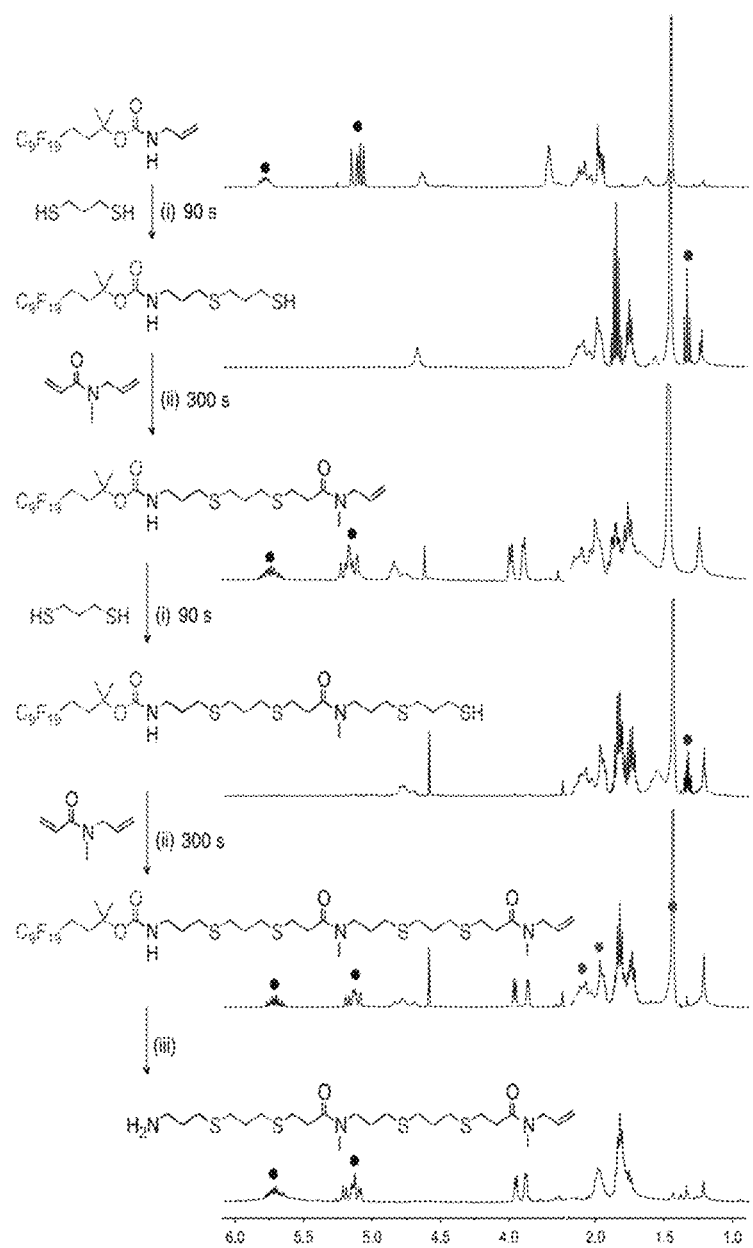
FIG. 2. Example of assembly of a test oligomer with 2a and 1,3-propanedithiol. (i) 2,2-dimethoxy-2-phenyl acetophenone (DMPA), hν (20 mWcm$^2$), MeOH; (ii) $Me_2$PhP, MeOH; (iii) 50% trifluoroacetic acid (TFA) in $CH_2Cl_2$. Fluorous tag is C9F19. Dots between 5-6 ppm—olefin protons, Dots between 1.5 and 2.5 ppm—$CH_2CH_2C(CH_3)_2$ protons on fluorous tag and Dot at 1.4 ppm—SH proton.
Figure 12:
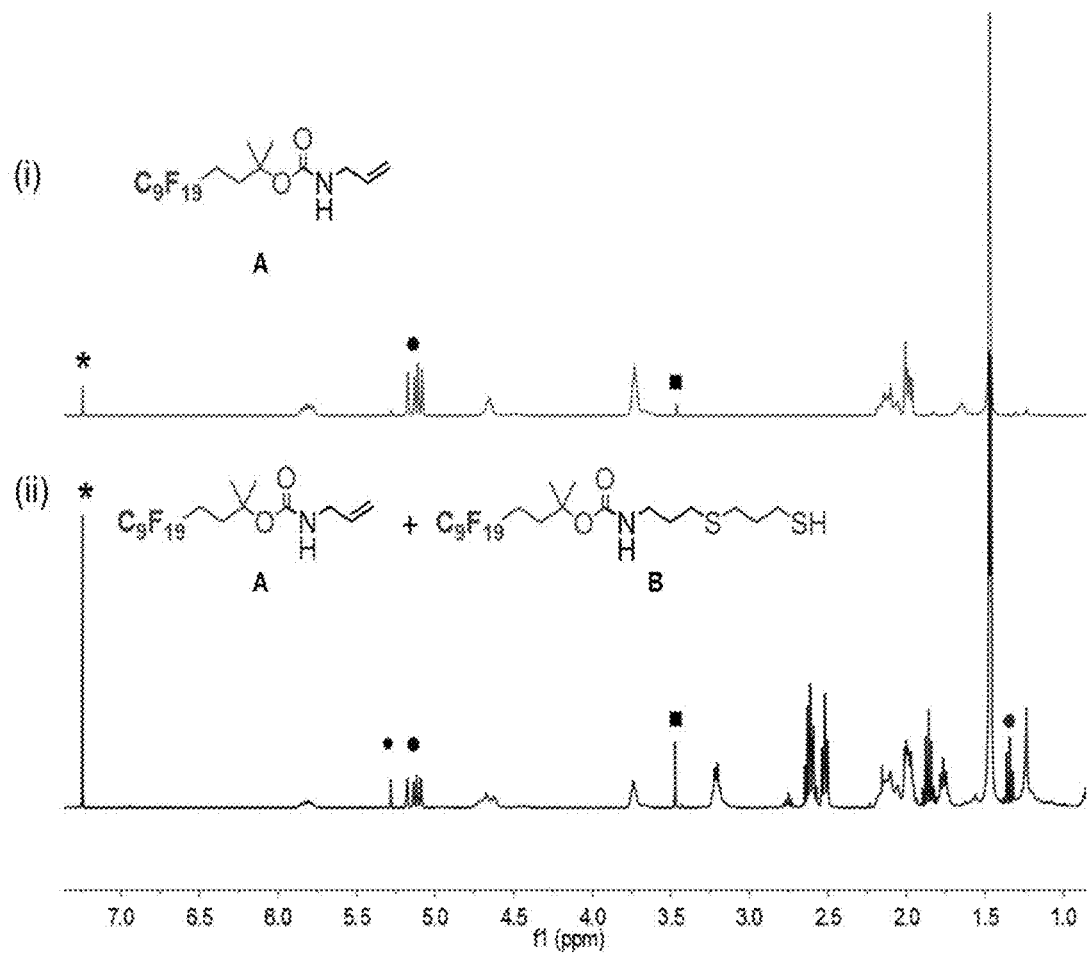
FIG. 12. $^1$H NMR spectra (400 MHz, $CDCl_3$) of (i) A and (ii) reaction mixture of A with 0.5 equivalent 1,3-propanedithiol in presence of 5 mol % of DMPA. The dots represent olefin and thiol proton signals respectively. The presence of olefin signals after the reaction indicates that unreacted olefin was present (50% unreacted remained, calculated by integration). This result suggests that only one thiol of 1,3-propanedithiol reacted with the olefin and the other thiol remains free. "*", "●" and "■" represent the residual proton signals of $CDCl_3$, $CH_2Cl_2$ and MeOH respectively.
Figure 13:
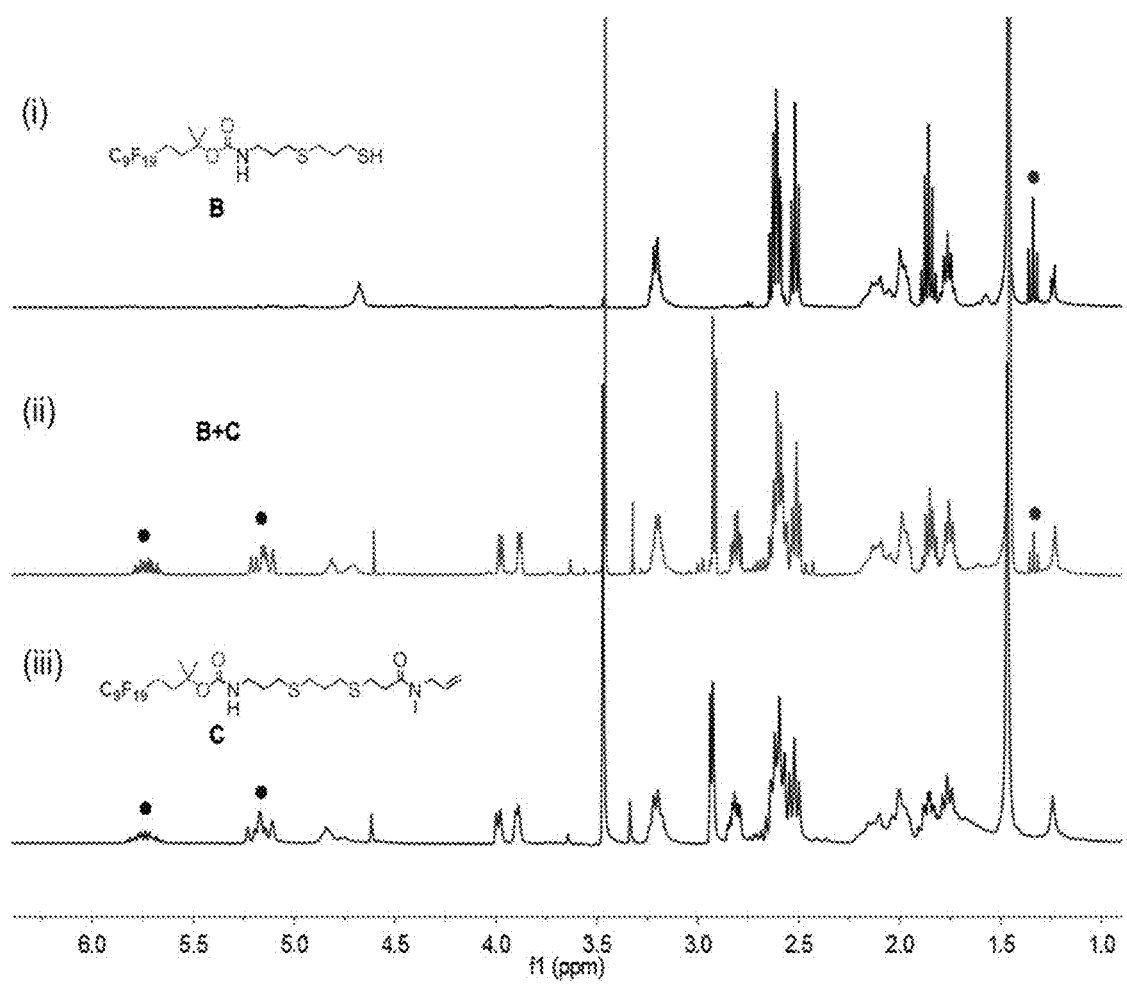
FIG. 13. $^1$H NMR spectra (400 MHz, $CDCl_3$) of (i) B; reaction mixture of B with 2 equivalent N-allyl-N-methylacrylamide in presence of 5 mol % of $Me_2$PhP after reaction for (ii) 180 s and (iii) 300 s. Blue dots and red dots represent olefin proton signals and thiol proton signals respectively. The presence of the thiol proton signal after 180 s indicates that reaction was not complete, whereas disappearance of thiol signals after 300 s reactions confirms completion of the reaction.
Figure 14:
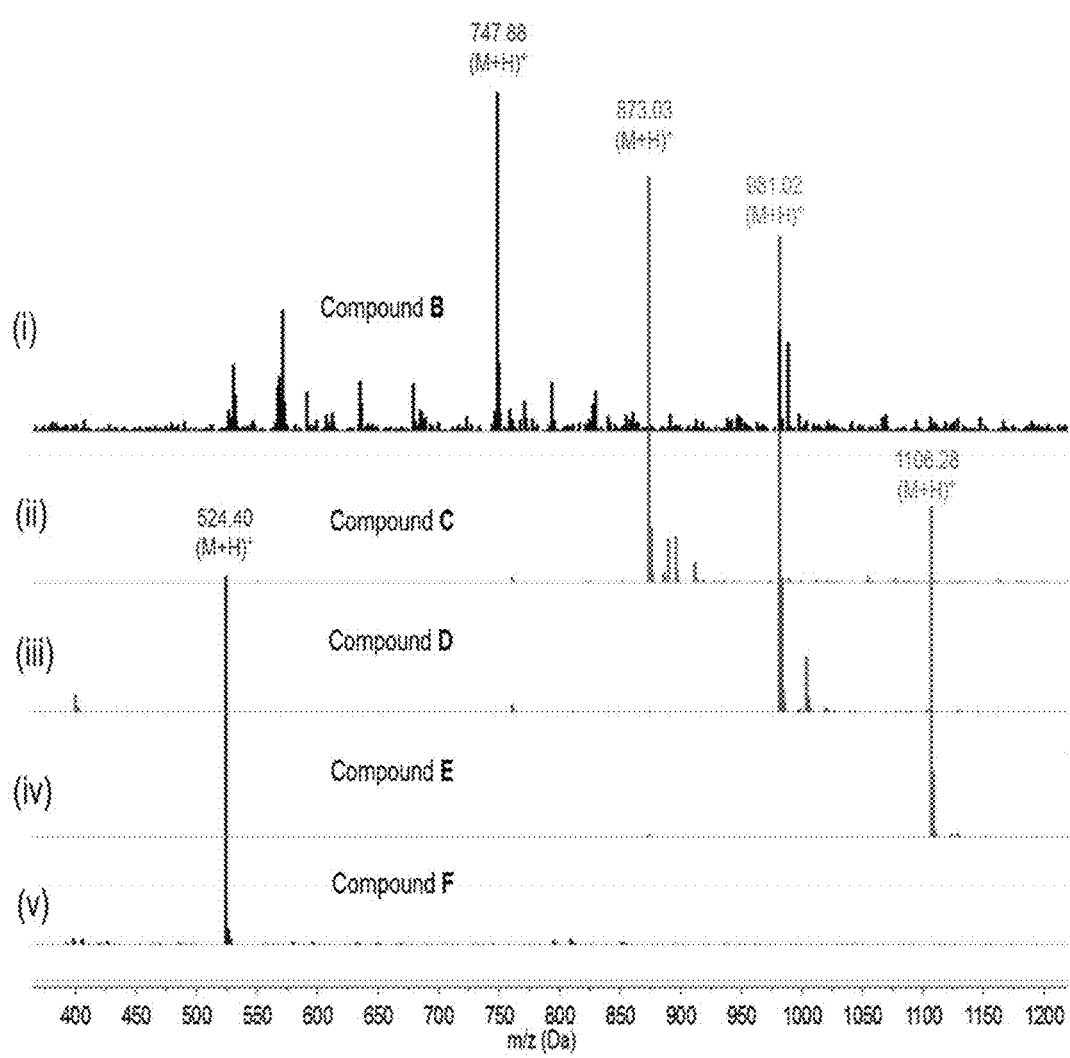
FIG. 14. LCMS of (i) B, calculated for $(M+H)^+$ 748.1, observed 747.88; (ii) C, calculated for $(M+H)^+$ 873.19, observed 873.03; (iii) D, calculated for $(M+H)^+$ 981.20, observed 981.02; (iv) E, calculated for $(M+H)^+$ 1106.28, observed 1106.28; (v) F, calculated for $(M+H)^+$ 524.25, observed 524.40.
Figure 15:
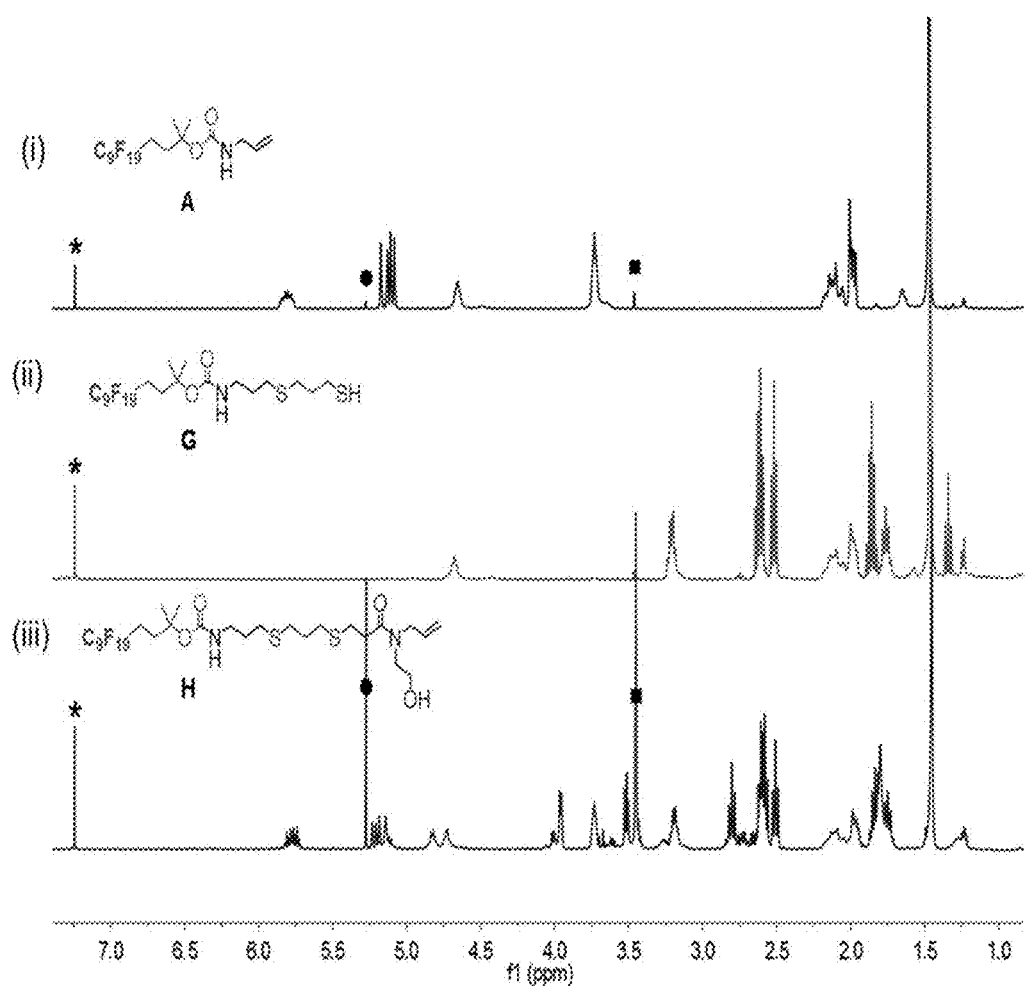
FIG. 15. $^1$H NMR spectra (400 MHz, $CDCl_3$) of (i) A, (ii) G and (iii) H; "*", "●" and "■" represent the residual proton signals of $CDCl_3$, $CH_2Cl_2$ and MeOH respectively.
Figure 16:
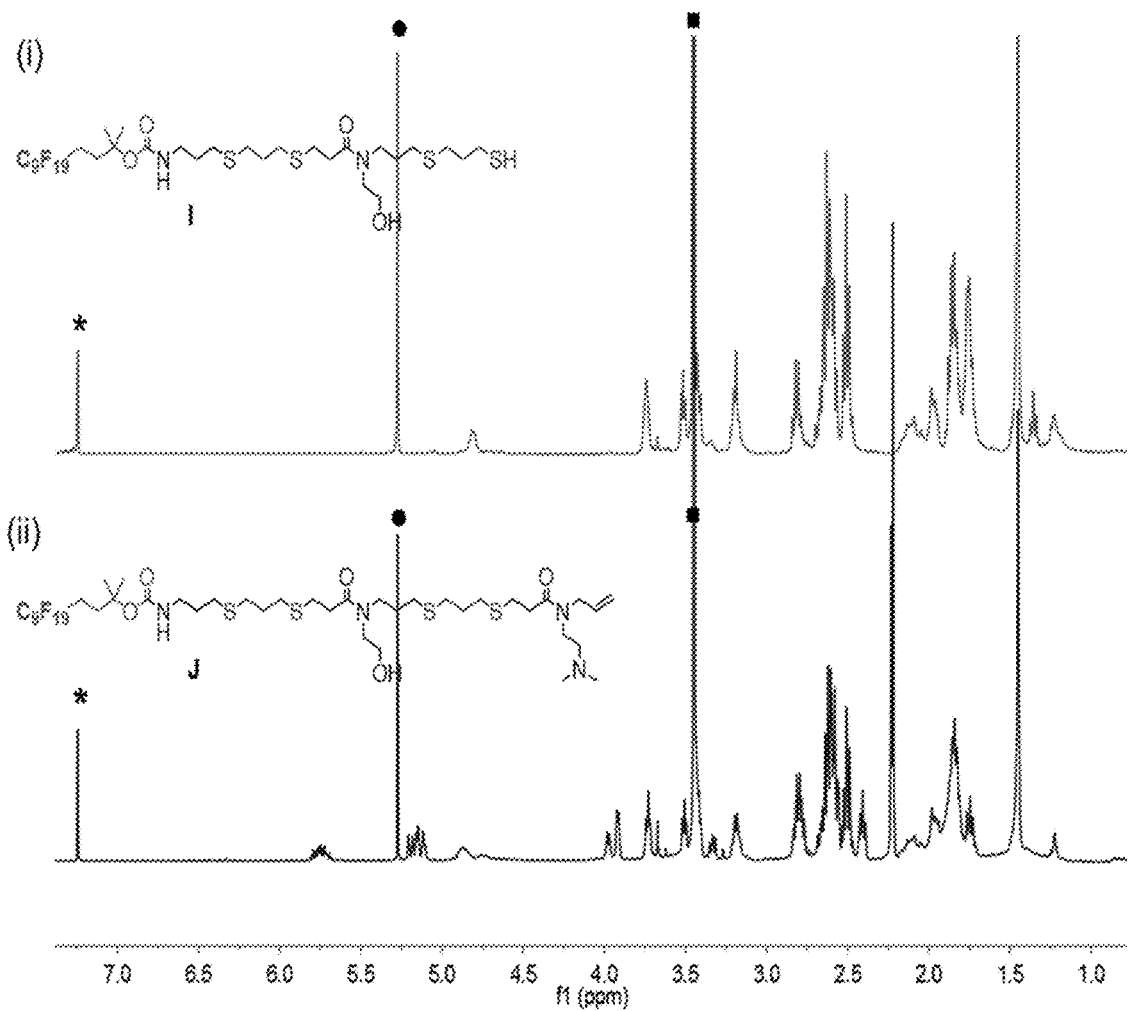
FIG. 16. $^1$H NMR spectra (400 MHz, $CDCl_3$) of (i) I and (ii) J; "*", "●" and "■" represent the residual proton signals of $CDCl_3$, $CH_2Cl_2$ and MeOH respectively.
Figure 17:
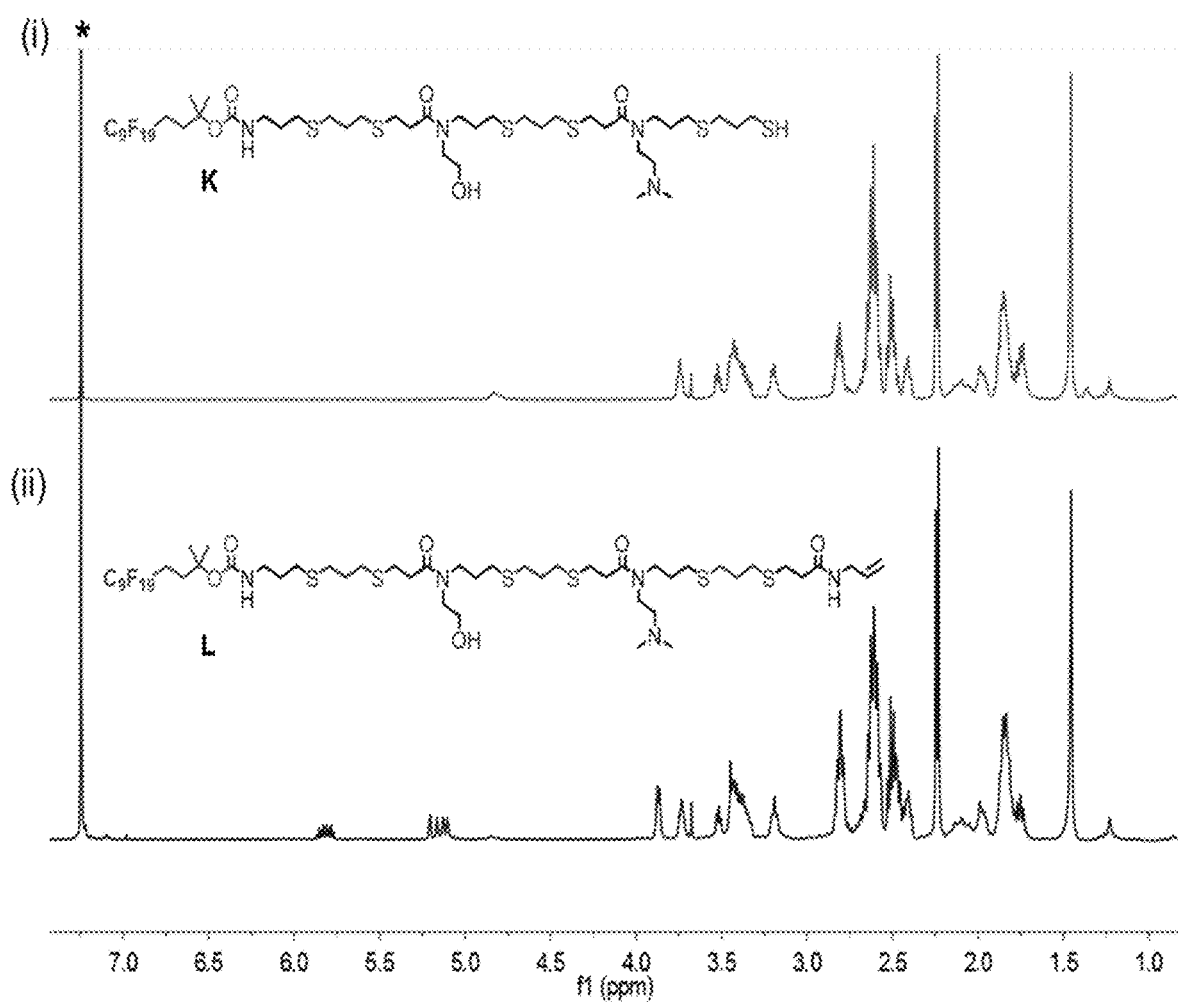
FIG. 17. $^1$H NMR spectra (400 MHz, $CDCl_3$) of (i) K and (ii) L; "*" represents the residual proton signals of $CDCl_3$.
Figure 18:
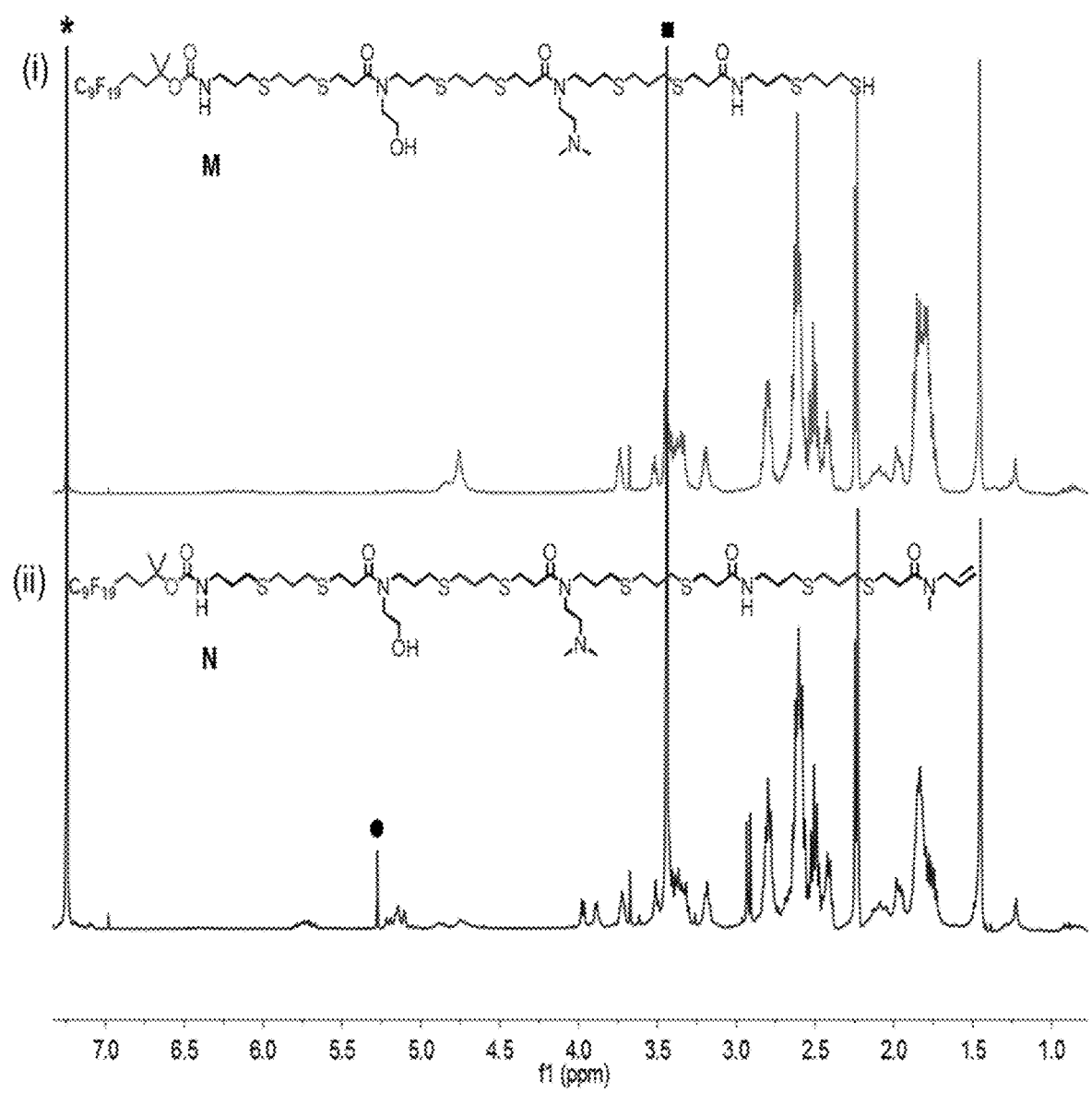
FIG. 18. $^1$H NMR spectra (400 MHz, $CDCl_3$) of (i) M and (ii) N; "*", "●" and "■" represent the residual proton signals of $CDCl_3$, $CH_2Cl_2$ and MeOH respectively.
Figure 19:
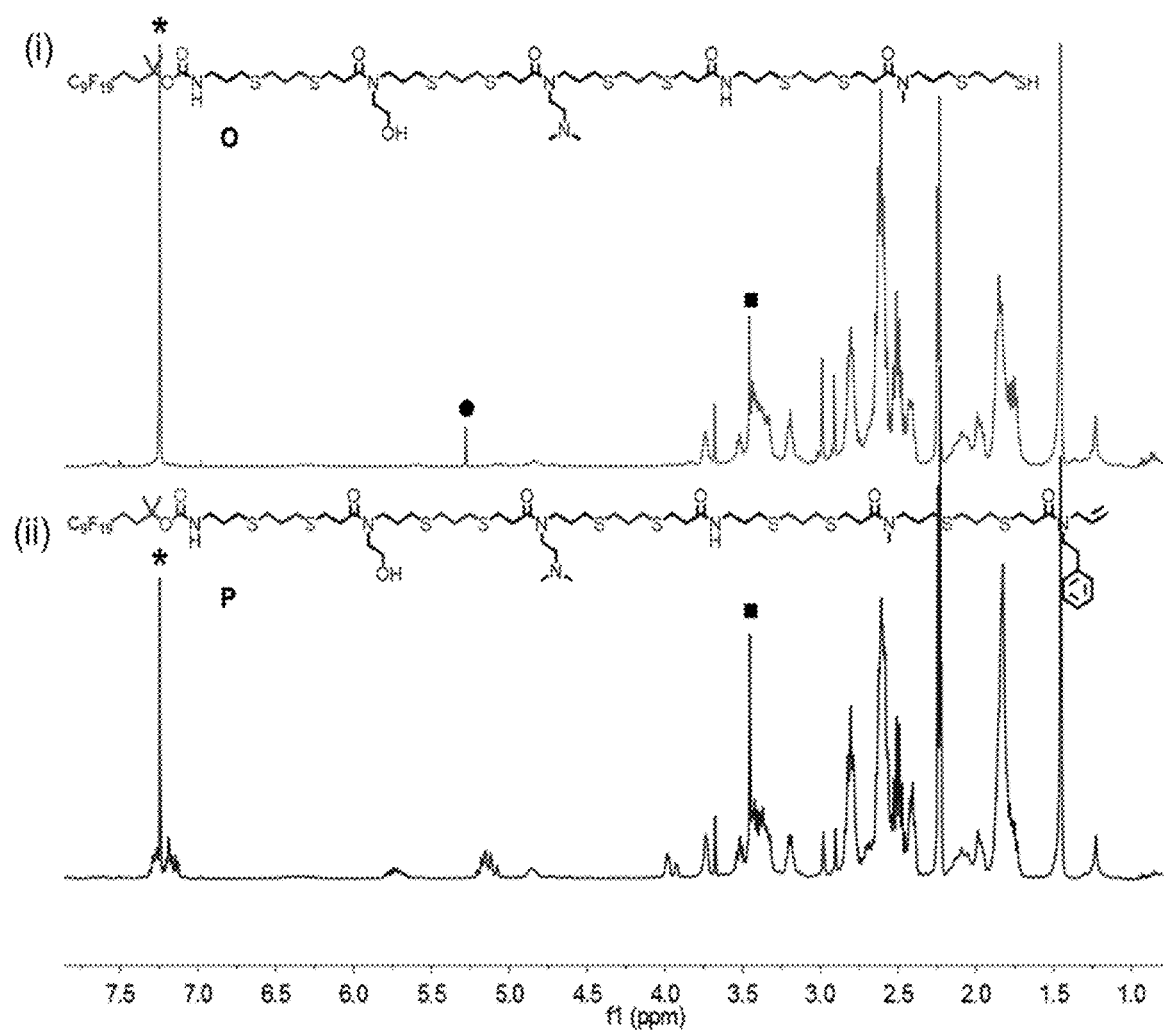
FIG. 19. $^1$H NMR spectra (400 MHz, $CDCl_3$) of (i) O and (ii) P; "*", "•" and "■" represent the residual proton signals of $CDCl_3$, $CH_2Cl_2$ and MeOH respectively.
Figure 20:
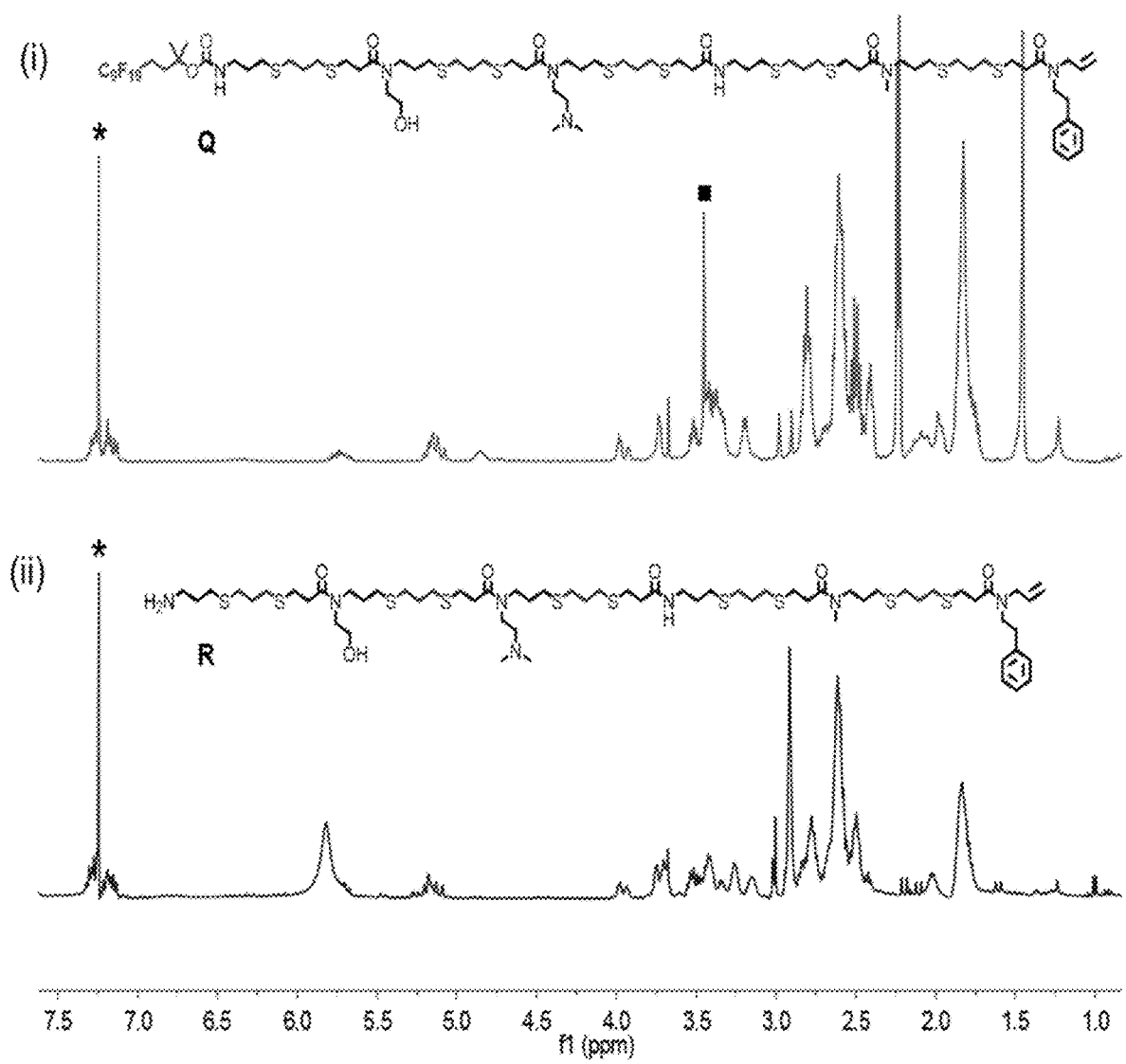
FIG. 20. $^1$H NMR spectra (400 MHz, $CDCl_3$) of (i) Q, and (iii) R; "*" and "■" represent the residual proton signals of $CDCl_3$ and MeOH respectively.
Figure 21:
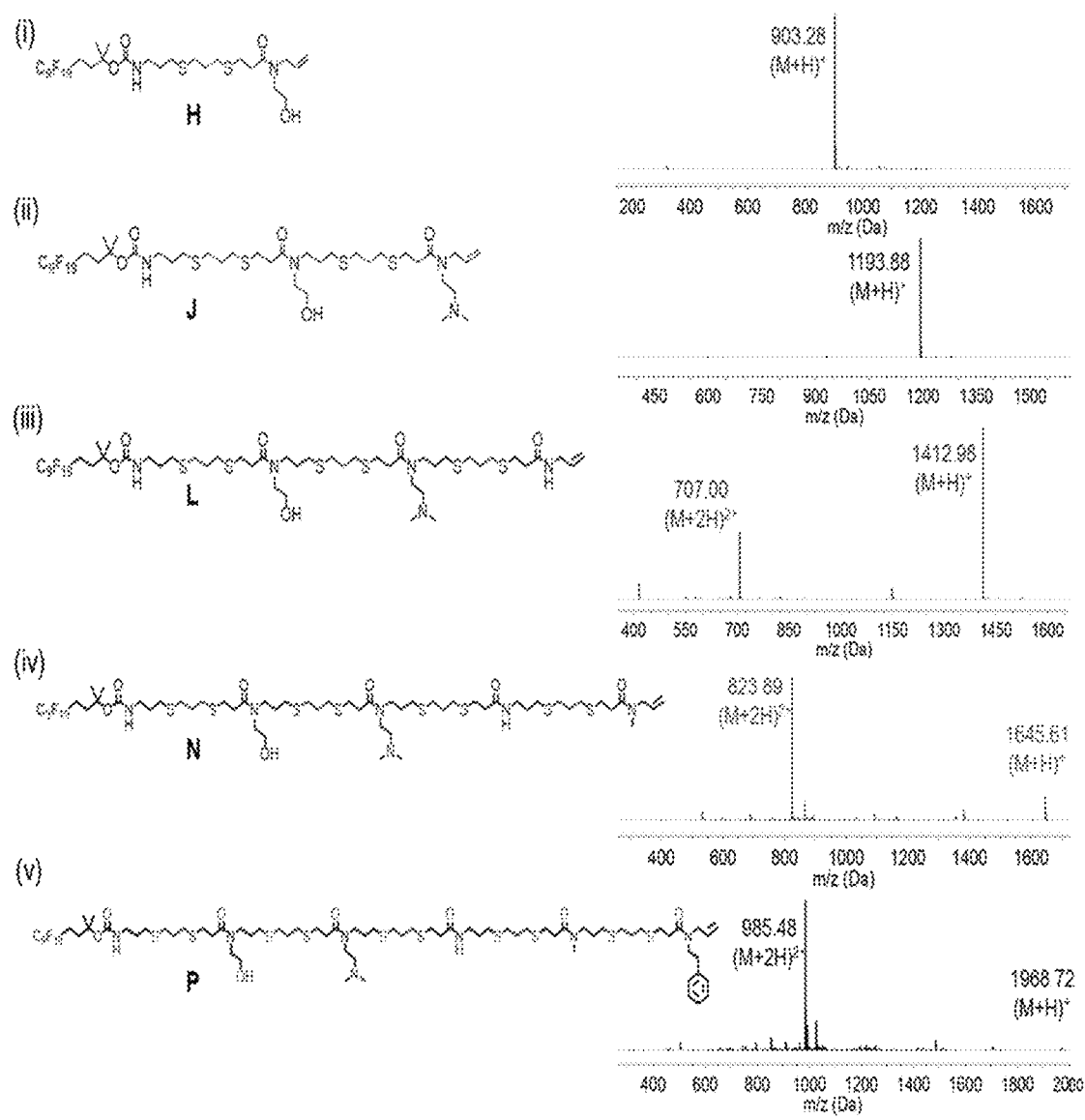
FIG. 21. LCMS of (i) H, calculated for $(M+H)^+$ 903.20, observed 903.28; (ii) J, calculated for $(M+H)^+$ 1193.35, observed 1193.88; (iii) L, calculated for $(M+H)^+$ 1413.57, observed 1412.98, $(M+2H)^{2+}$ 707.00; (iv) N, calculated for $(M+H)^+$ 1645.51, observed 1645.61, $(M+2H)^{2+}$ 823.89; (v) P, calculated for $(M+H)^+$ 1968.65, observed 1968.72, $(M+2H)^{2+}$ 985.48.

To verify that the reaction kinetics remain rapid in the presence of bulky fluorous tags and test the efficiency of FSPE, we initiated the synthesis of a short oligomer with N-allyl-N-methylacrylamide, 2a and 1,3-propanedithiol (FIG. 2 and FIGS. 9-11). The thiol-ene reaction of 1,3-propanedithiol with a fluorous Boc protected allyl amine was complete in 90 seconds and provided the monosubstituted product exclusively, as determined via $^1$H-NMR (FIG. 2). In fact, additional experiments that employed a fluorous tagged allyl amine to dithiol ratio as low as 1:0.5 showed no evidence of the disubstituted product (FIG. 12). The progress of the thiol-ene reaction was followed via the appearance of the thiol peak at ~1.35 ppm and the disappearance of the olefin peaks at ~5.14 and 5.75 ppm (FIG. 2). The phosphine-catalyzed Michael addition proceeded slightly faster on fluorous-tagged substrates and was complete in just 300 seconds (FIG. 13). The Michael addition reaction progress was monitored via the disappearance of the thiol peak and the re-appearance of the olefin peaks. The wash and elute steps, which take place between each monomer addition, were performed over a pre-packed mini-fluorous silica column in about 5 minutes. As such, the total time for monomer or co-monomer addition is roughly 10-15 minutes. After this first round of monomer addition, we continued oligomer synthesis with another round of dithiol and N-allyl-N-methylacrylamide addition. Again, both reactions proceeded smoothly as determined by $^1$H NMR (FIG. 2) and mass spectroscopy (FIG. 14). Finally, we performed an acid deprotection to cleave the desired oligomer off the fluorous support. The structure of the final product was confirmed by $^1$H NMR via the disappearance of the fluorous Boc groups (green) at 1.46, 1.98 and 2.11 ppm respectively (FIG. 2) and by liquid chromatography/mass spectroscopy (LCMS) (FIG. 14).

Figure 3:
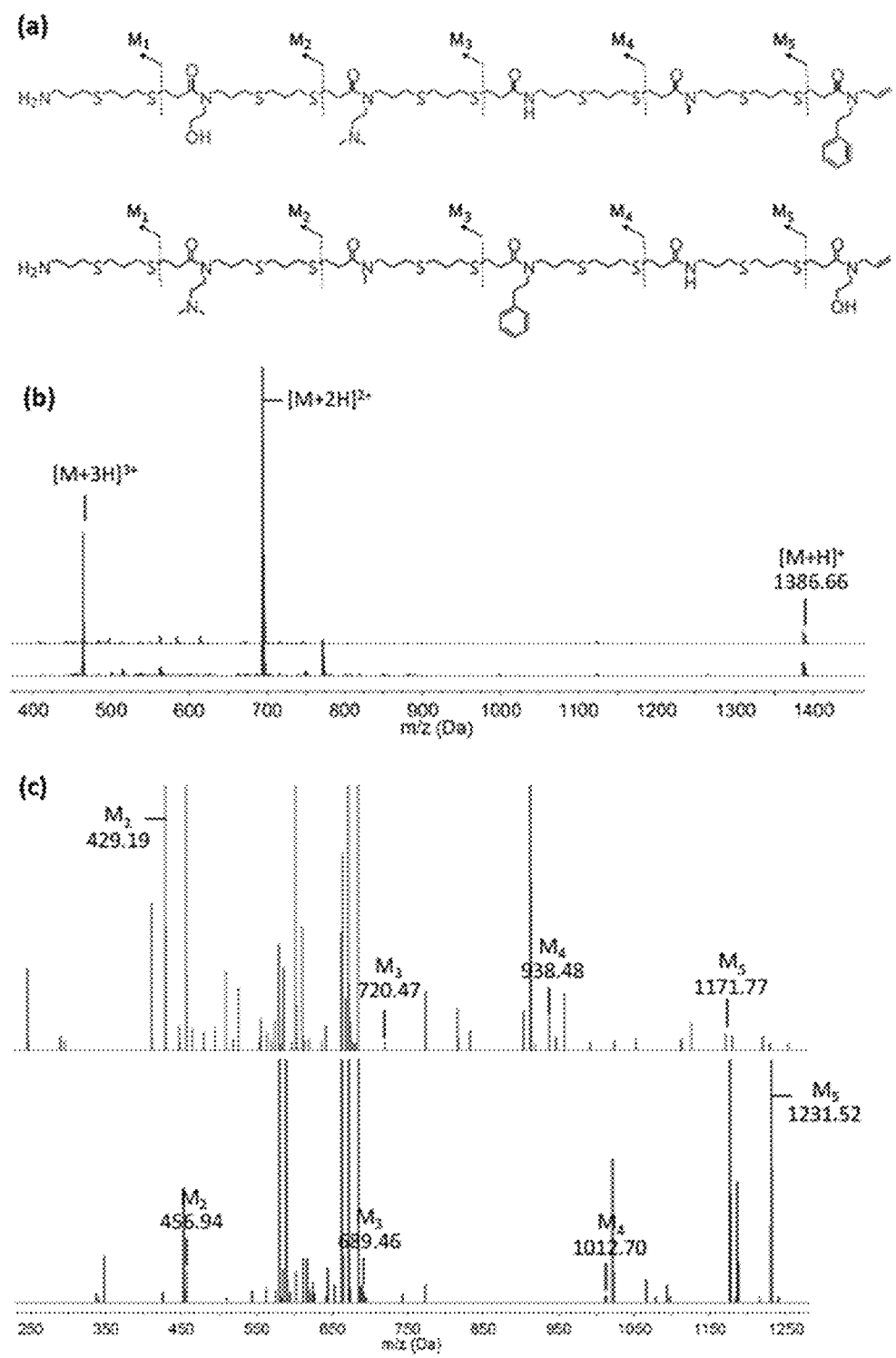
FIG. 3. (a) Chemical structure of two polymeric sequence isomers (ISO1-top & ISO2-bottom) (b) MS spectra of ISO1 (top) and ISO2 (bottom) (c) Tandem MS spectra of parent ion $[M+2H]^{2+}$ showing sequence specific fragmentation patterns. M ions are annotated. ISO1 is on top and ISO2 is on the bottom.
Figure 22:
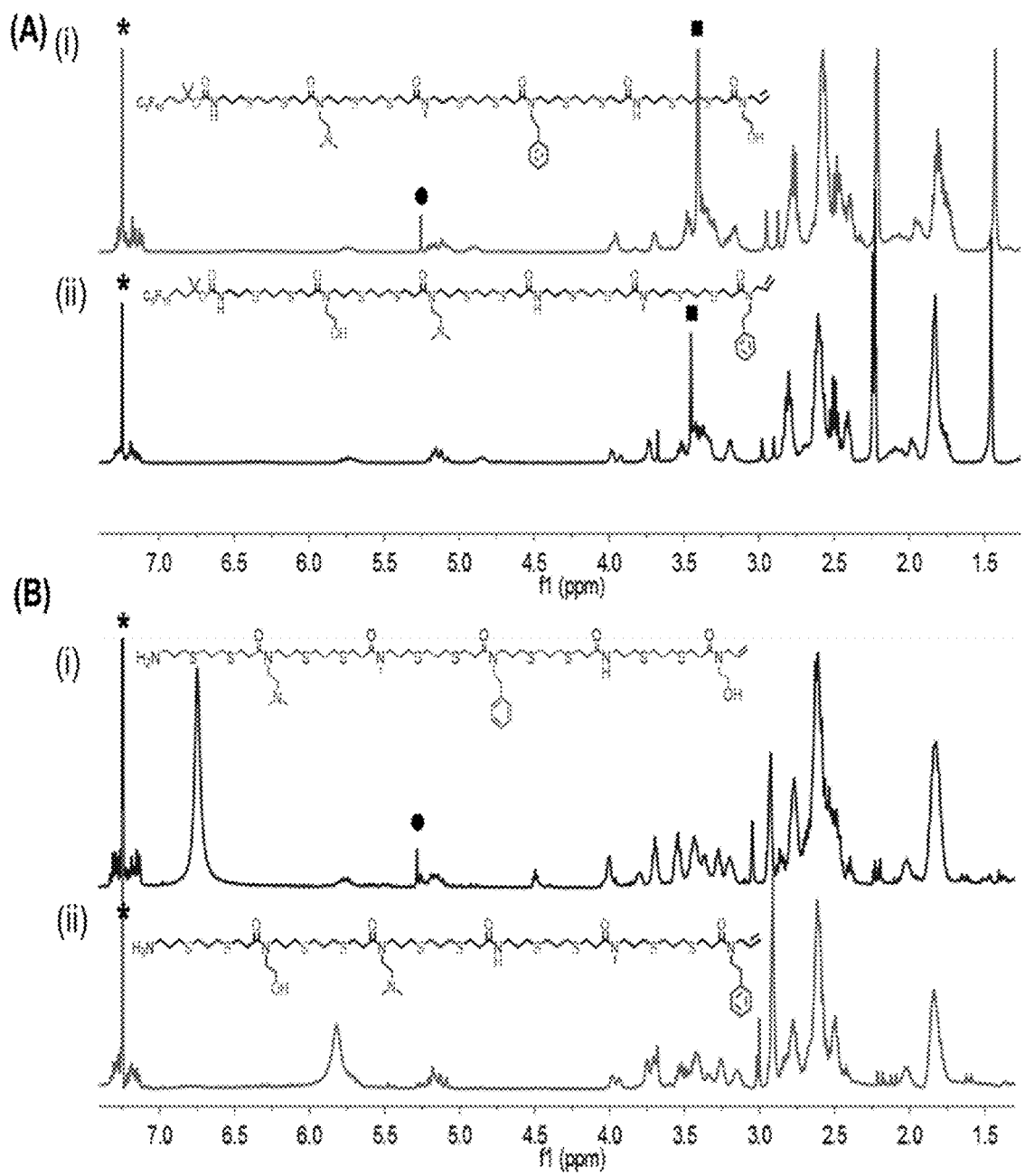
FIG. 22. $^1$H NMR spectra (400 MHz, $CDCl_3$) of (A) before cleavage of (i) ISO2 and (ii) ISO1 and (B) after cleavage of (i) ISO2 and (ii) ISO1; "*", "•" and "■" represent the residual proton signals of CDCl$_3$, CH$_2$Cl$_2$ and MeOH respectively.
Figure 23:
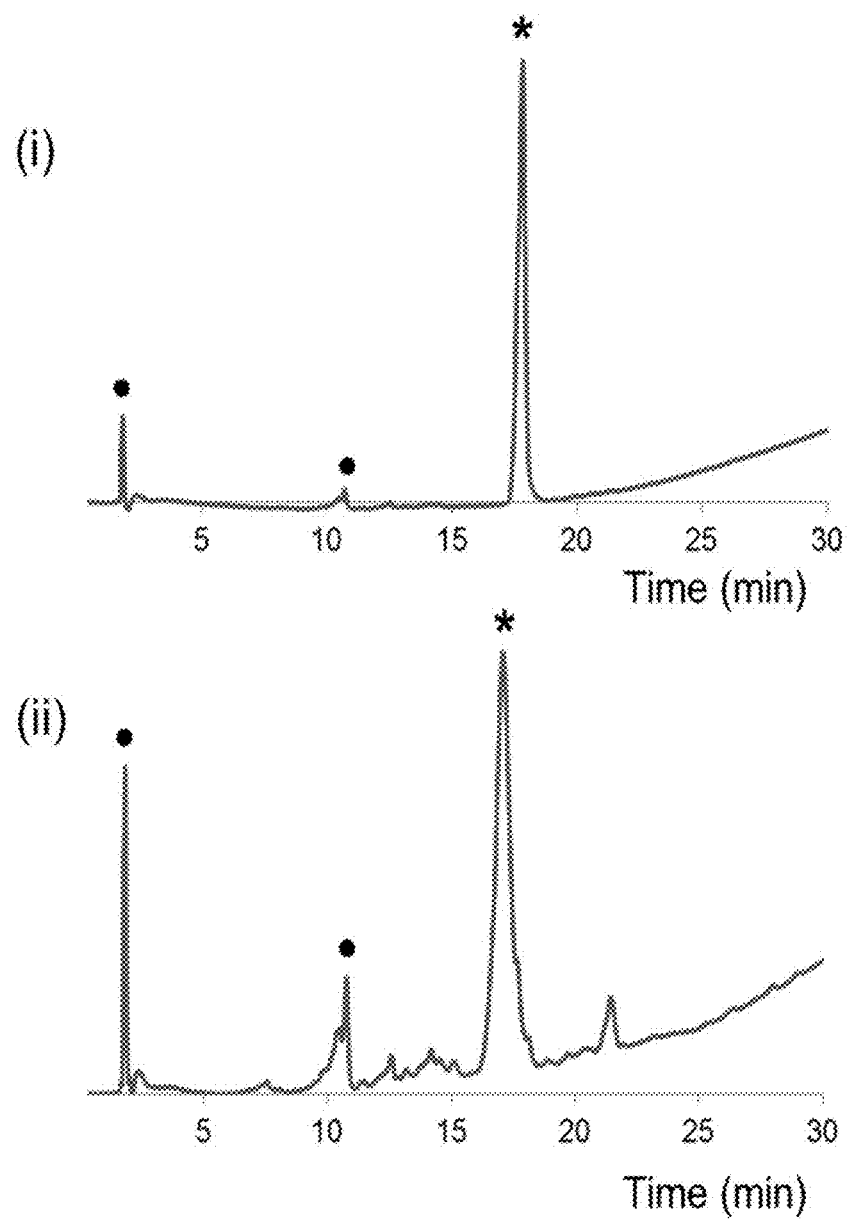
FIG. 23. HPLC trace of purified (i) ISO1 (retention time=17.8 min) and (ii) ISO2 (retention time=17.1 min); "*" represents the product signal and "●" represents residual loading solvent signals (these peaks show up in a blank run).

After verification of the reaction kinetics in the presence of fluorous tags, we proceeded with the synthesis of two 10-mer sequence isomeric polymers, isomer 1 and isomer 2 (ISO1 and ISO2, FIG. 3a). Both polymers were synthesized with the same allyl acrylamide monomers (2a, 2c, 2e, 2f, and 2h) and 1,3-propanedithiol as the co-monomer but have different sequences (FIG. 3a). The synthesis of ISO1 was followed and confirmed at each step with $^1$H NMR and LCMS (FIGS. 15-21). ISO2 on the other hand was synthesized in one setting without spectroscopic step-wise confirmation in less than a day with a pre-cleavage yield of 72%. As shown in FIGS. 22A and B, the $^1$H NMR of fluorous tagged and cleaved ISO1 and ISO2 are nearly identical. Minor differences in peak positions are possibly due to the differences in the relative positions of the functional groups. ISO1 and ISO2 were analyzed and purified via reverse phase chromatography and eluted at 17.8 and 17.1 minutes respectively (FIG. 23). Further structural confirmation of both isomers was obtained via LCMS. The observed parent ion of the two sequence isomers was identical at 1386.66 Da (FIG. 3b) and matched the theoretical value of 1386.62 Da. The multiply charged $[M+2H]^{2+}$ and $[M+3H]^{3+}$ ions for both isomers were also identical.

Figure 24:
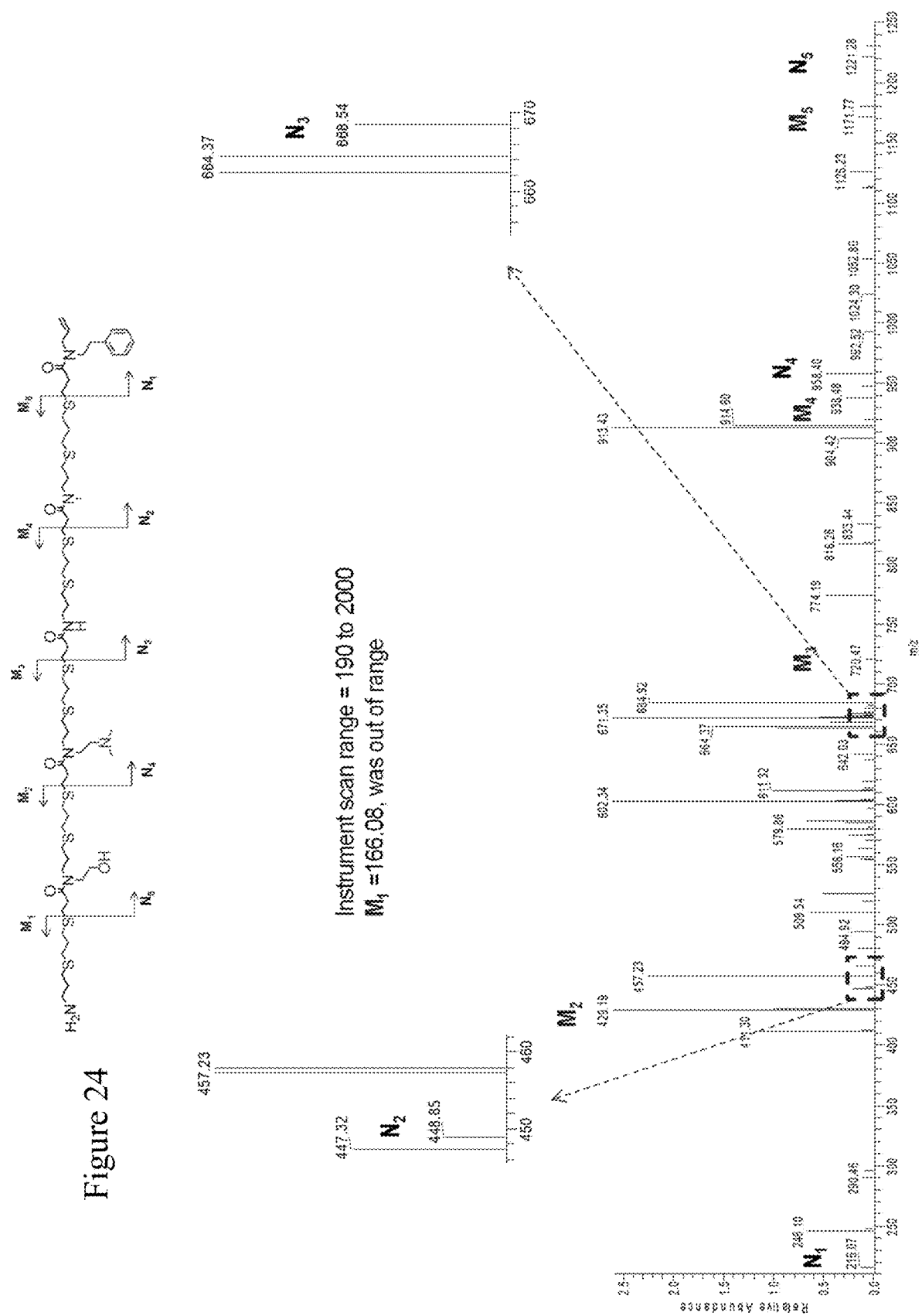
FIG. 24. Tandem mass spectrum of ISO1.
Figure 25:
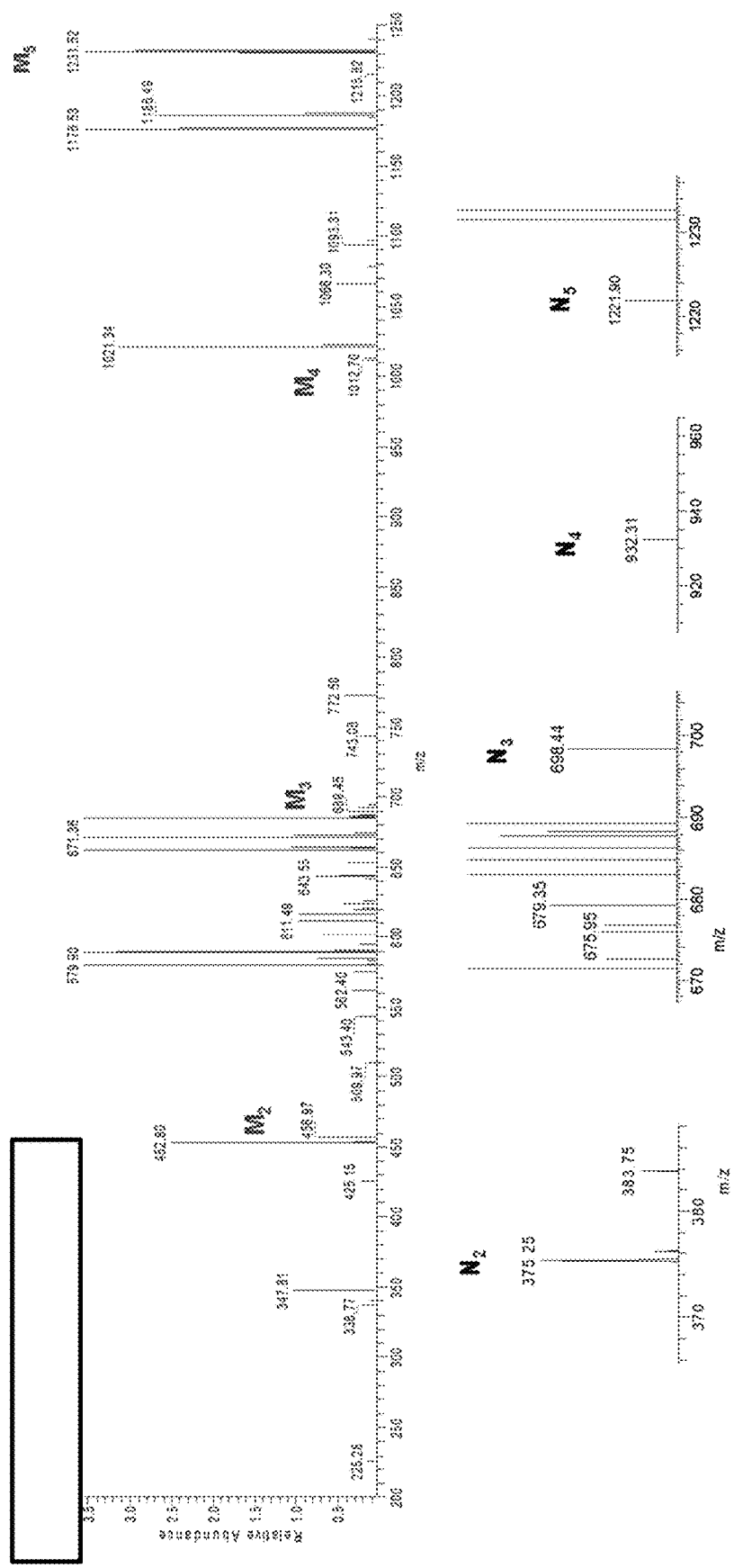
FIG. 25. Tandem mass spectrum of ISO2.

Sequence identity was elucidated via a tandem MS (MS/MS) experiment on one isotope of the $[M+2H]^{2+}$ ion. Cleavage of the carbon-sulfur bond β to the carbonyl to yield a thiol-containing $[M+2]^+$ fragment ions was the most prominent and consistent fragmentation mechanism. All expected M ions, with the exception of $M_1$ due to its mass being below the detection limit, were detected in the MS/MS fragmentation spectra (FIG. 3c, see FIG. 24, 25, Table 2 and 3 for full fragmentation analysis). Moreover, none of the M ions of ISO1 could be detected in the fragmentation profile of ISO2, and vice versa. Identification of the desired M ions as well as differences in the fragmentation pattern of the two sequence isomers confirms their chemical identity and sequence-specificity.

Figure 4:
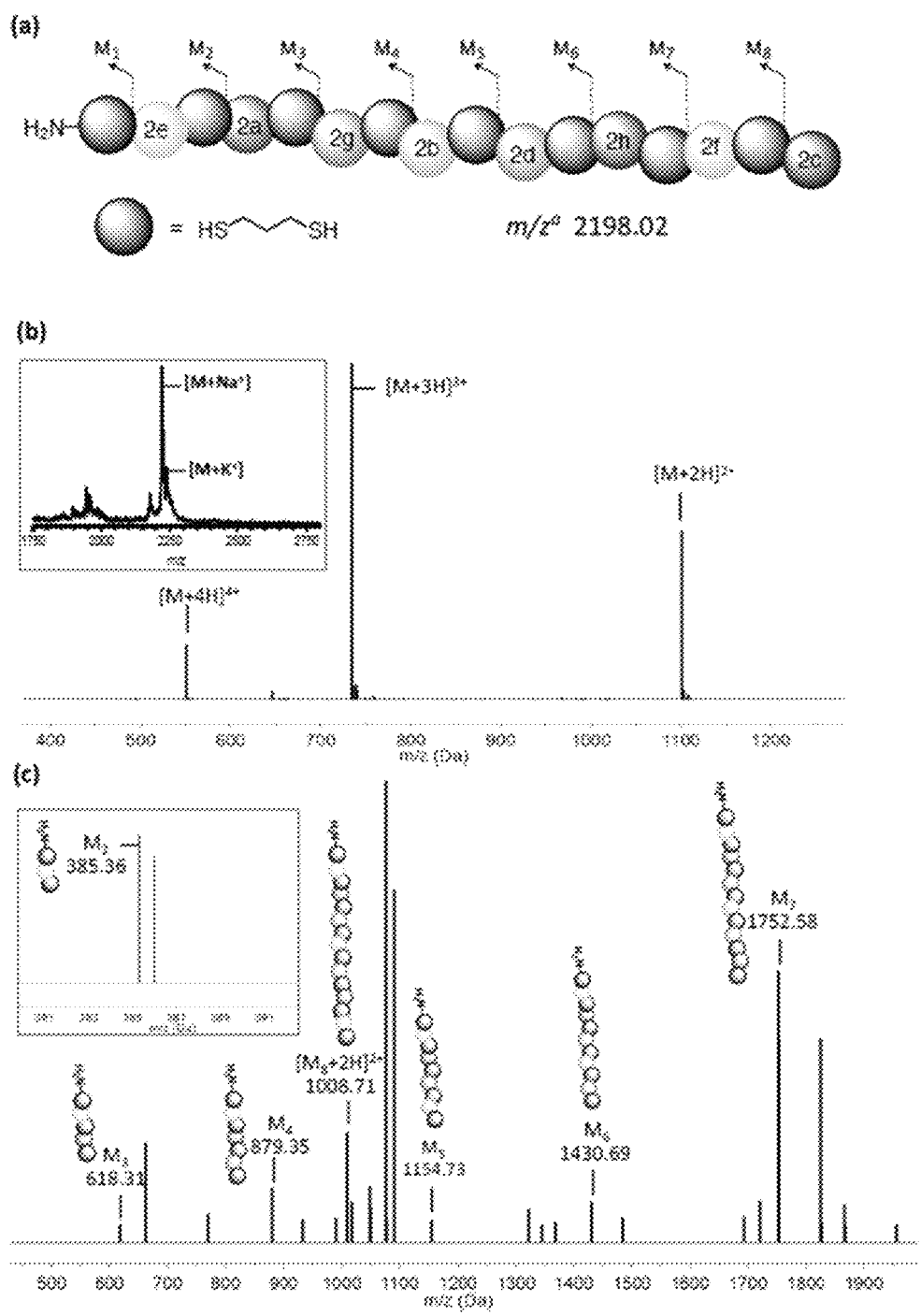
FIG. 4. (a) Schematic representation of 16-mer polymer (b) LCMS and MALDI (inset) of 16-mer polymer (c) Tandem MS spectra of 16-mer polymer. Inset shows $M_2$ fragment. M ions are annotated. $^a$m/z ratio for monoisotopic species.
Figure 5:
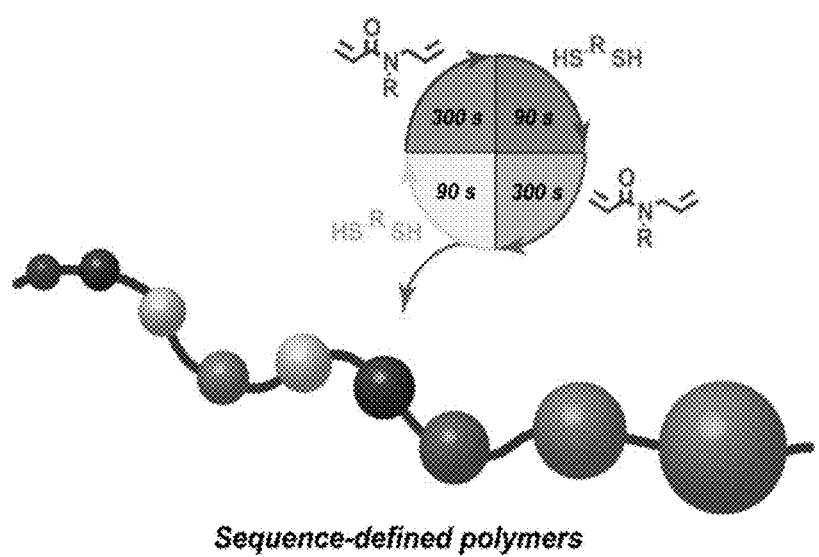
FIG. 5. Schematic representation of sequence defined polymer via orthogonal allyl acrylamide monomer and dithiol co-monomer; the prime two orthogonal reactions, thiolene and Michael addition takes 90 s and 300 s respectively for completion.
Figure 6:
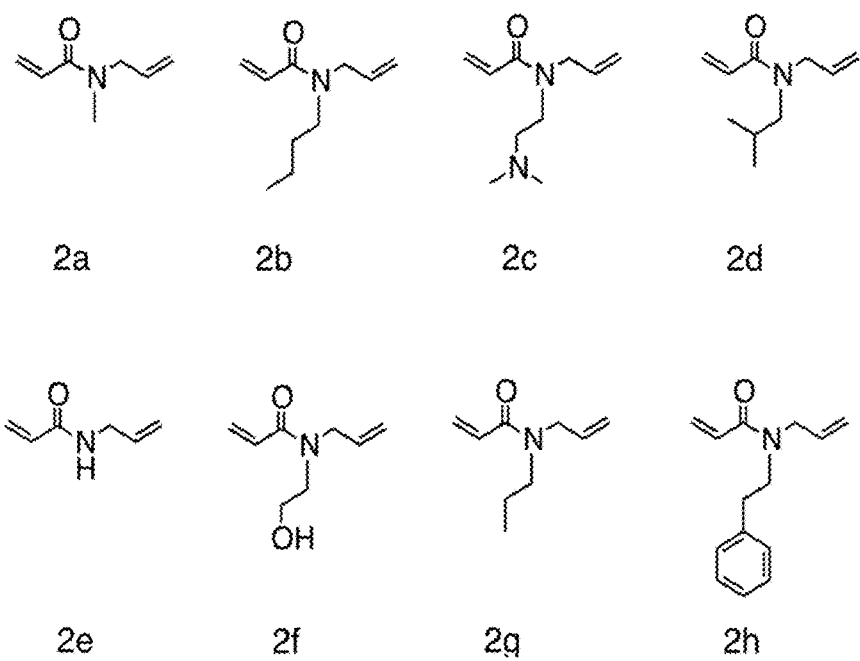
FIG. 6. Examples of monomers of the present disclosure.
Figure 26:
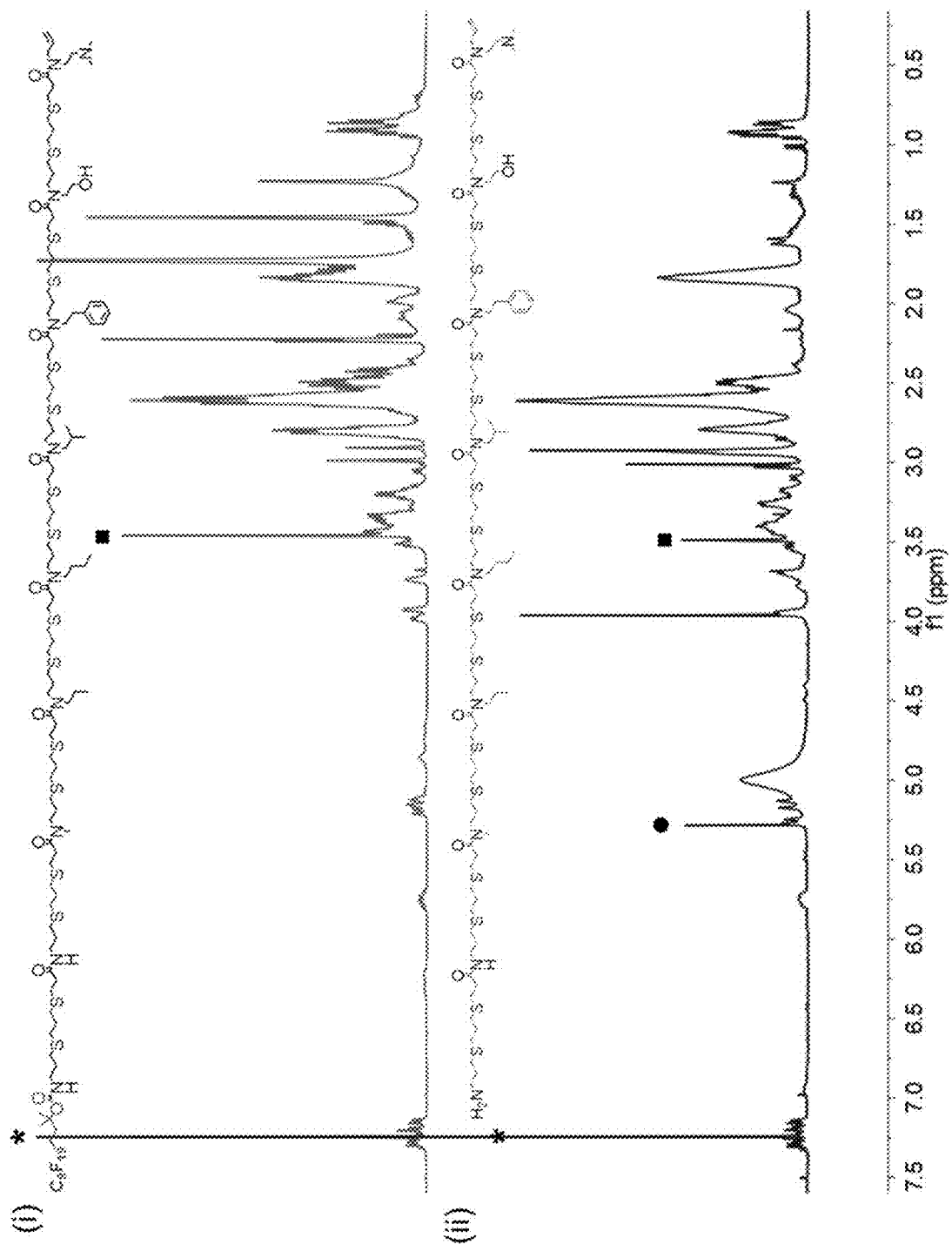
FIG. 26. $^1$H NMR spectra (400 MHz, CDCl$_3$) of 16-mer polymer (i) before and (ii) after cleavage from fluorous tag; "*", "•" and "■" represent the residual proton signals of CDCl$_3$, CH$_2$Cl$_2$ and MeOH respectively.
Figure 27:
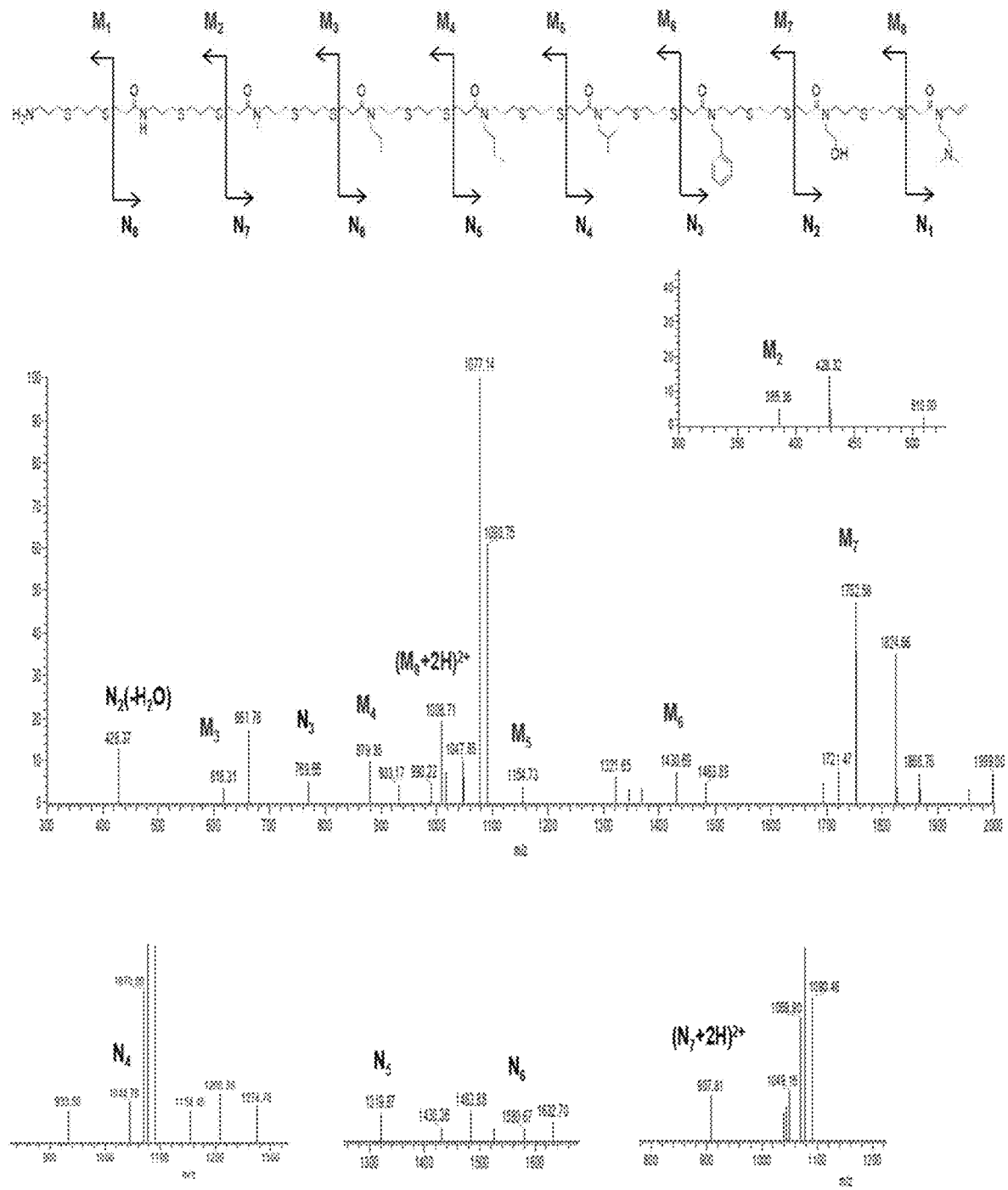
FIG. 27. Tandem mass spectrum of 16-mer polymer.
Figure 28:
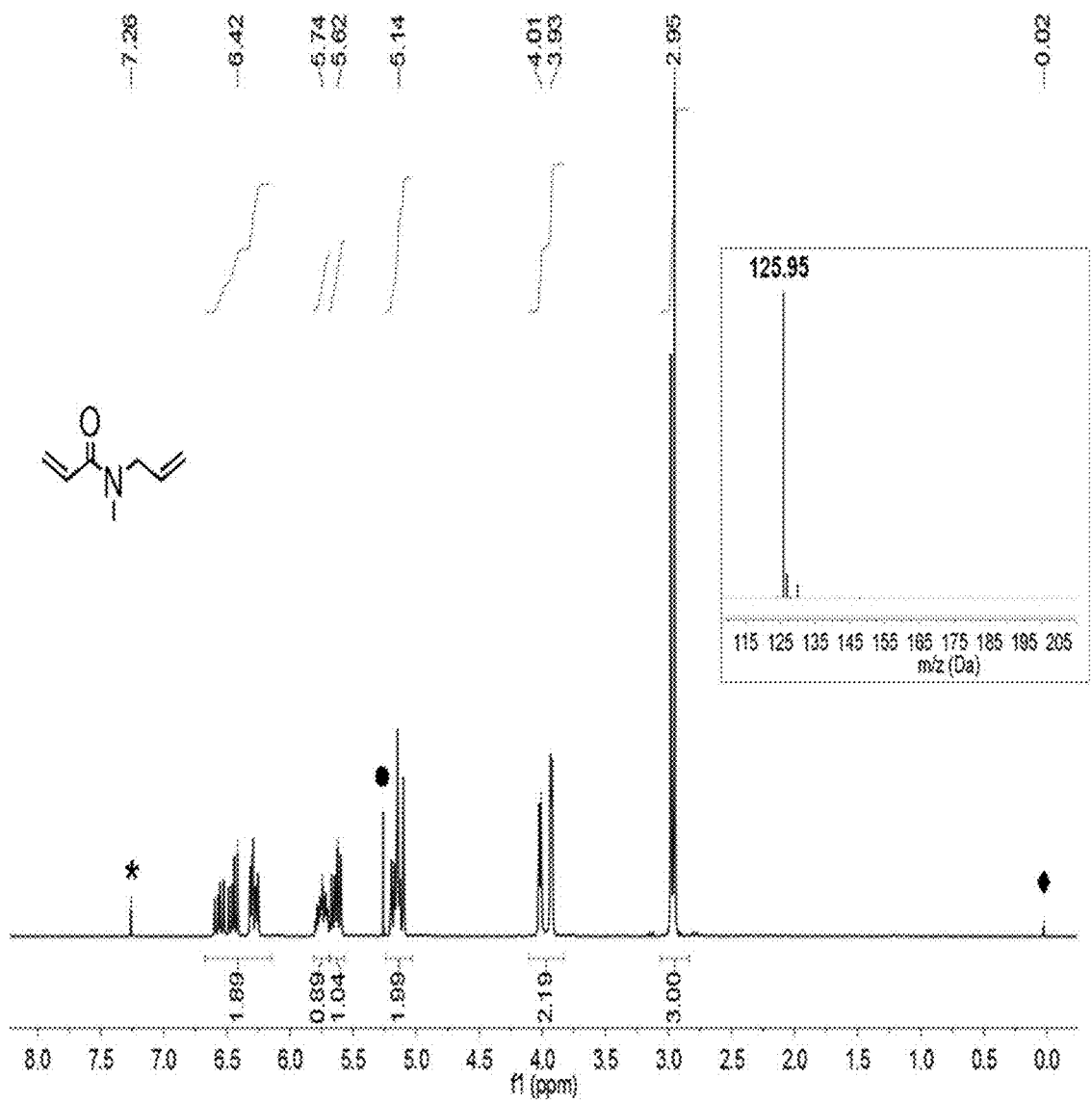
FIG. 28. $^1$H NMR spectra (400 MHz, CDCl$_3$) of 2a; "*", "•" and "♦" represent the residual proton signals of CDCl$_3$, CH$_2$Cl$_2$ and tetramethylsilane respectively. $^1$H NMR (400 MHz, CDCl$_3$): δ 2.94 (d, 3H, J=12 Hz), 3.96 (m, 2H), 5.12 (m, 2H), 5.61 (m, 1H), 5.73 (m, 1H) and 6.40 (m, 2H), inset: LCMS calculated for (M+H)$^+$ 126.09, observed 125.95.
Figure 29:
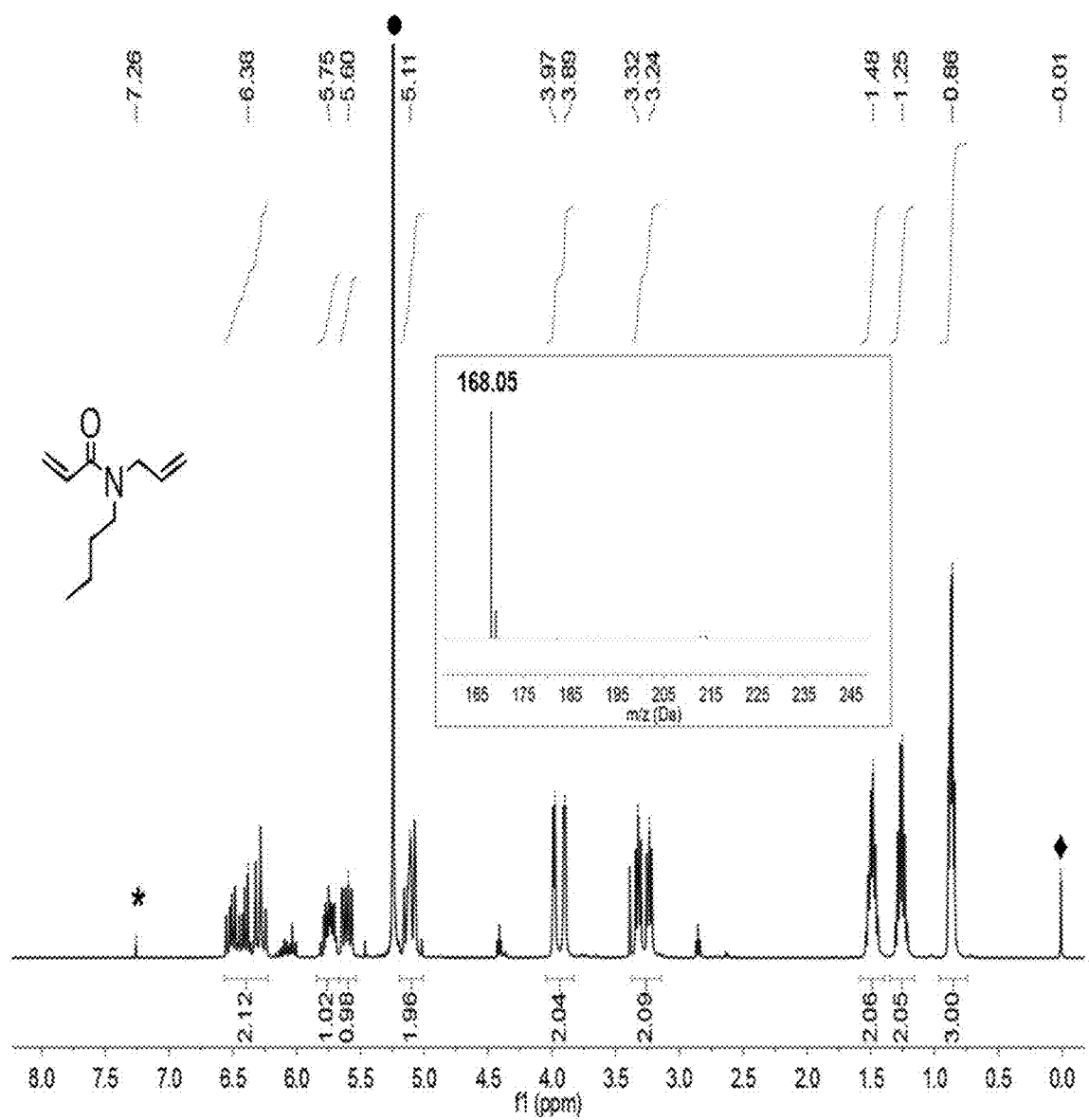
FIG. 29. $^1$H NMR spectra (400 MHz, CDCl$_3$) of 2b; "*", "•" and "♦" represent the residual proton signals of CDCl$_3$, CH$_2$Cl$_2$ and tetramethylsilane respectively. $^1$H NMR (400 MHz, CDCl$_3$): δ 0.85 (m, 3H), 1.24 (m, 2H, J=), 1.47 (m, 2H), 3.28 (dt, 2H, J=3.2, 0.8 Hz), 3.93 (m, 2H), 5.09 (m, 2H), 5.58 (m, 1H), 5.73 (m, 1H), 6.37 (m, 2H); inset: LCMS calculated for (M+H)$^+$ 168.14, observed 168.05.
Figure 30:
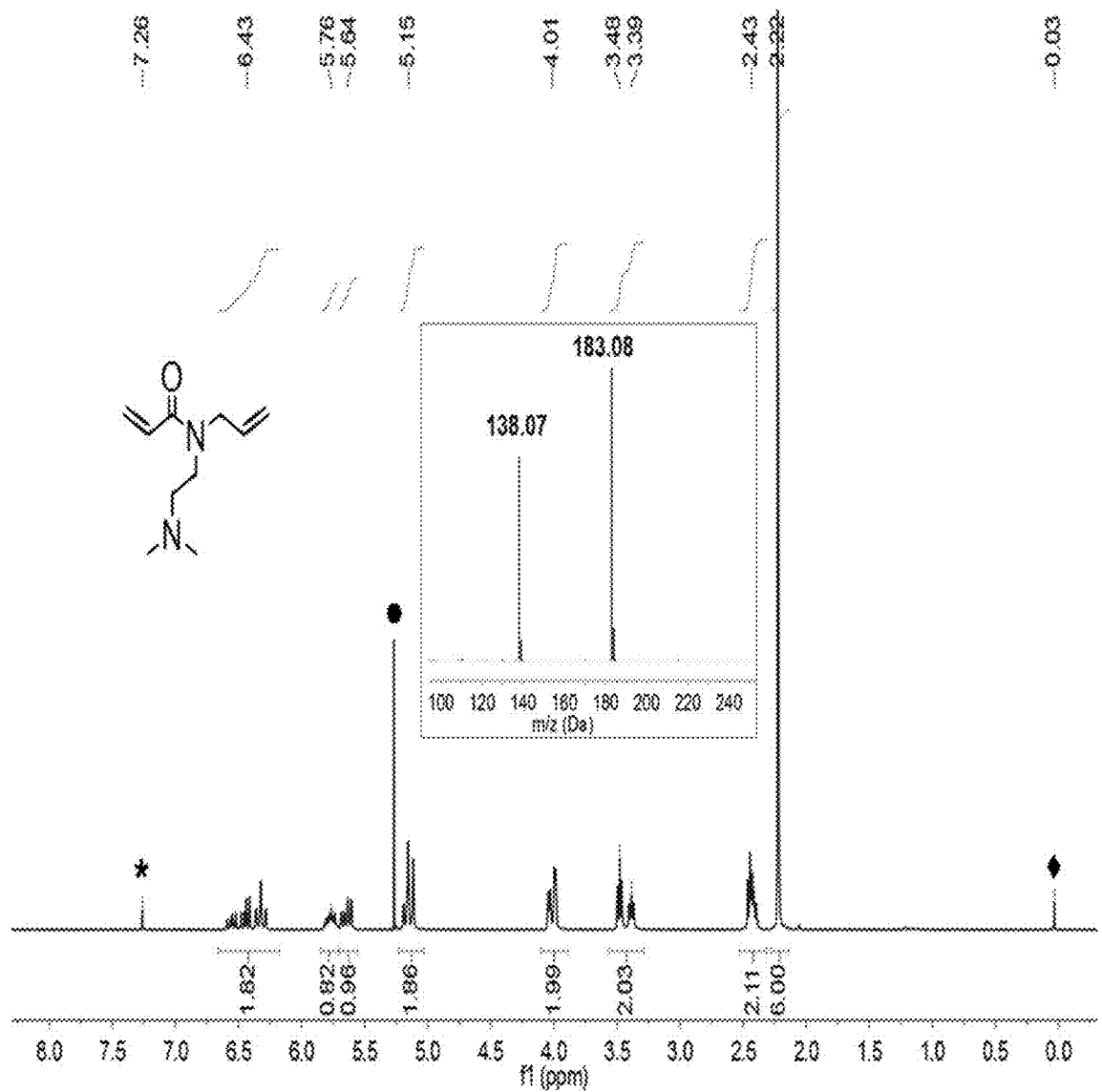
FIG. 30. $^1$H NMR spectra (400 MHz, CDCl$_3$) of 2c; "*", "•" and "♦" represent the residual proton signals of CDCl$_3$, CH$_2$Cl$_2$ and tetramethylsilane respectively. $^1$H NMR (400 MHz, CDCl$_3$): δ 2.21 (s, 6H), 2.42 (m, 2H), 3.42 (dt, 2H, J=3.6, 0.8 Hz), 4.00 (3, 2H), 5.13 (m, 2H), 5.62 (m, 1H), 5.73 (m, 1H), 6.42 (m, 2H); inset: LCMS calculated for (M+H)$^+$ 183.15, observed 183.08, 138.07 is for (M+H—NHMe$_2$)$^+$.
Figure 31:
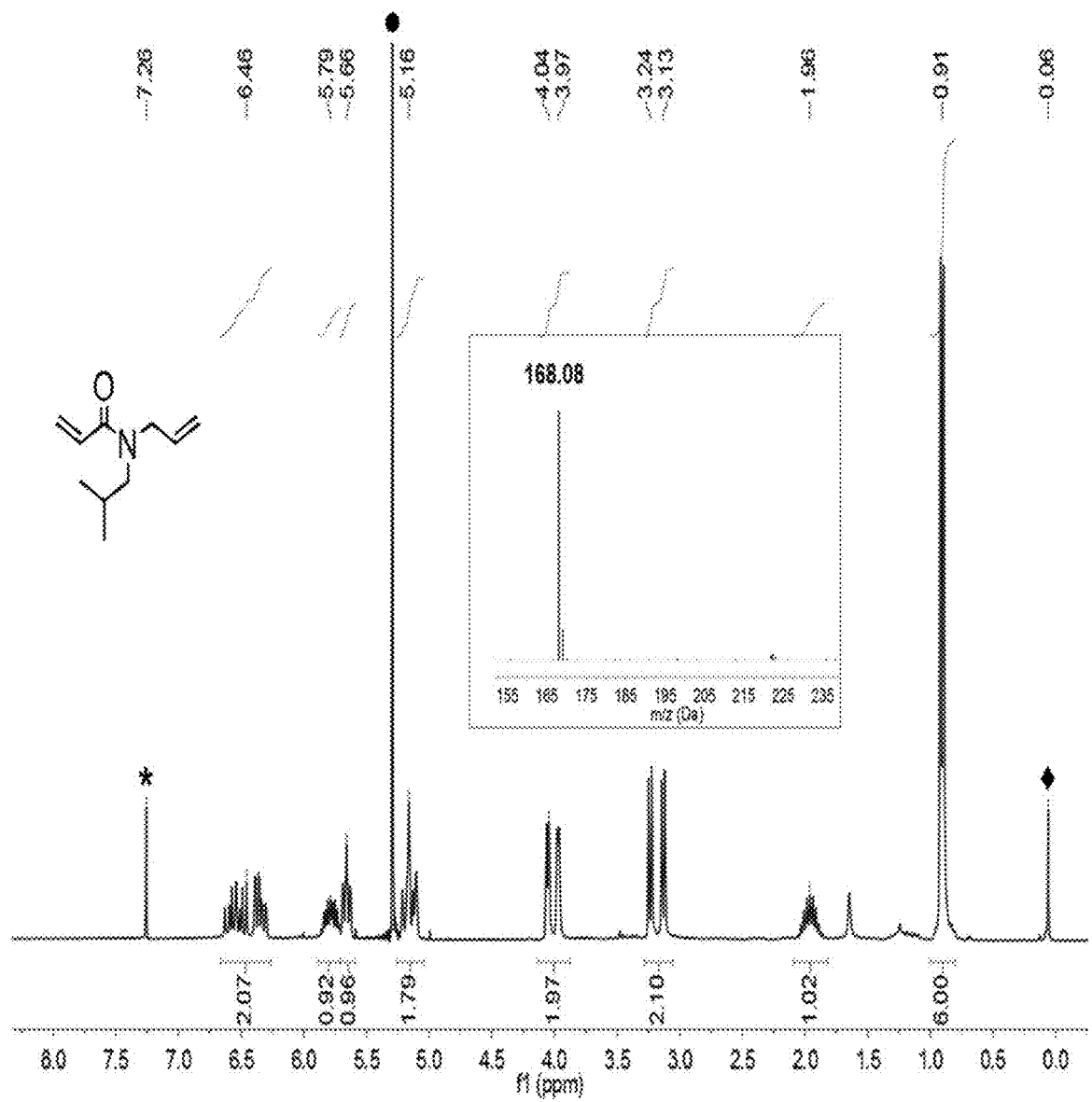
FIG. 31. $^1$H NMR spectra (400 MHz, CDCl$_3$) of 2d; "*", "•" and "♦" represent the residual proton signals of CDCl$_3$, CH$_2$Cl$_2$ and tetramethylsilane respectively. $^1$H NMR (400 MHz, CDCl$_3$): δ 0.91 (m, 6H), 1.96 (m, 1H), 3.18 (dd, 1H, J=3.6, 0.8 Hz), 3.97 (m, 2H), 5.16 (m, 2H), 5.66 (m, 1H), 5.79 (m, 1H), 6.46 (m, 2H); inset: LCMS calculated for (M+H)$^+$ 168.14, observed 168.08.
Figure 32:
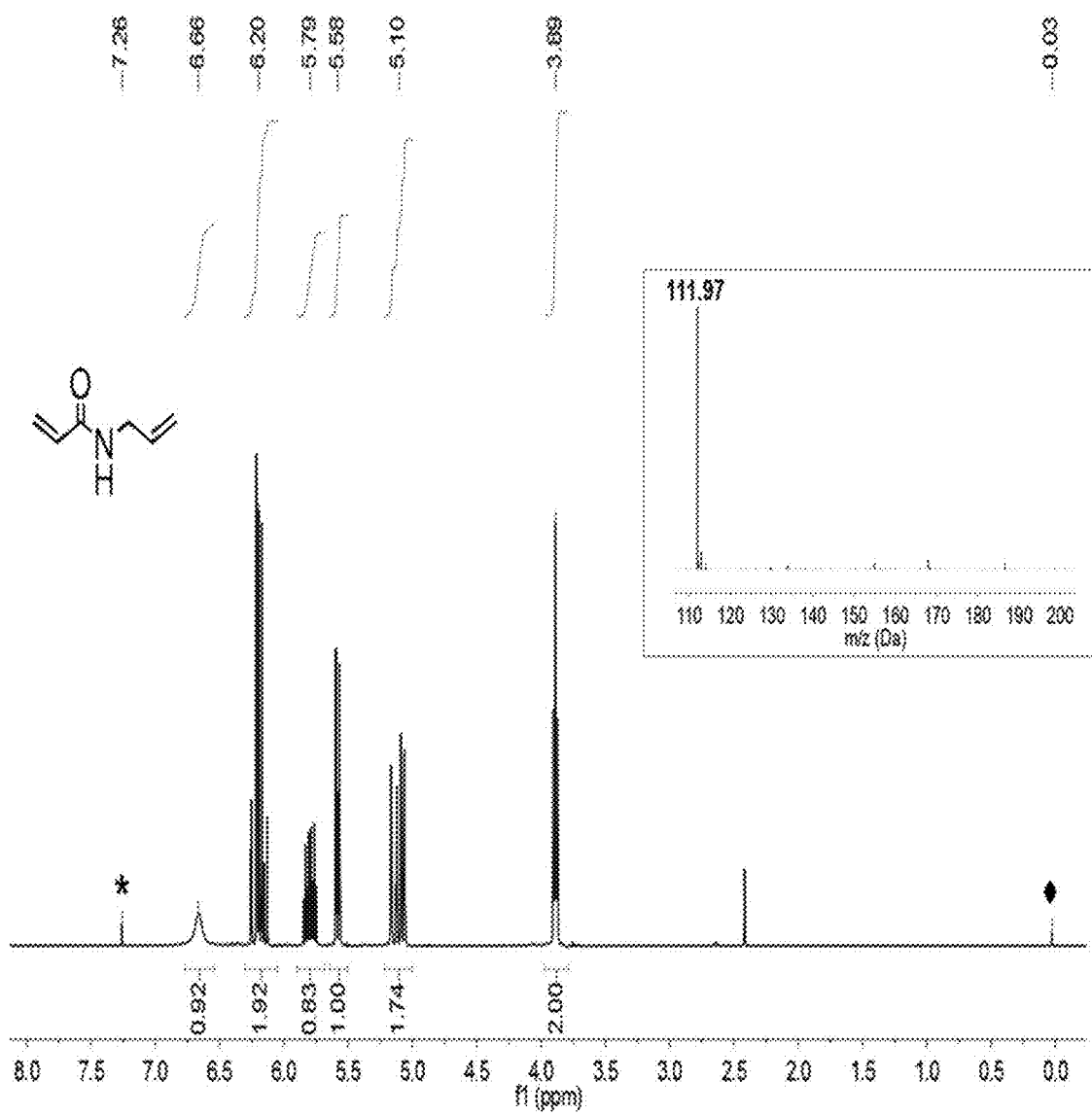
FIG. 32. $^1$H NMR spectra (400 MHz, CDCl$_3$) of 2e; "*" and "♦" represent the residual proton signals of CDCl$_3$ and tetramethylsilane respectively. $^1$H NMR (400 MHz, CDCl$_3$): δ 3.87 (m, 2H), 5.09 (m, 2H), 5.56 (dd, 1H, J=0.8, 0.4 Hz), 5.78 (m, 1H), 6.18 (m, 2H), 6.65 (s, 1H); inset: LCMS calculated for (M+H)$^+$ 112.08, observed 111.97.
Figure 33:
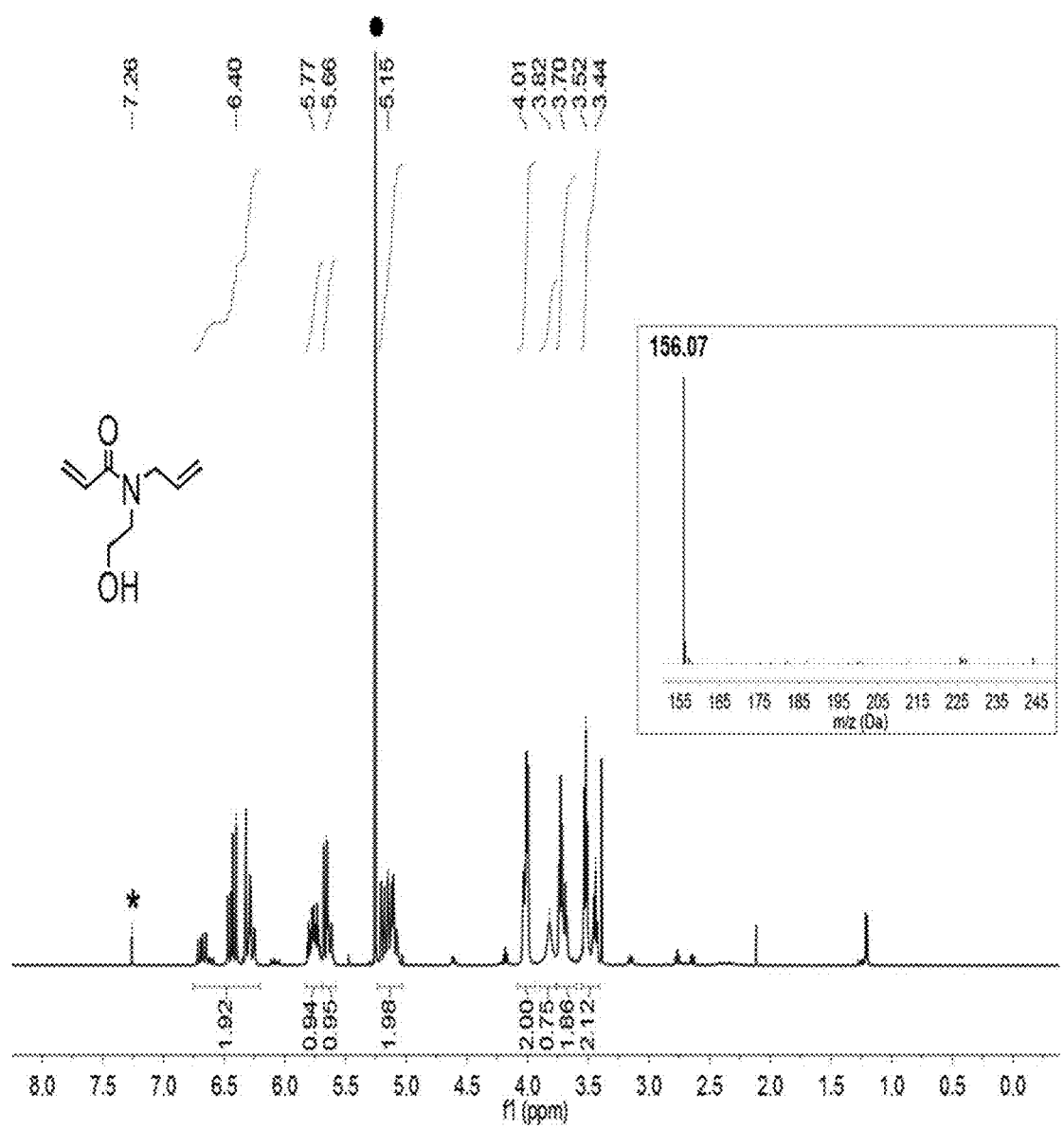
FIG. 33. $^1$H NMR spectra (400 MHz, CDCl$_3$) of 2f; "*" and "•" represent the residual proton signals of CDCl$_3$ and CH$_2$Cl$_2$ respectively. $^1$H NMR (400 MHz, CDCl$_3$): δ 3.46 (dt, 2H, J=3.2, 0.4 Hz), 3.69 (dt, 2H, J=1.6, 0.4 Hz), 3.80 (s, 1H), 3.99 (m, 2H), 5.13 (m, 2H), 5.64 (m, 1H), 5.75 (m, 1H), 6.38 (m, 2H); inset: LCMS calculated for (M+H)$^+$ 156.10, observed 156.07.
Figure 34:
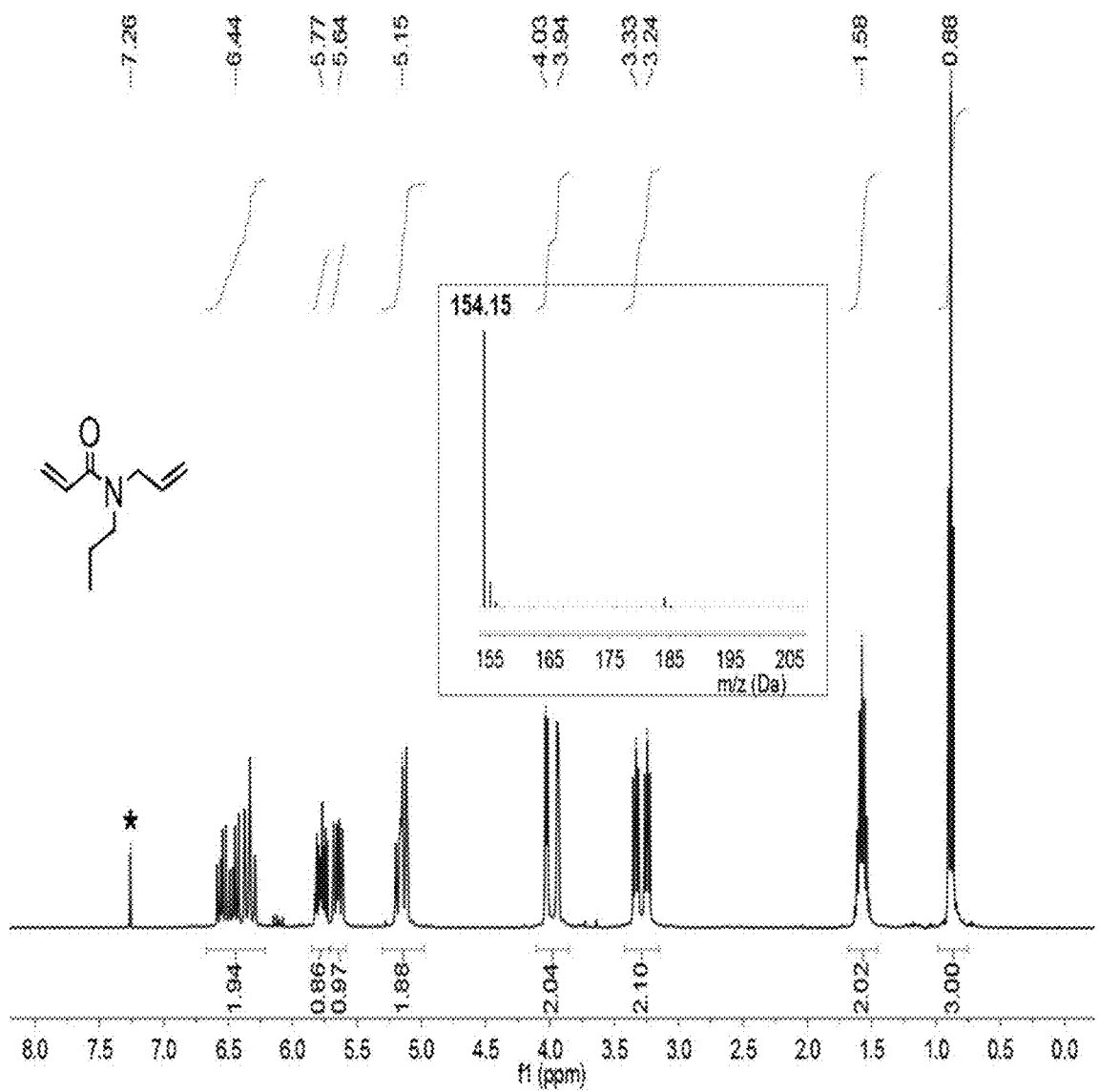
FIG. 34. $^1$H NMR spectra (400 MHz, CDCl$_3$) of 2g; "*" represents the residual proton signals of CDCl$_3$. $^1$H NMR (400 MHz, CDCl$_3$): δ 0.87 (t, 3H, J=7.6 Hz), 1.56 (m, 2H), 3.29 (dt, 1H, J=35.2, 7.6 Hz), 3.92 (m, 1H), 5.13 (m, 2H), 5.62 (m, 1H), 5.76 (m, 1H), 6.43 (m, 2H); inset: LCMS calculated for (M+H)$^+$ 154.14, observed 154.15.
Figure 35:
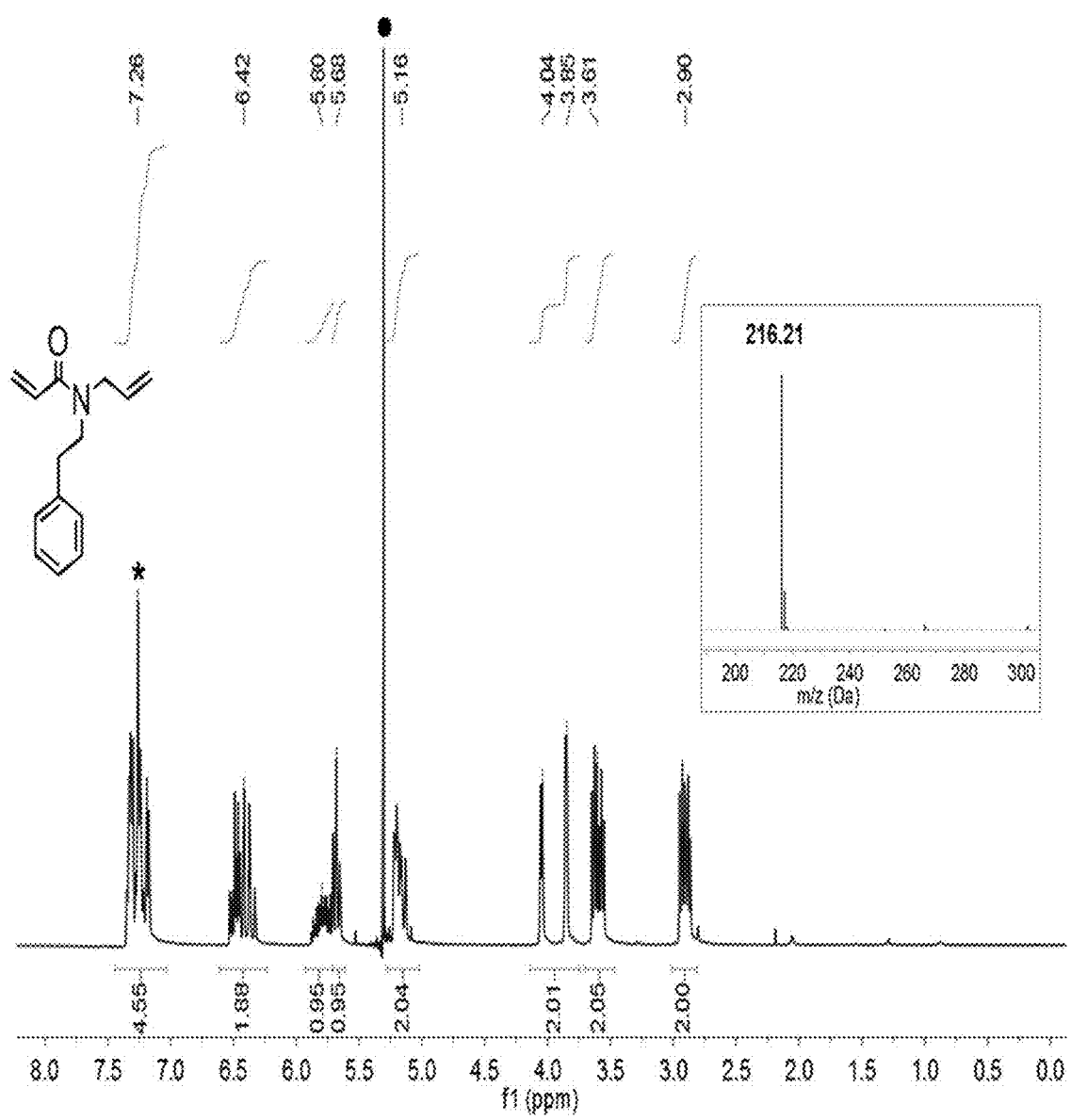
FIG. 35. $^1$H NMR spectra (400 MHz, CDCl$_3$) of 2h; "*" and "•" represent the residual proton signals of CDCl$_3$ and CH$_2$Cl$_2$ respectively. $^1$H NMR (400 MHz, CDCl$_3$): δ 2.85 (m, 2H), 3.56 (m, 2H), 3.95 (m, 2H), 5.11 (m, 2H), 5.63 (m, 1H), 5.75 (m, 1H), 6.36 (m, 2H), 7.21 (m, 5H); inset: LCMS calculated for (M+H)$^+$ 216.14, observed 216.21.
Figure 36:
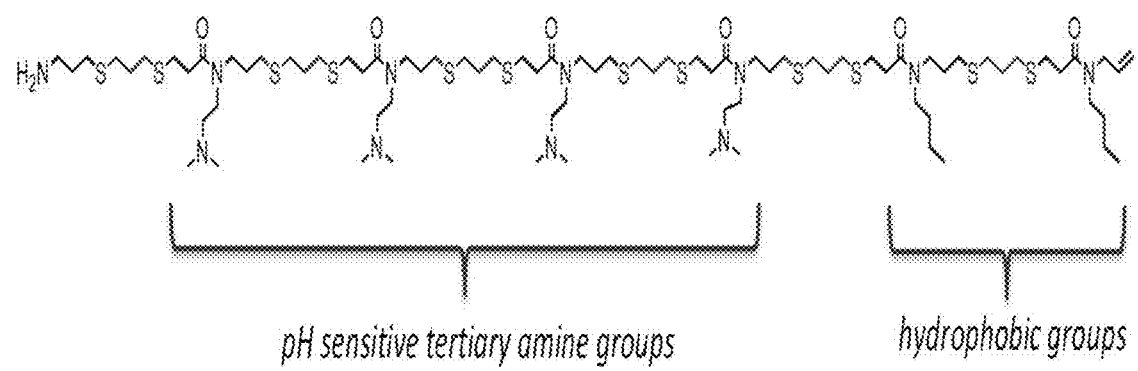
FIG. 36. Chemical structure of pH sensitive polymer for cell lysis and endosomal escape FIG. 37. $^1$H NMR (400 MHz, CDCl$_3$) of thiol-ene reaction of fluorous allylamine (1 equivalent) and 1,3 propane dithiol (5 equivalent) in presence of 2,2-dimethoxy-2-phenyl acetophenone (DMPA, 0.25 equivalent), hv (20 mW/cm$^2$), MeOH; "❊" and "*" represent the SH and olefin protons respectively.
Figure 37:
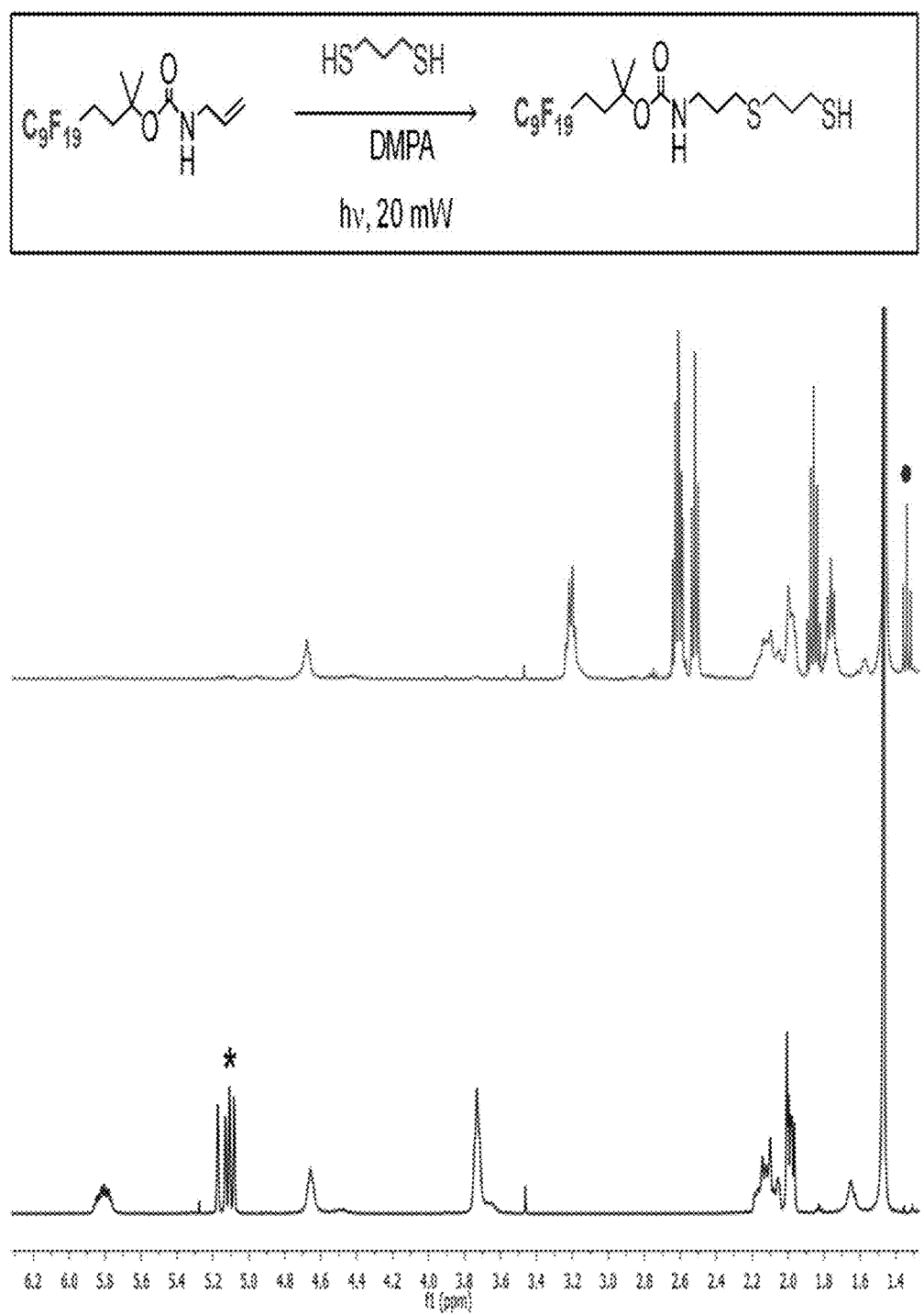
Figure 38:
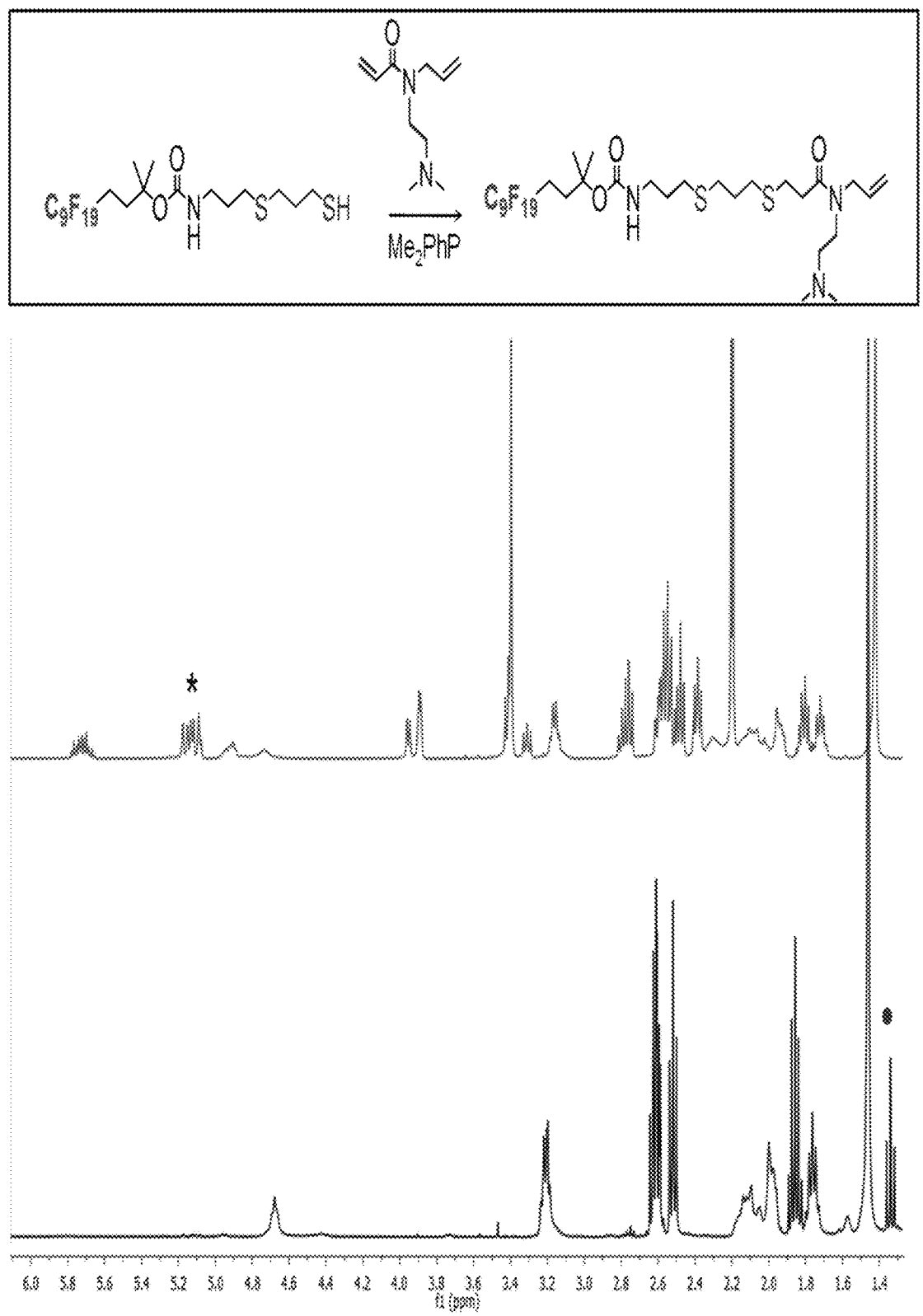
FIG. 38. $^1$H NMR (400 MHz, CDCl$_3$) of Michael addition of fluorous thiol (1 equivalent) and 9A (2 equivalents) in presence of Me$_2$PhP (0.1 equivalent), MeOH; "❊" and "*" represent the SH and olefin protons respectively.
Figure 39:
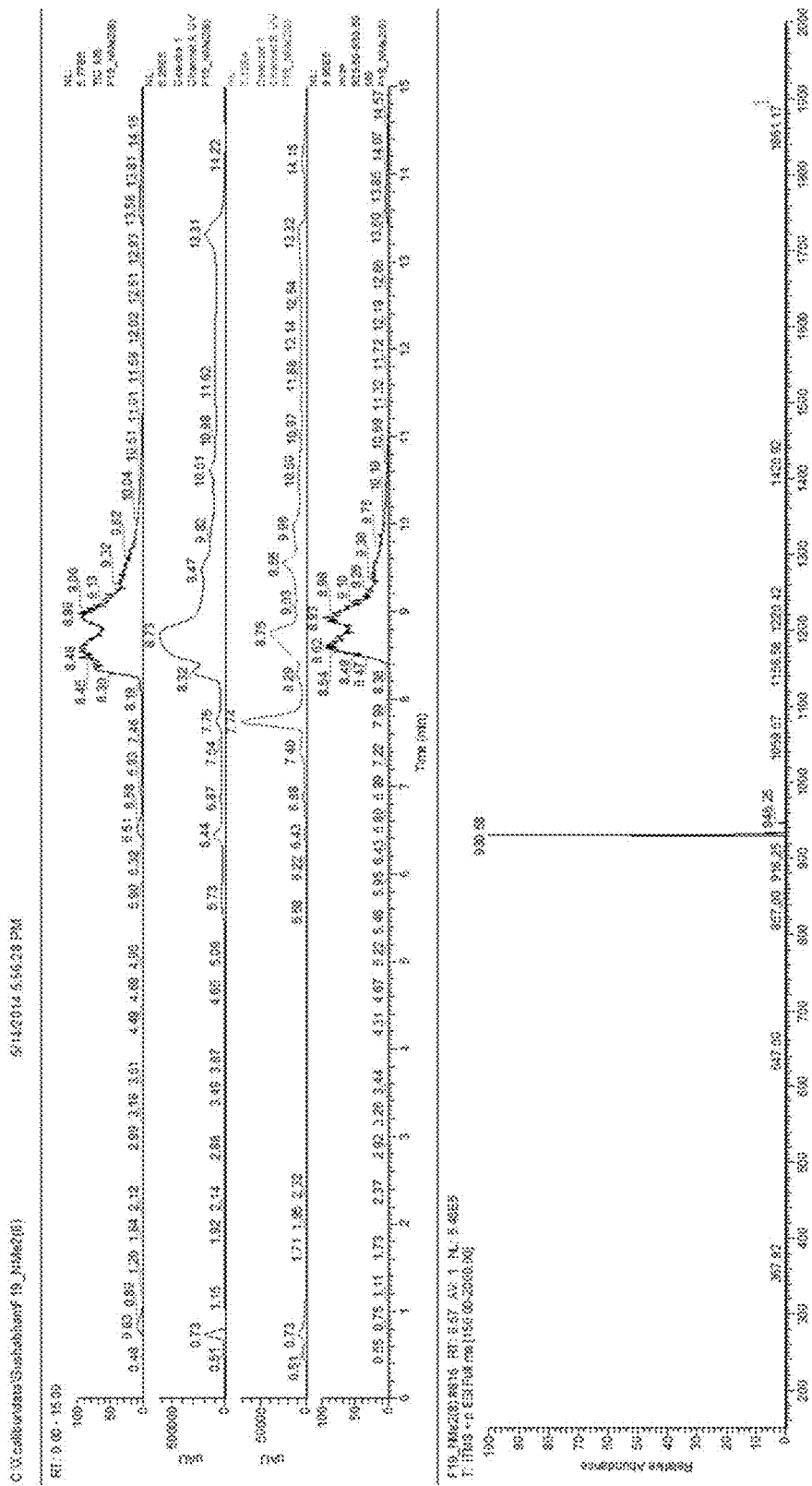
FIG. 39. LC-MS of the product from FIG. 38, (M+H)$^+$ observed 930.58, calculated 930.24.
Figure 40:
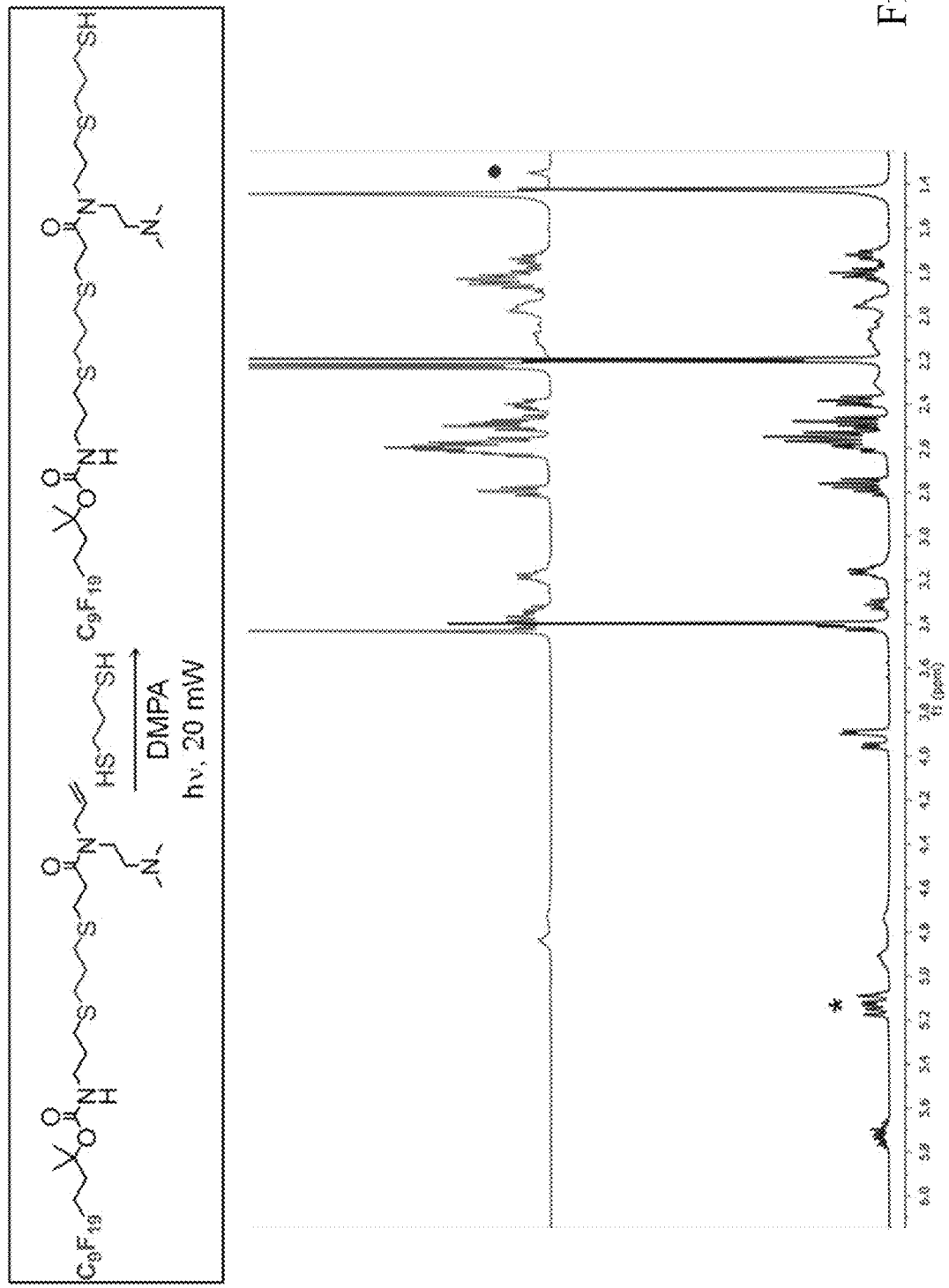
FIG. 40. $^1$H NMR (400 MHz, CDCl$_3$) of thiol-ene reaction of the product from FIG. 38 (1 equivalent) and 1,3 propane dithiol (5 equivalents) in presence of DMPA (0.25 equivalent), hv (20 mW/cm$^2$), MeOH; "❊" and "*" represent the SH and olefin protons respectively.
Figure 41:
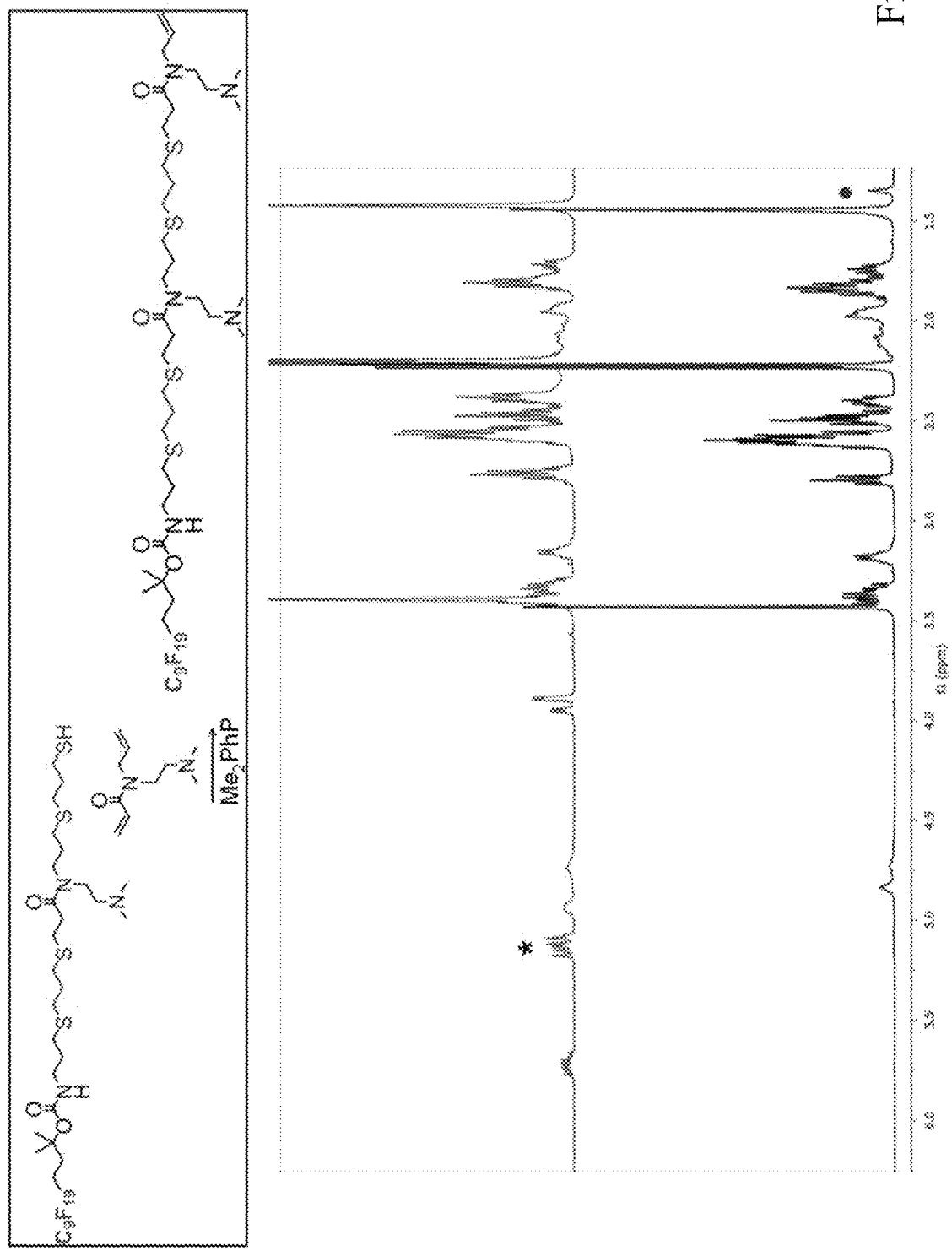
FIG. 41. $^1$H NMR (400 MHz, CDCl$_3$) of Michael addition of the product from FIG. 40 (1 equivalent) and 9A (2 equivalents) in presence of Me$_2$PhP (0.1 equivalent), MeOH; "❊" and "*" represent the SH and olefin protons respectively.
Figure 42:
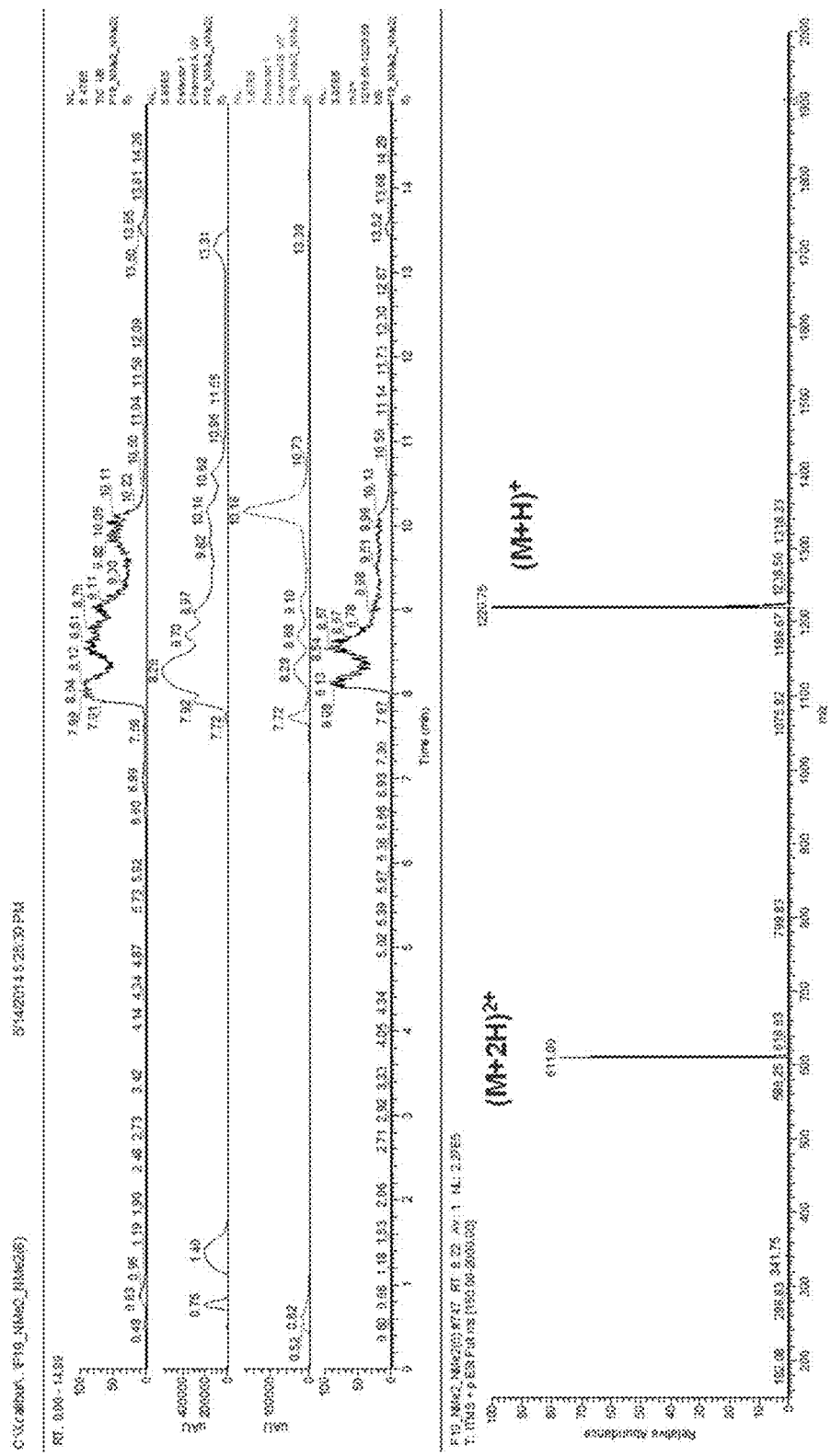
FIG. 42. LC-MS of the product from FIG. 41, (M+H)$^+$ observed 1220.75, calculated 1220.39; (M+2H)$^{2+}$ observed 611.00, calculated 611.2.
Figure 43:
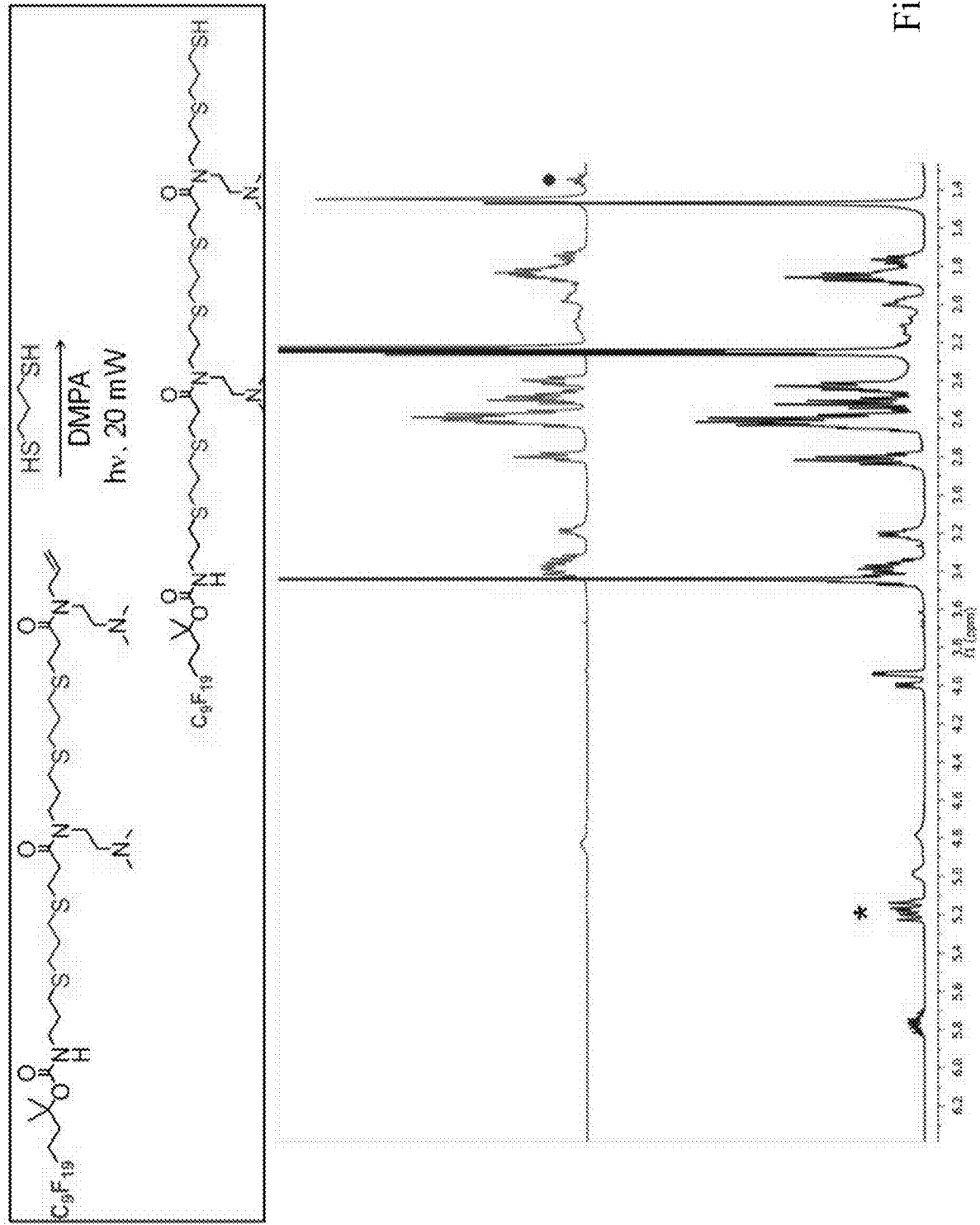
FIG. 43. $^1$H NMR (400 MHz, CDCl$_3$) of thiol-ene reaction of the product from FIG. 41 (1 equivalent) and 1,3 propane dithiol (5 equivalents) in presence of DMPA (0.25 equivalent), hv (20 mW/cm$^2$), MeOH; "•" and "*" represent the SH and olefin protons respectively.
Figure 44:
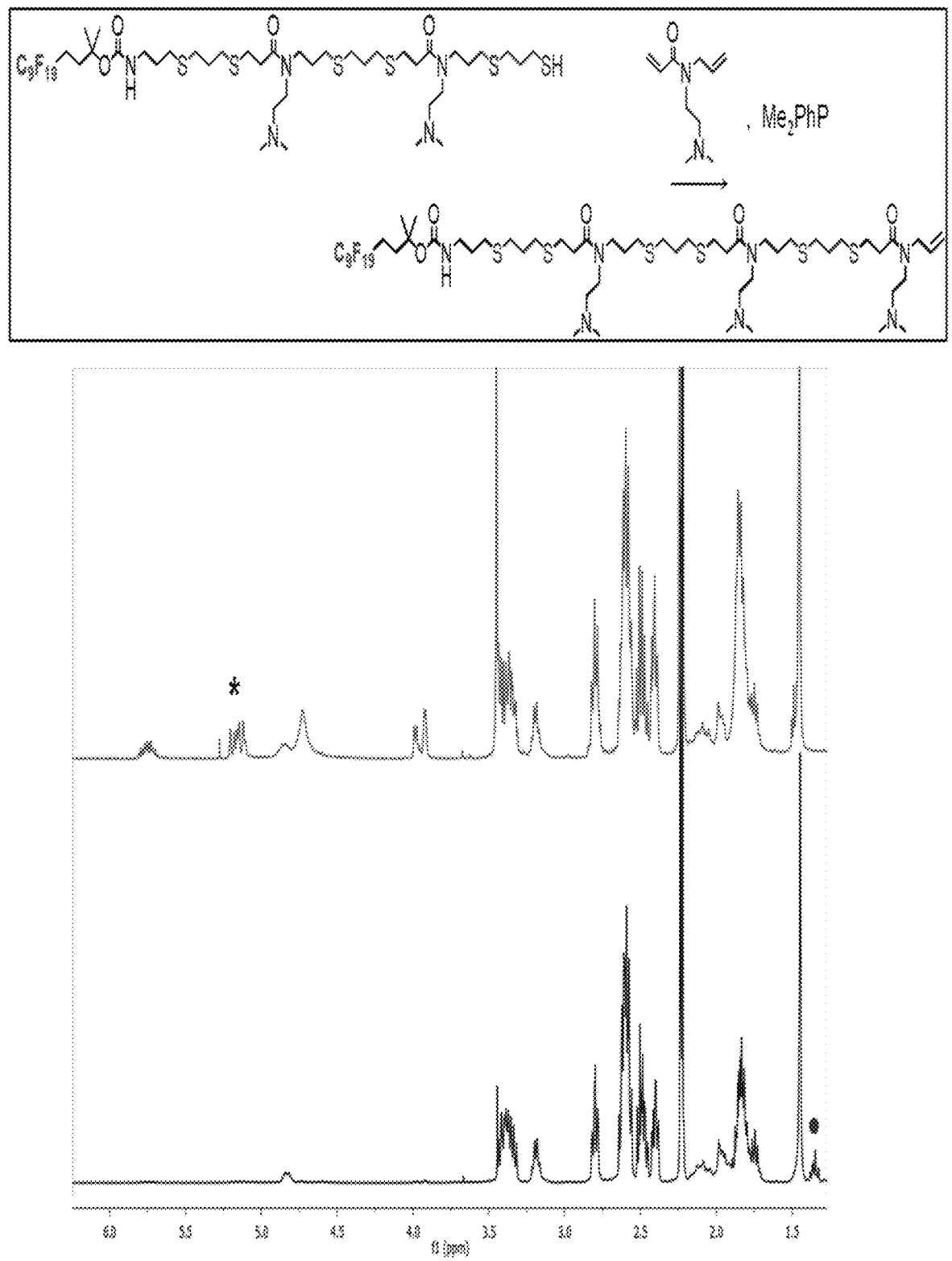
FIG. 44. $^1$H NMR (400 MHz, CDCl$_3$) of Michael addition of the product from FIG. 43 (1 equivalent) and 9A (2 equivalents) in presence of Me$_2$PhP (0.1 equivalent), MeOH; "❊" and "*" represent the SH and olefin protons respectively.
Figure 45:
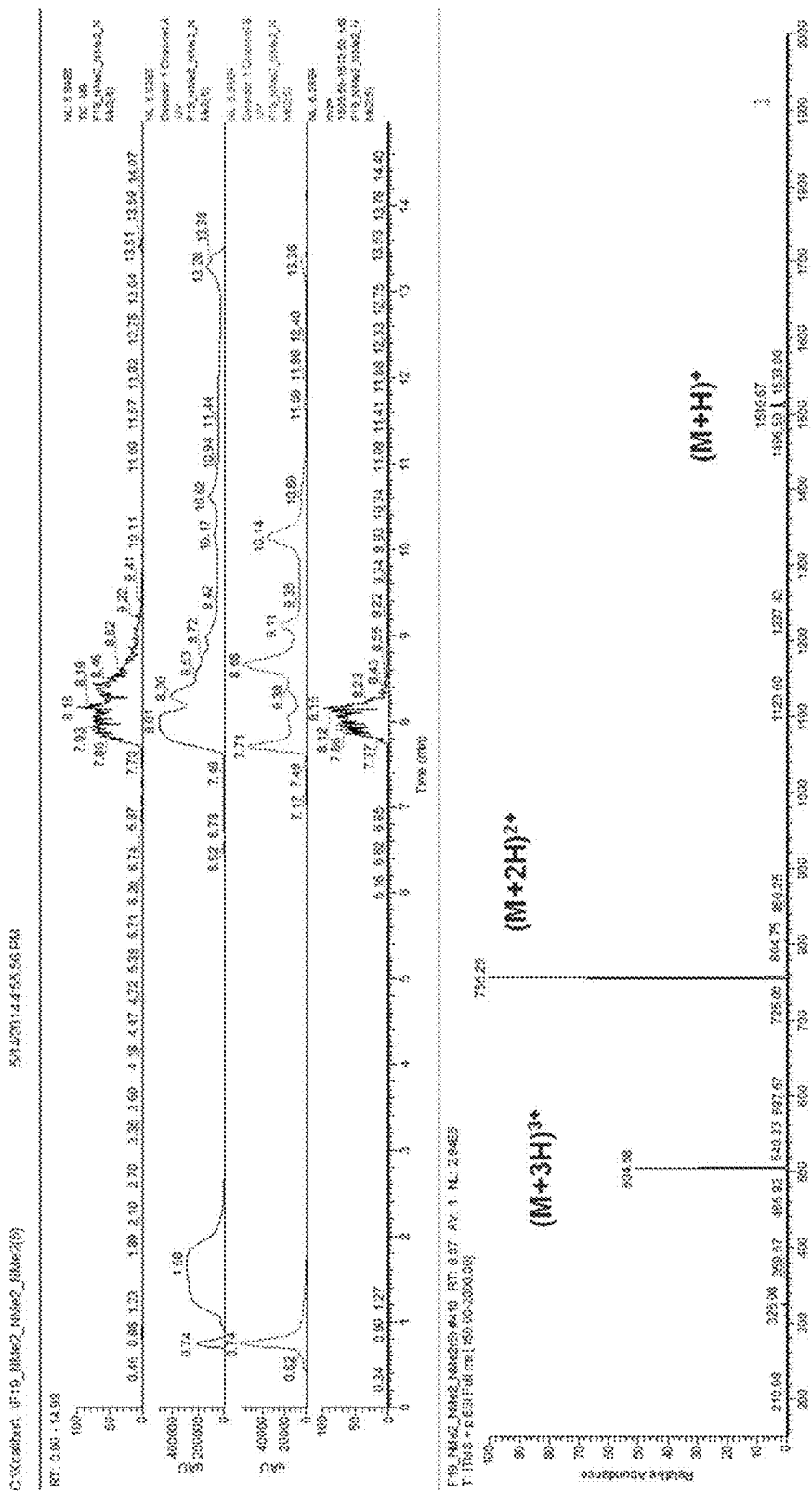
FIG. 45. LC-MS of the product from FIG. 44, (M+H)$^+$ observed 1510.67, calculated 1510.53; (M+2H)$^{2+}$ observed 756.25, calculated 756.27; (M+3H)$^{3+}$ observed 504.58, calculated 504.51.
Figure 46:
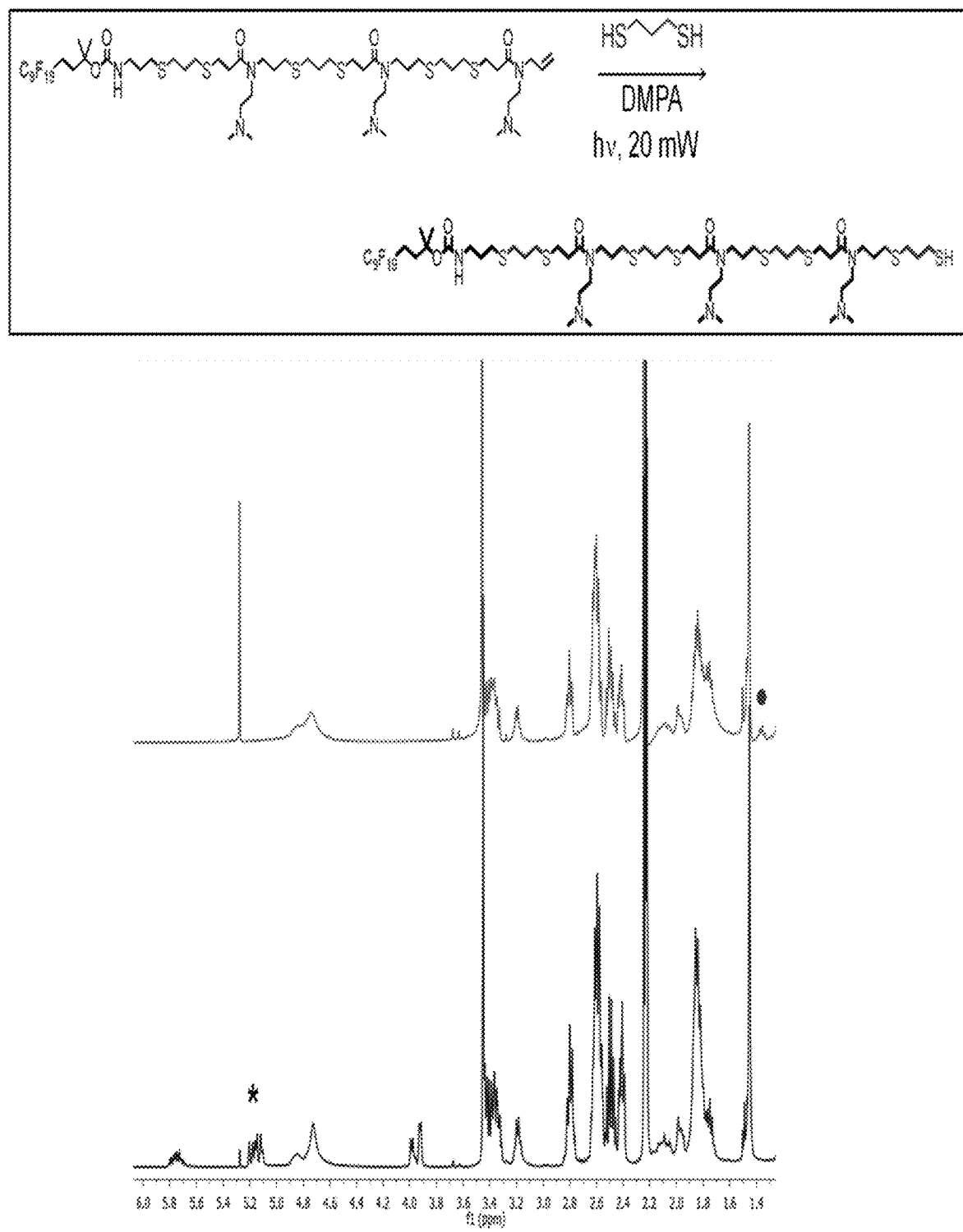
FIG. 46. $^1$H NMR (400 MHz, CDCl$_3$) of thiol-ene reaction of the product from FIG. 44 (1 equivalent) and 1,3 propane dithiol (5 equivalents) in presence of DMPA (0.25 equivalent), hv (20 mW/cm$^2$), MeOH; "•" and "*" represent the SH and olefin protons respectively.
Figure 47:
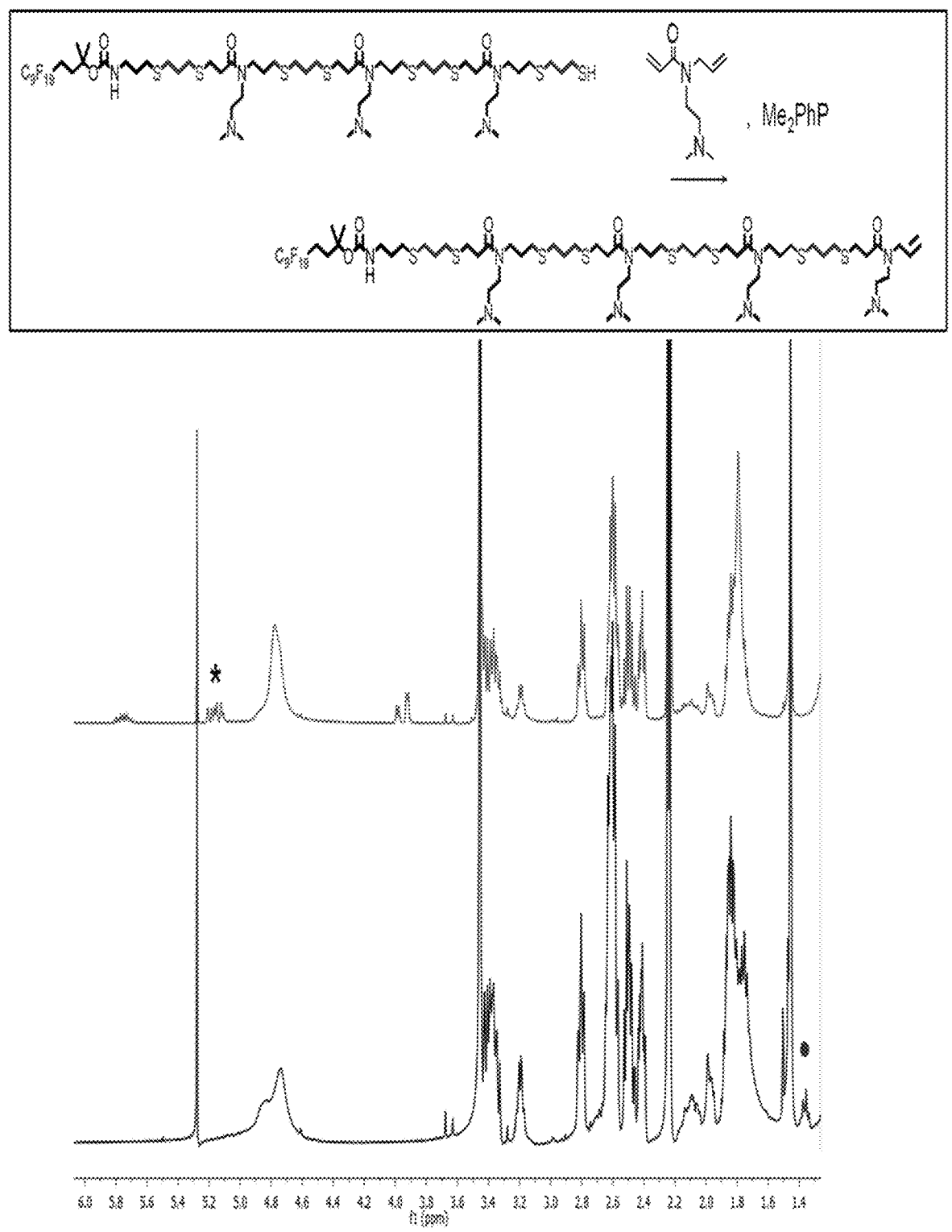
FIG. 47. $^1$H NMR (400 MHz, CDCl$_3$) of Michael addition of the product from FIG. 46 (1 equivalent) and 9A (2 equivalents) in presence of Me$_2$PhP (0.1 equivalent), MeOH; "❊" and "*" represent the SH and olefin protons respectively.
Figure 48:
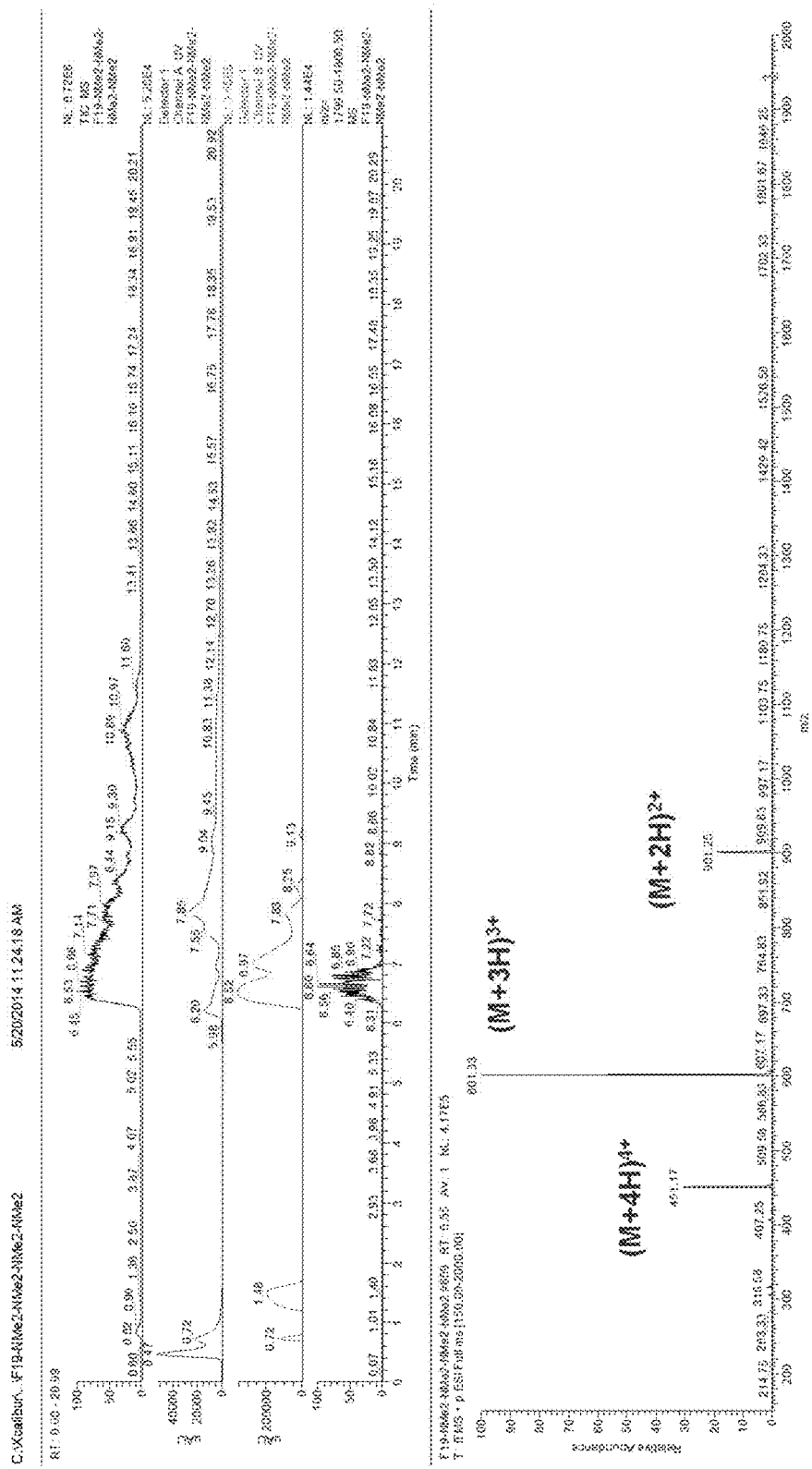
FIG. 48. LC-MS of the product from FIG. 47, (M+H)$^+$ was not observed as the instrument maximum mass limitation is 2000; (M+2H)$^{2+}$ observed 901.25, calculated 900.84; (M+3H)$^{3+}$ observed 601.33, calculated 600.89, (M+4H)$^{4+}$ observed 451.17, calculated 450.92.
Figure 50:
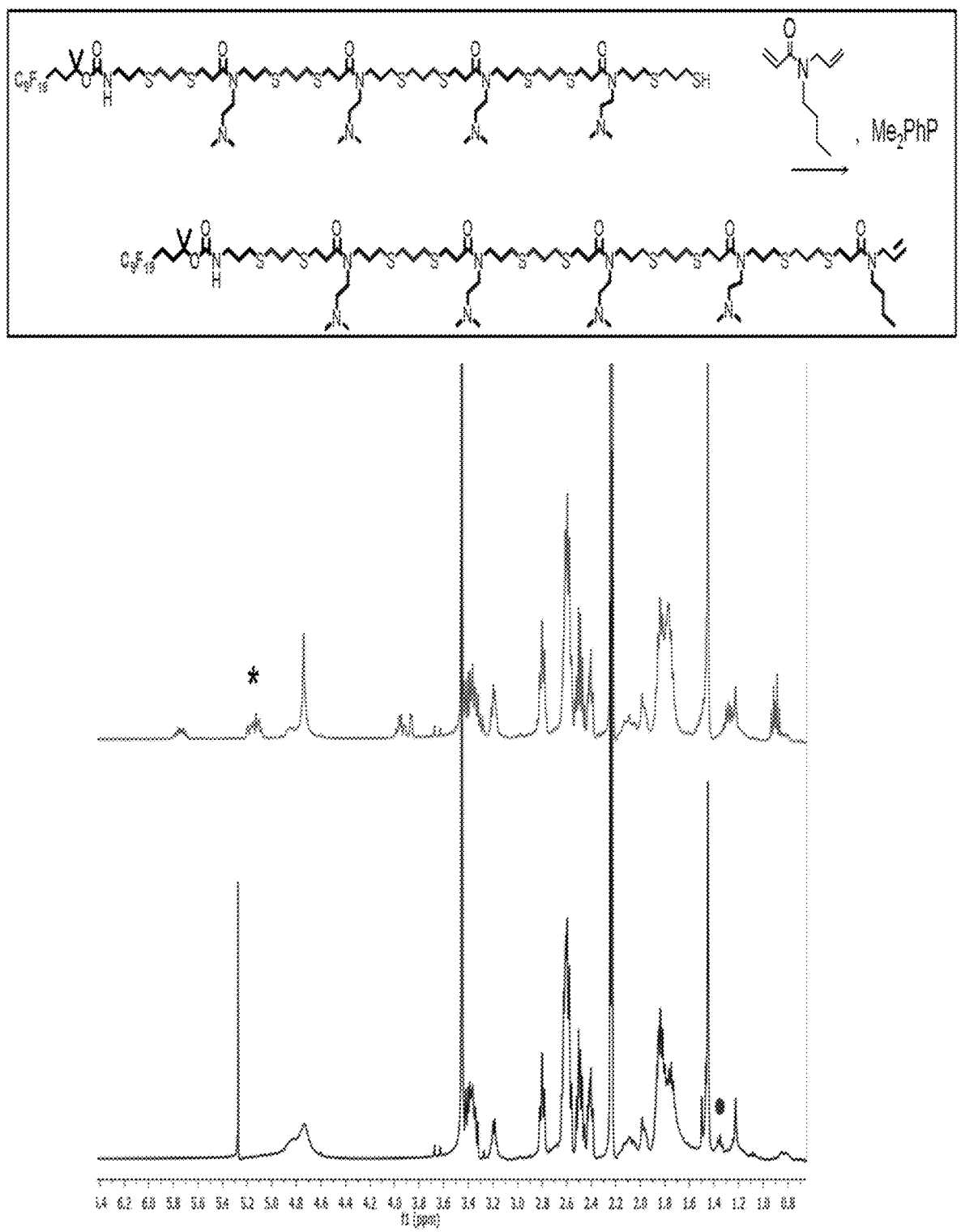
FIG. 50. $^1$H NMR (400 MHz, CDCl$_3$) of Michael addition of the product from FIG. 46 (1 equivalent) and 5A (2 equivalents) in presence of Me$_2$PhP (0.1 equivalent), MeOH; "❊" and "*" represent the SH and olefin protons respectively.
Figure 51:
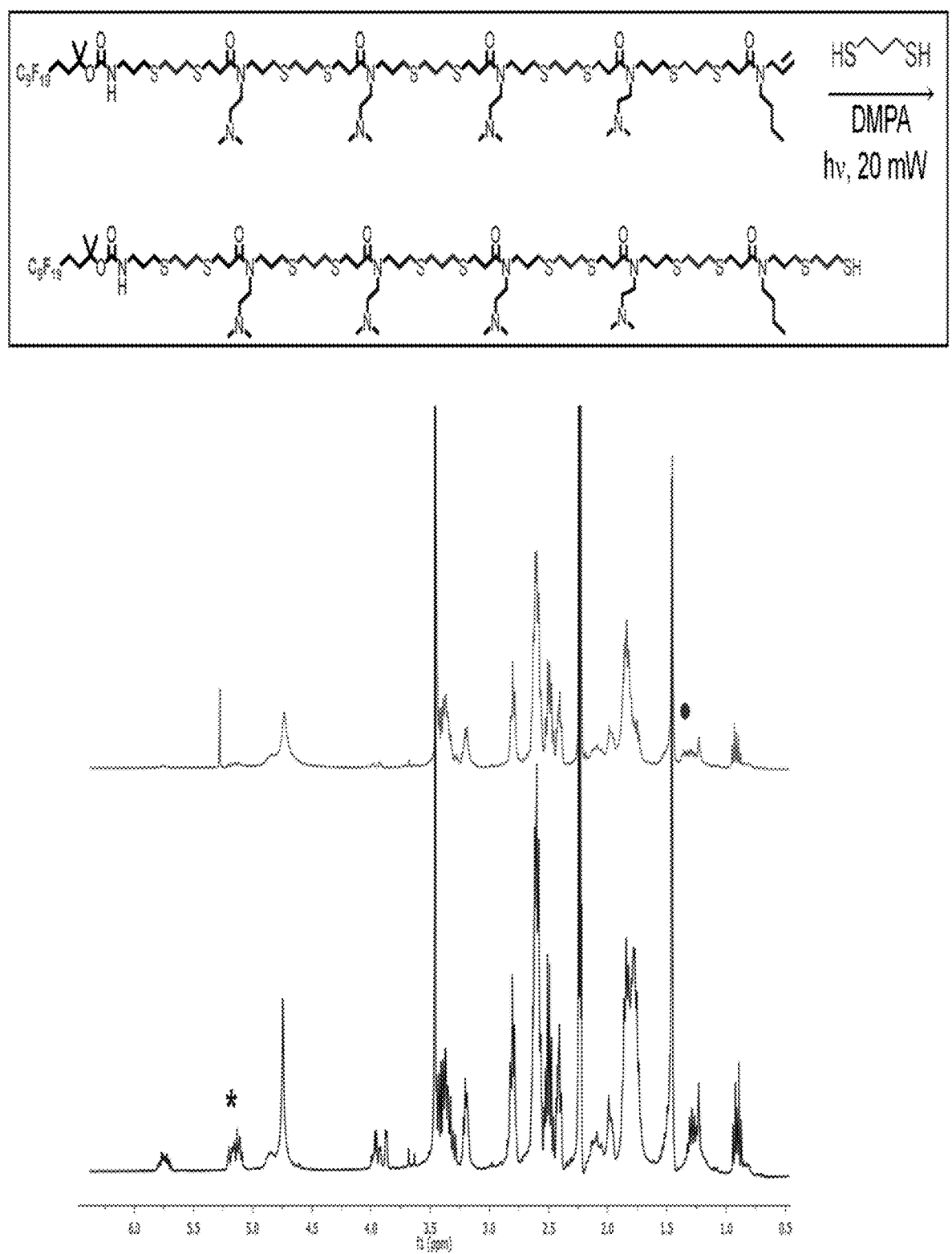
FIG. 51. $^1$H NMR (400 MHz, CDCl$_3$) of thiol-ene reaction of the product from FIG. 50 (1 equivalent) and 1,3 propane dithiol (5 equivalent) in presence of DMPA (0.25 equivalent), hv (20 mW/cm$^2$), MeOH; "•" and "*" represent the SH and olefin protons respectively.
Figure 52:
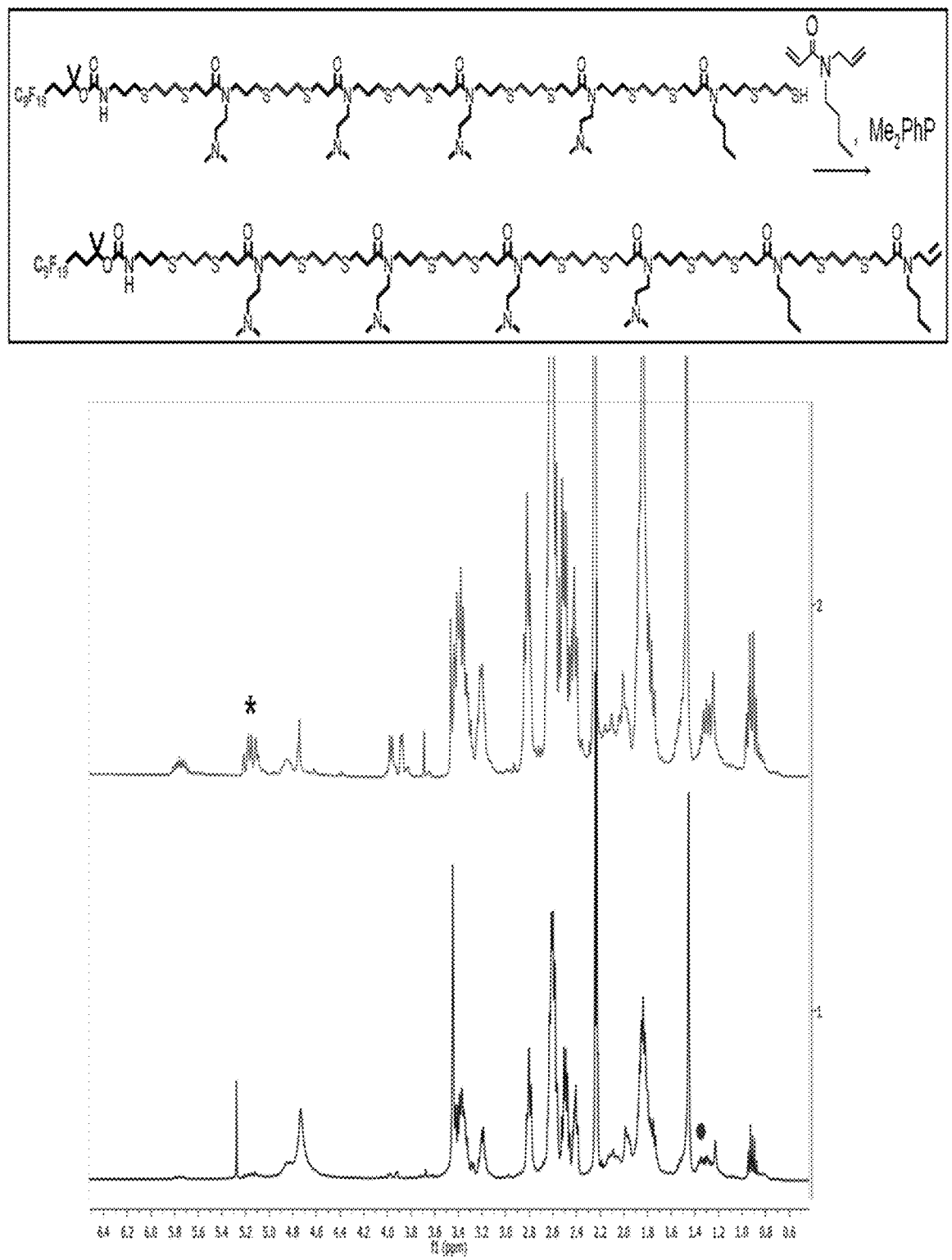
FIG. 52. $^1$H NMR (400 MHz, CDCl$_3$) of Michael addition of the product from FIG. 51 (1 equivalent) and 5A (2 equivalents) in presence of Me$_2$PhP (0.1 equivalent), MeOH; "❀" and "*" represent the SH and olefin protons respectively.
Figure 53:
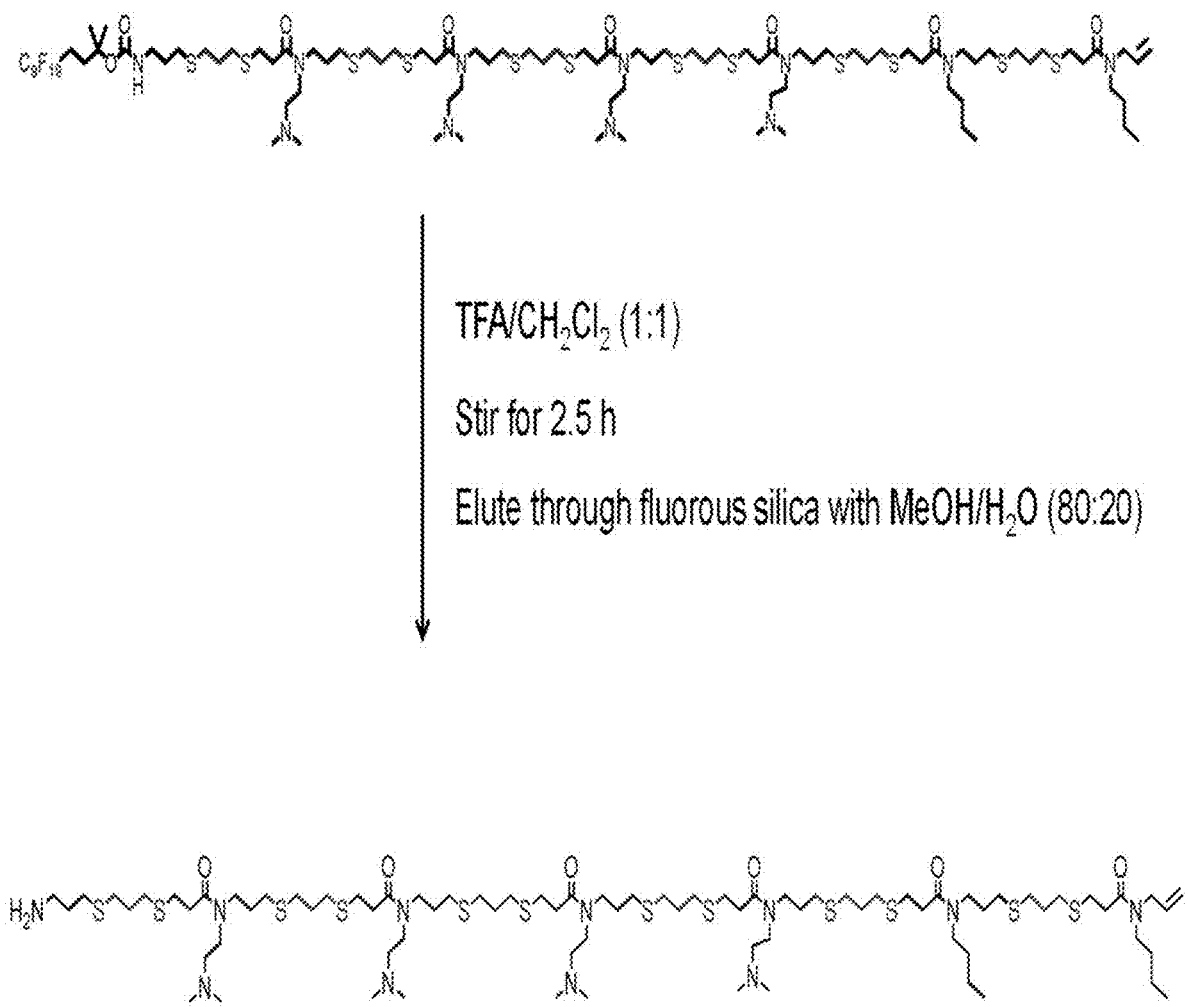
FIG. 53. Cleavage of the polymer from fluorous tag: stir the fluorous polymer in 50% trifluoroacetic acid in CH$_2$Cl$_2$ for 2.5 hours.
Figure 54:
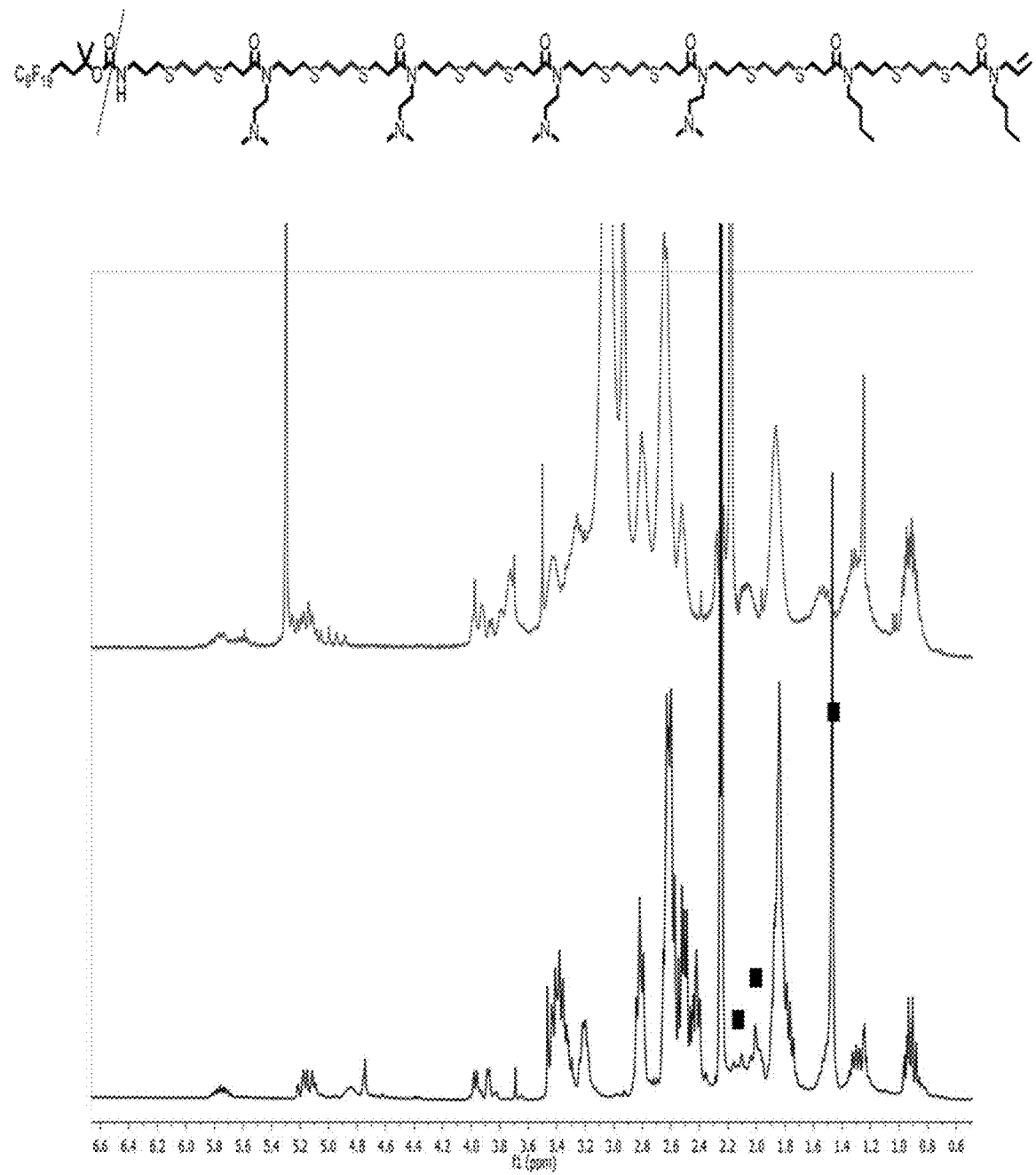
FIG. 54. $^1$H NMR (400 MHz, CDCl$_3$) of the polymer before (bottom) and after (top) the cleavage, "■" represents CH$_2$CH$_2$C—(CH$_3$)$_2$ protons on fluorous tag FIG. 55. LC-MS of the cleaved polymer.
Figure 55:
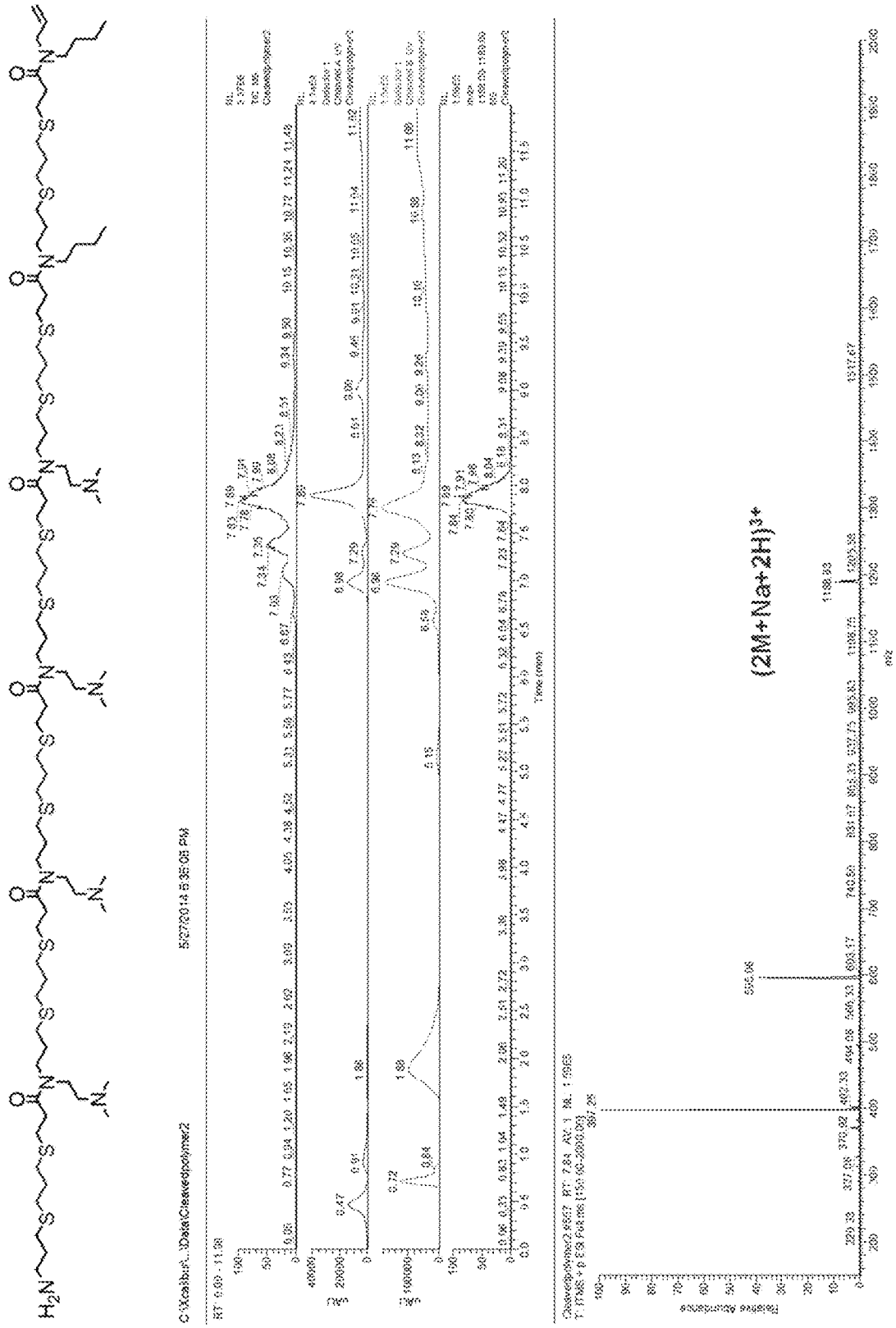
Figure 56:
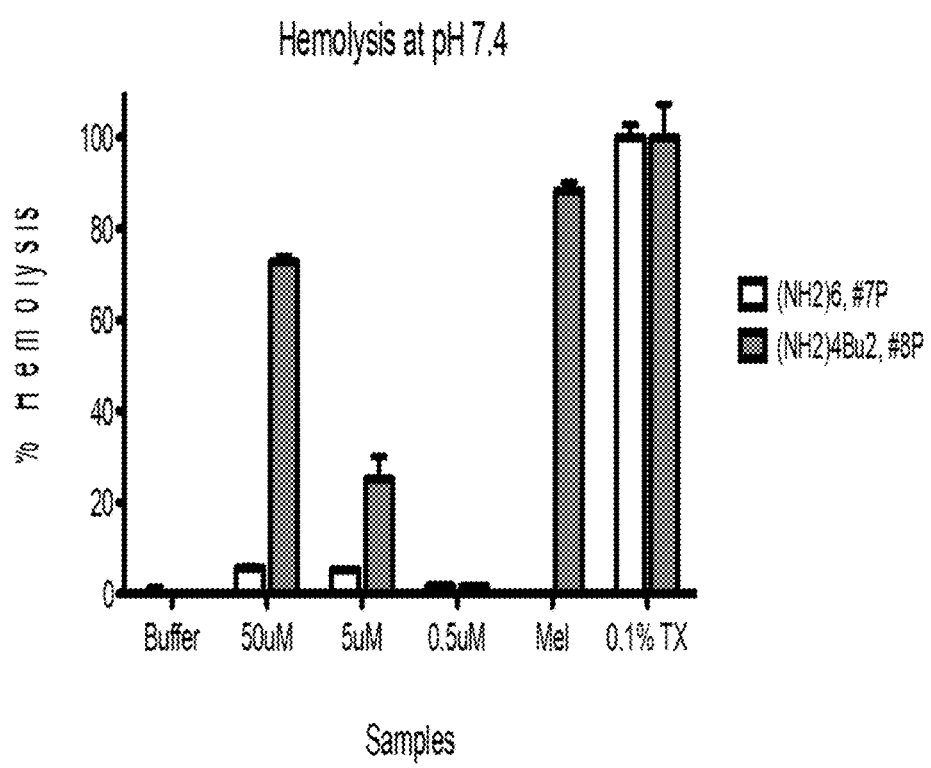
FIG. 56. Red blood cell hemolysis at pH 7.4.
Figure 57:
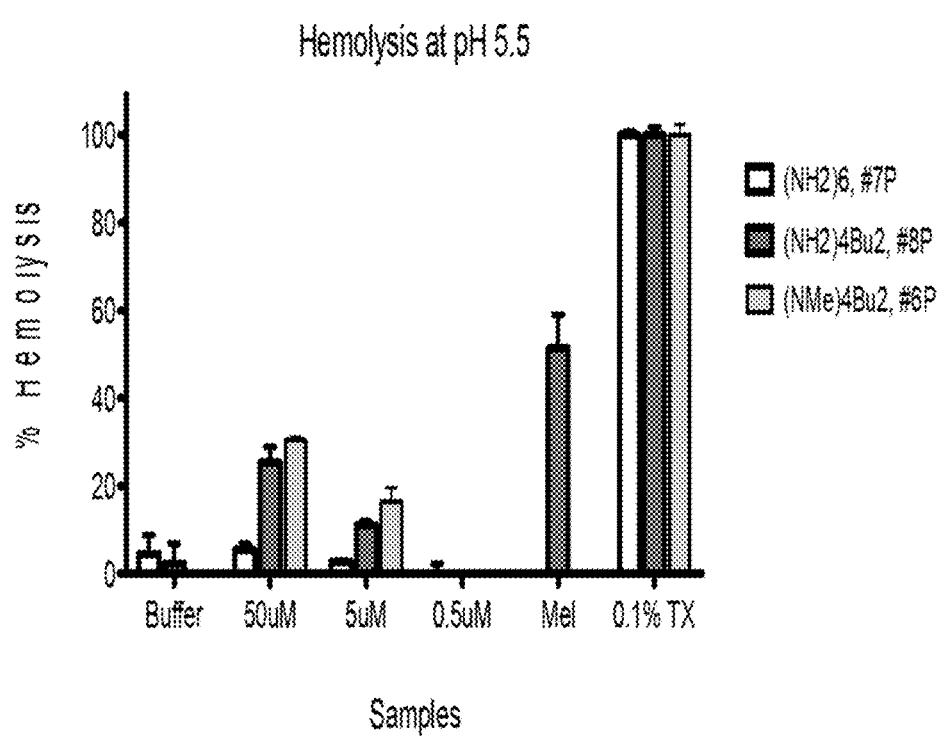
FIG. 57. Red blood cell hemolysis at pH 5.5.

To further test the durability and scope of this synthetic method for attaining sequence-control, we synthesized a 16-mer polymer (FIG. 4a) consisting of all eight allyl acrylamide monomers (FIG. 1) and 1,3-propanedithiol as the co-monomer. LCMS of the final cleaved product only showed the multiply charged $[M+2H]^{2+}$, $[M+3H]^{3+}$+ and $[M+4H]^{4+}$+ ions as the parent $[M+H]^+$ ion (2198.02 Da) was beyond the instrument detection limit. The total parent mass of the polymer was confirmed by MALDI (FIG. 4b inset, $[M+Na]^+$ and $[M+K]^+$ ions). The $^1$H NMR of the full product (FIG. 26) is also in agreement with the proposed structure. The observed peaks in the MS/MS fragmentation pattern of the $[M+2H]^{2+}$ ion matched the assigned M ions in the polymer structure (FIG. 4c, see FIG. 27 and Table 4 for full fragmentation analysis) thus confirming the molecular sequence of the 16-mer product.

We described the development of new functional ally acrylamide monomers coupled with an innovative fluorous-mediated methodology for the rapid and efficient assembly of sequence-defined polymers. We have shown evidence of sequential polymer assembly via $^1$H NMR and LCMS. The sequences of our prepared polymers were confirmed via tandem MS fragmentation analysis. The ease of our monomer synthesis along with the rapid polymer assembly should facilitate exploration of a wide variety of monomer combinations and functional polymer structures that may lead to the discovery of advanced materials. Additionally, all the polymers generated by our coupling strategy have an amine and alkene as orthogonal terminal functionalities, which make them attractive for post-synthetic modification of proteins, nucleic acids, nanoparticles and other biomaterials. Precise control over polymer sequence holds great potential for mediating a high level of control over the chemical and physical properties of materials, which can span the molecular to the macromolecular scale. We anticipate these polymers will find use in sequence-specific self-assembly, stimuli-responsive materials, controlled drug delivery and much more.

Materials and Methods. General chemicals were purchased from Sigma Aldrich. Precursors (amines and halides) for the monomer synthesis were purchased from Aldrich and Alfa Aesar. Fluorous BOC-ON (C9F19 BOC-ON) and pre-packed fluorous silica cartridges were purchased from Boron Specialties. $^1$H NMR spectra were recorded on INOVA 400 spectrometers. NMR data was analyzed by MestReNova (version 8.1.1). $^1$H NMR chemical shifts are reported in units of ppm relative to tetramethylsilane. NMR data are presented in the following order: chemical shift, peak multiplicity (s=singlet, d=doublet, t=triplet, m=multiplet, dd=doublet of doublet, dt=doublet of triplet), proton number, coupling constant. LCMS experiments were carried out on a Shimadzu HPLC LC20-AD and Thermo Scientific LCQ Fleet with a Sprite TARGA C18 column (40×2.1 mm, 5 μm, Higgins Analytical, Inc.) monitoring at 215 and 260 nm with positive mode for mass detection. Solvents for LCMS were water with 0.1% acetic acid (solvent A) and acetonitrile with 0.1% acetic acid (solvent B). Compounds were eluted at a flow rate of 0.3 mL/min with 0% solvent B for 2 min, followed by a linear gradient of 0% to 10% solvent B over 2 min, followed by a linear gradient of 10% to 100% solvent B over 5 min, and finally 100% solvent B for 1 min before equilibrating the column back to 0% solvent B over 1 min. MALDI-TOF mass spectrometry was performed on a Waters MALDI micro MX MALDI-TOF mass spectrometer using positive ionization and a linear detector. MALDI samples were prepared by depositing the analyte dissolved in methanol and an alpha-cyano-4-hydroxycinnamic acid matrix onto a stainless steel sample plate. The plate was air dried before loading it into the instrument. HPLC purification was performed on a 1100 Series Agilent HPLC system equipped with a UV diode array detector and a 1100 Infinity analytical scale fraction collector using reverse phase C18 column (4.6×150 mm, 5 μm). The column compartment was kept at 25° C. during fractionation. Solvents for HPLC were water with 0.1% trifluoroacetic acid (solvent A) and acetonitrile with 0.1% trifluoroacetic acid (solvent B). Compounds were eluted at a flow rate of 1 mL/min with 5% solvent B, followed by a linear gradient of 5% to 100% solvent B over 30 min, and finally 100% solvent B for 5 min before equilibrating the column back to 5% solvent B over 1 min. Polymers were collected based on their absorption at 254 nm. The fractionated polymer was transferred to a vial, dried and stored until further analysis.

Synthesis of Allyl-N-alkyl/aryl-amines. Method A (Monomer 2b, 2d and 2g):

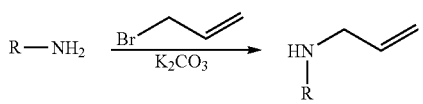

Primary amine derivatives were mixed with 1.2 equivalents of $K_2CO_3$ in a round bottom flask and 0.2 equivalent of allyl bromide was added dropwise over a period of 30 min at room temperature and stirred overnight. The reaction mixture was then filtered through celite and washed with $CH_2Cl_2$. The filtrate was then concentrated at reduced pressure. Excess primary amine was evaporated under high vacuum. The reaction mixture containing the secondary amine (desired product) and tertiary amine (side product) was used without purification for the subsequent reaction with acryloyl chloride.

Method B (Monomer 2f and 2h):

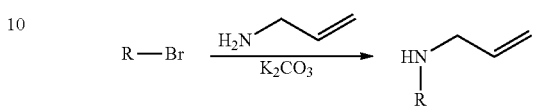

Allyl amine was mixed with 1.2 equivalents of $K_2CO_3$ in a round bottom flask and 0.2 equivalent of alkyl/aryl bromide was added dropwise over a period of 30 min at room temperature and stirred overnight. The reaction mixture was then filtered through celite and washed with $CH_2Cl_2$. The filtrate was then concentrated at reduced pressure. Allyl amine was evaporated under high vacuum. That reaction mixture containing the secondary amine (desired product) and tertiary amine (side product) was used without purification for the subsequent reaction with acryloyl chloride.

Method C (Monomer 2c):

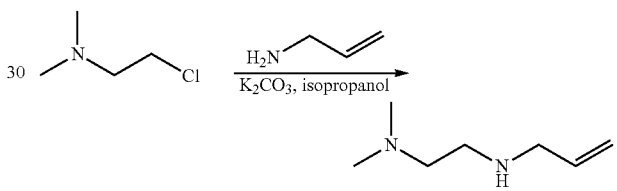

A solution of allylamine in isopropanol was stirred and treated portion wise with 0.3 equivalent 2-dimethylaminoethyl chloride hydrochloride, followed by 1.2 equivalent of $K_2CO_3$. The mixture was allowed to stir at room temperature for one hour, then refluxed for two hours, cooled and diluted with 20 mL of a 6.25 M sodium hydroxide solution. The product was extracted with diethyl ether and dried over sodium sulfate. After evaporation of solvent, the residue was distilled to give the pure product (b.p. 50° C. at 15 torr).

Synthesis of Allyl-N-Alkyl/Aryl-Acrylamide

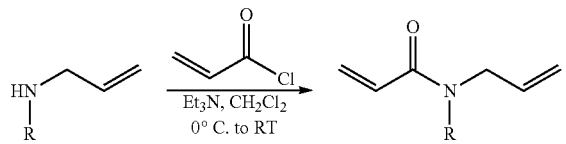

Allyl-N-alkyl/aryl-amines and one equivalent of triethylamine were dissolved in $CH_2Cl_2$. The reaction mixture was cooled to 0° C., while being stirred. One equivalent of acryloyl chloride (diluted in 5 mL of $CH_2Cl_2$) was added dropwise to the reaction mixture over a period of 1 h at 0° C. The reaction mixture was stirred at 0° C. for 1 h and at room temperature for 1 h. The reaction mixture was washed twice with water and once with brine solution. The organic layer was then dried over anhydrous $Na_2SO_4$, filtered, and concentrated at reduced pressure. The crude reaction mixture was purified by silica gel column chromatography. The product was eluted with 5% MeOH in $CH_2Cl_2$. Purity was confirmed by $^1$H NMR and LCMS.

General method for Fluorous solid-phase extraction (FSPE). The fluorous organic mixture to be separated was loaded onto a 2 g pre-packed fluorous solid-phase extraction (FSPE) cartridge. A fluorophobic wash (20% water in methanol) was used to elute all the non-fluorous molecules leaving the fluorous molecules retained on the fluorous silica gel. A fluorophilic wash (100% methanol) was then used to elute the fluorous molecules from the fluorous stationary phase.

Synthesis of Fluorous Boc Protected Allyl Amine

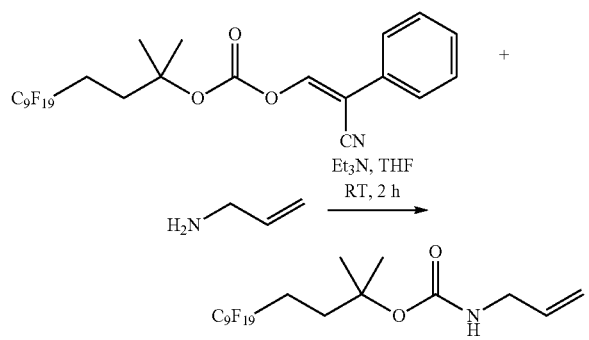

Allyl amine (6.9 mg, 0.12 mmol) and triethylamine (20 mg, 0.2 mmol) were added to a solution of 94.7 mg (0.13 mmol) of 2-[2-(1H,1H,2H,2H-Perfluoro-9-methyldecyl)isopropoxycarbonyloxyimino]-2-phenylacetonitrile (fluorous BOC-ON) in 10 mL THF. The reaction mixture was stirred at room temperature for 2 h. Thereafter the reaction mixture was concentrated to ~0.3 mL under reduced pressure and purified by FSPE. Methanol was evaporated under reduced pressure to yield the fluorous Boc protected allyl amine as a white solid product. Purity of the product was confirmed by $^1$H NMR. $^1$H NMR (400 MHz, CDCl$_3$): δ 1.47 (s, 6H), 1.97 (m, 2H), 2.10 (m, 2H), 3.73 (s, 2H), 4.66 (m, 1H) and 5.11 (m, 2H), 5.82 (m, 1H).

General method for Thiol-ene reaction. 1,3-Propanedithiol (0.4 mmol) and 2,2-dimethoxy-2-phenylacetophenone (DMPA, 5 mol % of 1,3-propanedithiol) were added to a solution of corresponding fluorous-olefin (0.08 mmol) in methanol (300 µL). The reaction mixture was subjected to UV irradiation for 90 s at 20 mW/cm$^2$. The product (fluorous-thiol) was purified by FSPE.

General method for Michael addition. Allyl-N-alkyl/aryl-acrylamides monomer (0.16 mmol) and dimethyl phenyl phosphine (Me$_2$PhP, 5 mol % of monomer) were added to corresponding fluorous-thiol (0.08 mmol) in methanol and stirred for 5 min. The product was purified by FSPE.

General method for fluorous Boc deprotection. The fluorous Boc protected polymer was dissolved in a 50% TFA/CH$_2$Cl$_2$ solution and stirred for 2.5 hours. The resulting mixture was purified by FSPE. In this case, the organic solution that elutes with the fluorophobic wash (20% water in methanol) is the desired product. The eluted product was dried under reduced pressure.

Kinetics experiment of Michael addition.

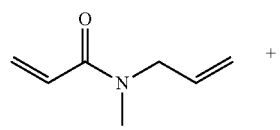

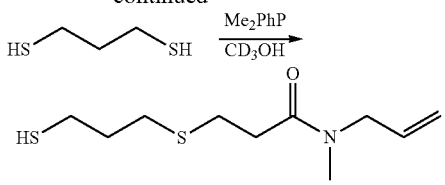

$^1$H NMR spectra of the N-methyl allyl acrylamide (0.1 mmol) in CD$_3$OH (600 µL) was recorded and taken as the 0 min time point. 1,3-propanedithiol (0.2 mmol) and Me$_2$PhP (5 mol % of N-methyl allyl acrylamide) were added to that solution, mixed quickly and a $^1$H NMR spectrum was recorded every minute. The addition, mixing and recording of the first $^1$H NMR was complete within one minute. The progress of the Michael addition was monitored via disappearance of acryloyl olefin proton signal at 6.74 ppm. The percentage of consumed starting material was determined by integration of $^1$H NMR signals at 6.74 ppm relative to 2.49 ppm, which remained constant throughout the reaction.

Kinetics Experiment of Thiol-Ene Reaction

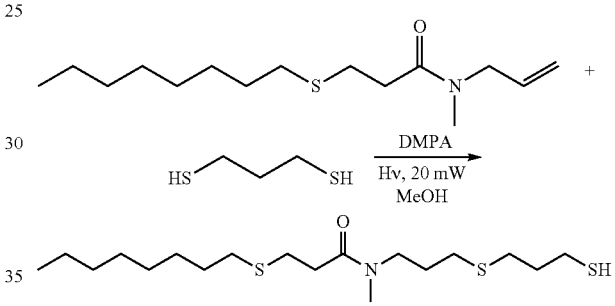

The starting material N-allyl-N-methyl-3-(octylthio)-acrylamide (AMOA) was synthesized by mixing 1-octanethiol and N-methyl allyl acrylamide in presence of 5 mol % propyl amine as catalyst for 24 hours. After removal of propylamine, the reaction was deemed quantitative via $^1$H NMR. 1,3-Propanedithiol (0.1 mmol) and DMPA (5 mol % of 1,3-propanedithiol) were added to a solution of AMOA (0.08 mmol) in methanol (300 µL). The reaction mixture was split equally into five vials and each was UV irradiated for 15, 30, 45, 60 and 90 s respectively at 20 mW/cm$^2$. $^1$H NMR spectra of the five reaction mixtures were recorded. $^1$H NMR of AMOA was used as the 0 s time point. The reaction progress was monitored via integration of the $^1$H NMR signals at 5.14 ppm (olefin proton) relative to that at 0.77 ppm. The latter represents the methyl proton of the octyl group, which remained constant throughout the reaction.

TABLE 2

Calculated and observed m/z of the fragments of ISO1

| Fragment | Calculated (m/z) | Observed (m/z) | Fragment | Calculated (m/z) | Observed (m/z) |
|---|---|---|---|---|---|
| $M_1$ | 166.08 | n/a * | $N_1$ | 216.14 | 216.07 |
| $M_2$ | 429.18 | 429.19 | $N_2$ | 449.23 | 448.85 |
| $M_3$ | 719.33 | 720.47 | $N_3$ | 668.30 | 668.54 |
| $M_4$ | 938.40 | 938.48 | $N_4$ | 958.45 | 958.40 |
| $M_5$ | 1171.49 | 1171.77 | $N_5$ | 1221.55 | 1221.28 |

* m/z was out of the instrument scan range

TABLE 3

Calculated and observed m/z of the fragments of ISO2

| Fragment | Calculated (m/z) | Observed (m/z) | Fragment | Calculated (m/z) | Observed (m/z) |
|---|---|---|---|---|---|
| $M_1$ | 166.08 | n/a * | $N_1$ | 156.10 | n/a * |
| $M_2$ | 456.23 | 456.97 | $N_2$ | 375.18 | 375.25 |
| $M_3$ | 689.32 | 689.45 | $N_3$ | 698.32 | 698.44 |
| $M_4$ | 1012.45 | 1012.70 | $N_4$ | 931.41 | 932.31 |
| $M_5$ | 1231.53 | 1231.52 | $N_5$ | 1221.55 | 1221.90 |

* m/z was out of range of the instrument scan range

TABLE 4

Calculated and observed m/z of the fragments of 16-mer polymer

| Fragment | Calculated (m/z) | Observed (m/z) | Fragment | Calculated (m/z) | Observed (m/z) |
|---|---|---|---|---|---|
| $M_1$ | 166.08 | n/a * | $N_1$ | 183.15 | n/a * |
| $M_2$ | 385.15 | 385.36 | $N_2$ | 446.25 | 428.37** |
| $M_3$ | 618.24 | 618.31 | $N_3$ | 769.39 | 769.66 |
| $M_4$ | 879.36 | 879.35 | $N_4$ | 1044.53 | 1044.78 |
| $M_5$ | 1154.50 | 1154.73 | $N_5$ | 1319.66 | 1319.87 |
| $M_6$ | 1429.64 | 1430.69 | $N_6$ | 1580.79 | 1580.67 |
| $M_7$ | 1752.78 | 1752.58 | $N_7$ | 1813.88 | 907.81*** |
| $M_8$ | 2015.88 | 1008.71*** | $N_8$ | 2032.95 | n/a * |

* m/z was out of range of the instrument scan range
**$(M + H—H_2O)^+$ was observed
***$(M + 2H)^{2+}$ ws observed

EXAMPLE 2

The following is an example of a use of a sequence-defined polymer of the present disclosure.

pH Sensitive Sequence-Defined Polymers for Cell Lysis. Biological data—red blood cell hemolysis. The relative capacity for polymer mediated endosomal membrane lysis was simulated using a red blood cell (RBC) hemolysis assay. RBC hemolysis was used as a surrogate assay for endosomal lysis due to similarities in their lipid bilayer (phospholipid and cholesterol) and glycocalyx compositions. This assay was performed both at a physiological pH of 7.4 and endosomal pH of 5.5. Membrane lysis at pH 7.4 is an indication of toxicity, and lysis at 5.5 is a model for the ability of the polymers to escape vesicular structures (e.g., endosomes/lysosomes) upon acidification. Polymer #6P and #8P can be used as endosomolytic agents. Melittin (Mel) is a biological peptide and is a well-known potent lytic agent. Triton X (TX) is a positive control.

Experimental details for hemolysis assay: Polymers were dissolved in DMSO to make stock solutions, then diluted in the buffer of pH 7.4 and pH 5.5 to a constant volume. Freshly drawn red blood cells (RBC, 200 μL) were washed twice with buffer by centrifugation (5 min at 500×g), and resuspended in 10 mL buffer for a 4% v/v RBC solution. Polymer solutions or controls were mixed 1:1 with the RBC solution in a v-bottom 96-well plate to reach a final volume of 100 μL. The resulting mixture was incubated at 37° C. for 1 hour, then centrifuged (Beckman Coulter, 5 mins at 1000×g) at 4° C. 75 μL of supernatant were transferred to a new plate. Hemolysis was measured via absorbance of released hemoglobin at 540 nm on a TECAN Infinite® M1000 PRO Microplate reader (Männdorf, Switzerland) and normalized to 0.1% Triton-X (100%) or PBS buffer (0%).

While the disclosure has been particularly shown and described with reference to specific embodiments and sample claims, it should be understood by those having skill in the art that various changes in form and detail may be made therein without departing from the spirit and scope of the present disclosure.

What is claimed is:

1. A sequence-defined polymer, wherein the sequence defined polymer has the following structure:

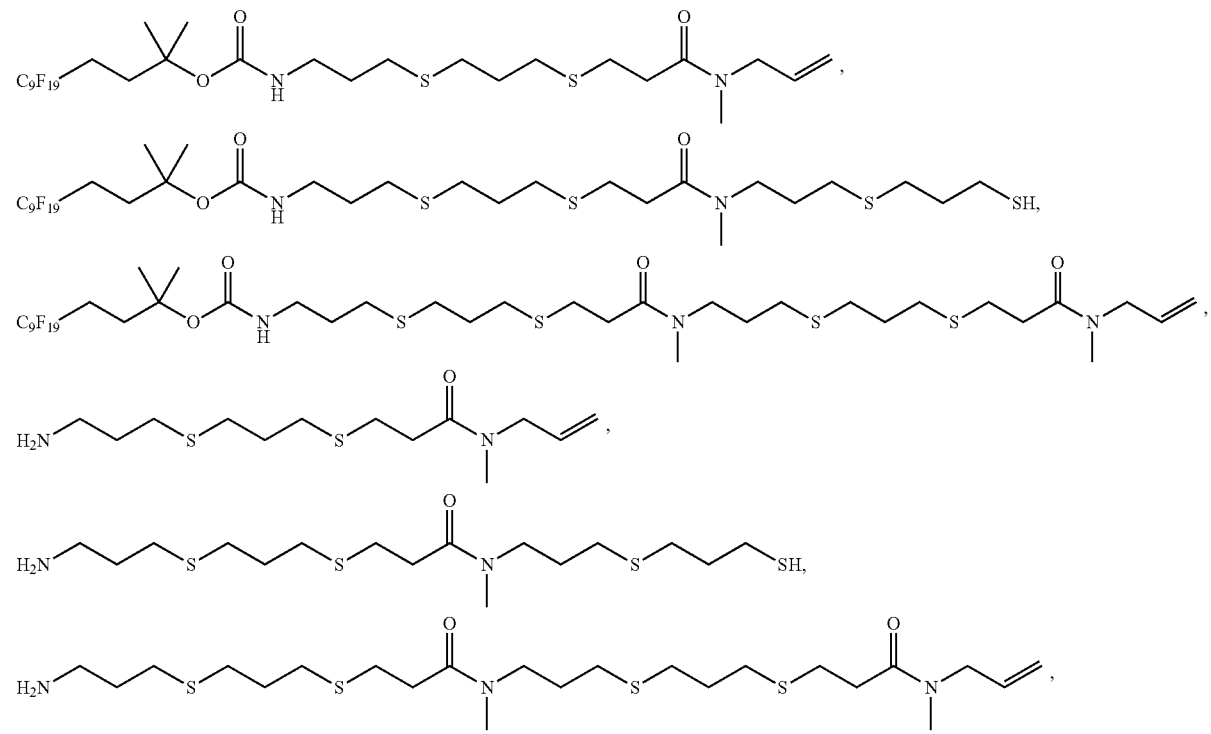

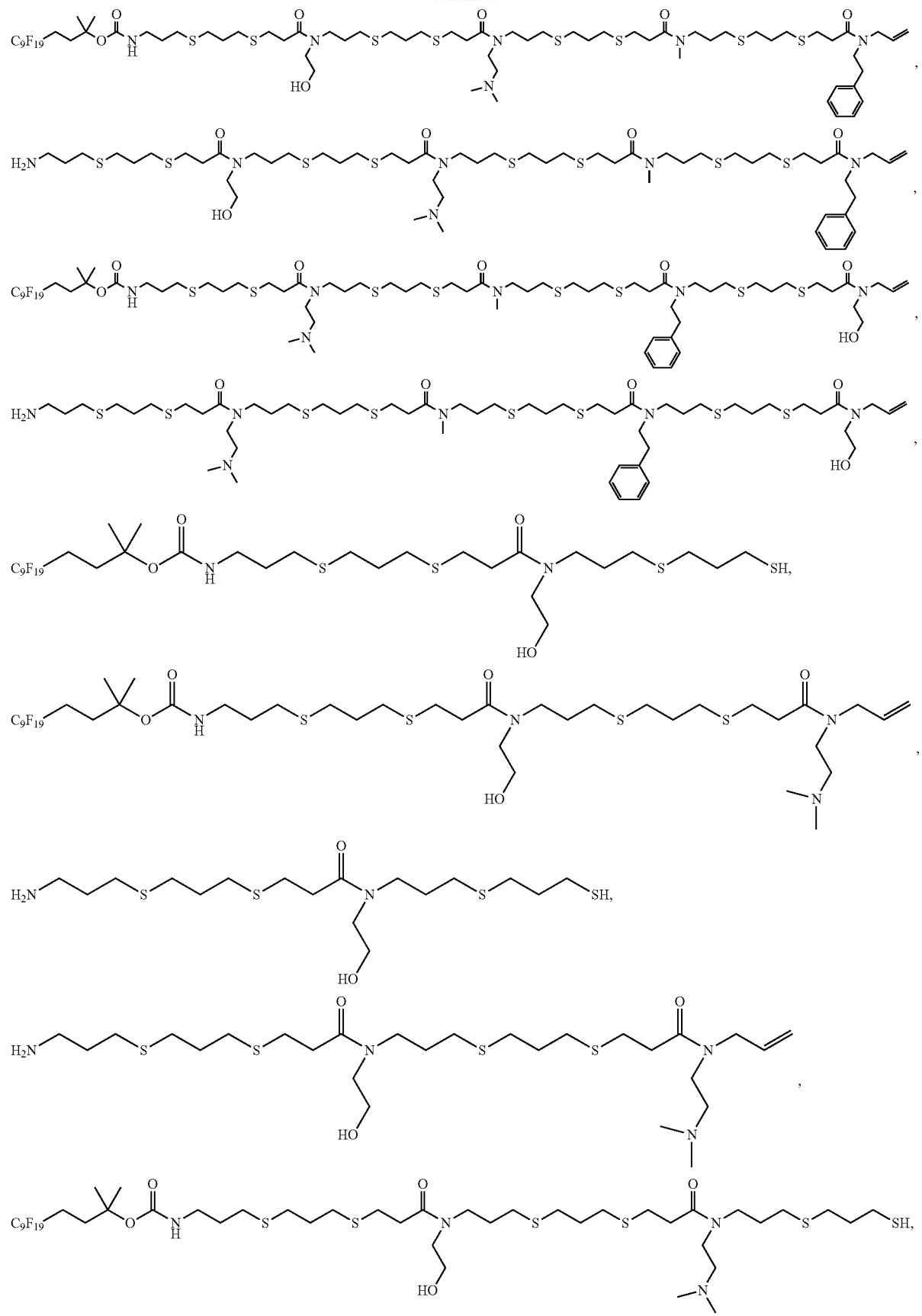

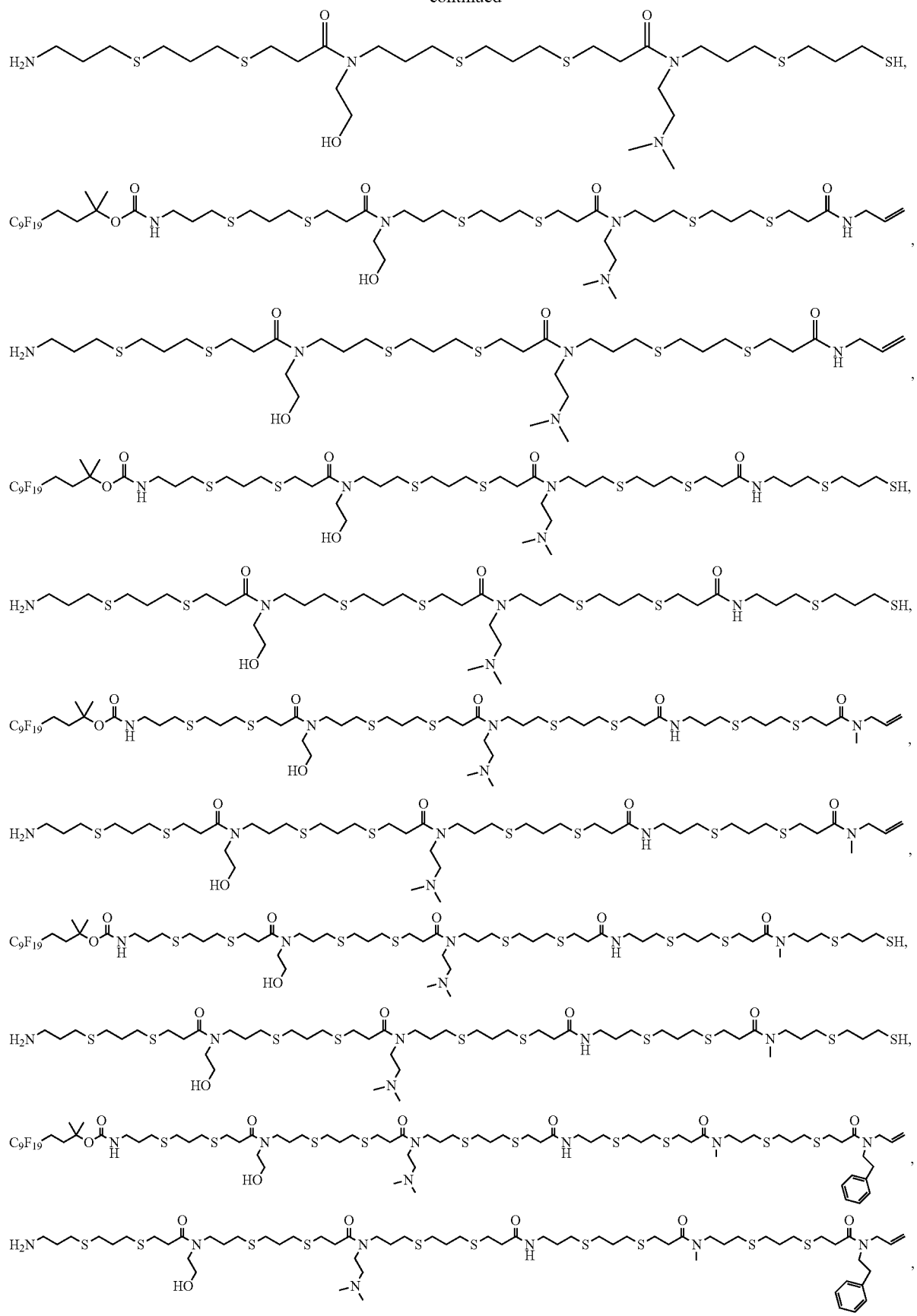

27 28
-continued
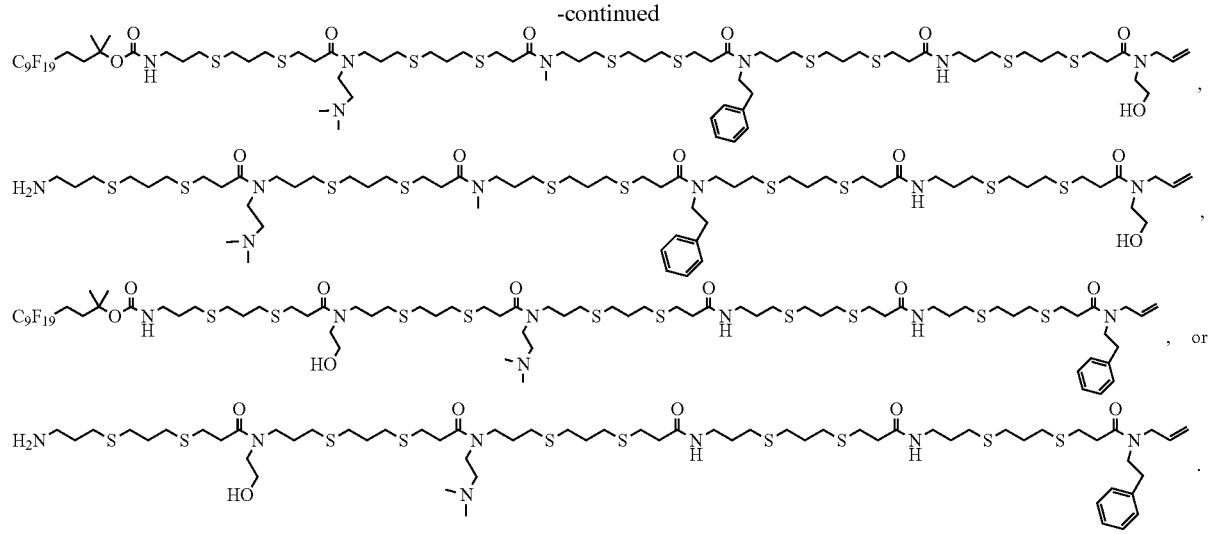
* * * * *